US011423513B2

(12) United States Patent
Lelescu et al.

(10) Patent No.: US 11,423,513 B2
(45) Date of Patent: Aug. 23, 2022

(54) SYSTEMS AND METHODS FOR SYNTHESIZING HIGH RESOLUTION IMAGES USING IMAGES CAPTURED BY AN ARRAY OF INDEPENDENTLY CONTROLLABLE IMAGERS

(71) Applicant: FotoNation Limited, Galway (IE)

(72) Inventors: Dan Lelescu, Morgan Hill, CA (US); Gabriel Molina, Grass Valley, CA (US); Kartik Venkataraman, San Jose, CA (US)

(73) Assignee: FotoNation Limited

( * ) Notice: Subject to any disclaimer, the term of this patent is extended or adjusted under 35 U.S.C. 154(b) by 0 days.

(21) Appl. No.: 17/098,432

(22) Filed: Nov. 15, 2020

(65) Prior Publication Data

US 2021/0133927 A1 May 6, 2021

Related U.S. Application Data

(63) Continuation of application No. 16/521,365, filed on Jul. 24, 2019, now Pat. No. 10,839,485, which is a
(Continued)

(51) Int. Cl.
*G06T 3/40* (2006.01)
*H04N 13/106* (2018.01)
(Continued)

(52) U.S. Cl.
CPC .......... *G06T 3/4053* (2013.01); *G06T 3/4007* (2013.01); *G06T 3/4076* (2013.01);
(Continued)

(58) Field of Classification Search
CPC ............. H04N 1/3935; H04N 5/23216; H04N 5/23232; H04N 9/09; H04N 9/097;
(Continued)

(56) References Cited

U.S. PATENT DOCUMENTS

| 4,124,798 A | 11/1978 | Thompson |
| 4,198,646 A | 4/1980 | Alexander et al. |
| 4,323,925 A | 4/1982 | Abell et al. |
| 4,460,449 A | 7/1984 | Montalbano |
| 4,467,365 A | 8/1984 | Murayama et al. |

(Continued)

FOREIGN PATENT DOCUMENTS

| CN | 1619358 A | 5/2005 |
| CN | 1669332 A | 9/2005 |

(Continued)

OTHER PUBLICATIONS

US 8,964,053 B2, 02/2015, Venkataraman (withdrawn)
US 8,965,058 B2, 02/2015, Venkataraman (withdrawn)
(Continued)

*Primary Examiner* — Lin Ye
*Assistant Examiner* — Chriss S Yoder, III
(74) *Attorney, Agent, or Firm* — KPPB LLP

(57) ABSTRACT

Systems and methods in accordance with embodiments of the invention are disclosed that use super-resolution (SR) processes to use information from a plurality of low resolution (LR) images captured by an array camera to produce a synthesized higher resolution image. One embodiment includes obtaining input images using the plurality of imagers, using a microprocessor to determine an initial estimate of at least a portion of a high resolution image using a plurality of pixels from the input images, and using a microprocessor to determine a high resolution image that when mapped through the forward imaging transformation matches the input images to within at least one predetermined criterion using the initial estimate of at least a portion of the high resolution image. In addition, each forward imaging transformation corresponds to the manner in which each imager in the imaging array generate the input images, and the high resolution image synthesized by the micropro-
(Continued)

cessor has a resolution that is greater than any of the input images.

20 Claims, 18 Drawing Sheets

Related U.S. Application Data continuation of application No. 15/170,788, filed on Jun. 1, 2016, now Pat. No. 10,366,472, which is a continuation of application No. 14/519,659, filed on Oct. 21, 2014, now Pat. No. 9,361,662, which is a continuation of application No. 12/967,807, filed on Dec. 14, 2010, now Pat. No. 8,878,950.

(51) Int. Cl.
*H04N 13/111* (2018.01)
*H04N 13/128* (2018.01)
*H04N 13/139* (2018.01)
*G06T 5/00* (2006.01)
*H04N 5/232* (2006.01)
*G06T 5/50* (2006.01)
*H04N 13/156* (2018.01)
*H04N 13/204* (2018.01)
*H04N 13/246* (2018.01)
*H04N 13/271* (2018.01)
*G06T 5/20* (2006.01)

(52) U.S. Cl.
CPC .............. *G06T 5/001* (2013.01); *G06T 5/006* (2013.01); *G06T 5/50* (2013.01); *H04N 5/23216* (2013.01); *H04N 5/23232* (2013.01); *H04N 13/106* (2018.05); *H04N 13/111* (2018.05); *H04N 13/128* (2018.05); *H04N 13/139* (2018.05); *G06T 5/002* (2013.01); *G06T 5/20* (2013.01); *G06T 2207/10004* (2013.01); *G06T 2207/10012* (2013.01); *G06T 2207/20182* (2013.01); *G06T 2207/20192* (2013.01); *G06T 2207/20221* (2013.01); *H04N 13/156* (2018.05); *H04N 13/204* (2018.05); *H04N 13/246* (2018.05); *H04N 13/271* (2018.05)

(58) Field of Classification Search
CPC .............. H04N 13/106; H04N 13/111; H04N 13/128; H04N 13/139; H04N 13/156; H04N 13/204; H04N 13/246; H04N 13/271; H04N 2209/049; G06T 3/4007; G06T 3/4053; G06T 3/4076; G06T 5/006; G06T 5/001; G06T 5/002; G06T 5/20; G06T 5/50; G06T 2207/10004; G06T 2207/10012; G06T 2207/20182; G06T 2207/20192; G06T 2207/20221
See application file for complete search history.

(56) References Cited

U.S. PATENT DOCUMENTS

| | | | |
|---|---|---|---|
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,488,674 A | 1/1996 | Burt et al. |
| 5,629,524 A | 5/1997 | Stettner et al. |
| 5,638,461 A | 6/1997 | Fridge |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shume et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,015,954 B1 | 3/2006 | Foote et al. |
| 7,085,409 B2 | 8/2006 | Sawhney et al. |
| 7,161,614 B1 | 1/2007 | Yamashita et al. |

(56) References Cited

U.S. PATENT DOCUMENTS

| | | |
|---|---|---|
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |

(56) References Cited

U.S. PATENT DOCUMENTS

| | | |
|---|---|---|
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,767,981 B2 | 9/2020 | Venkataraman et al. |
| 10,839,485 B2 | 11/2020 | Lelescu et al. |
| 10,909,707 B2 | 2/2021 | Ciurea et al. |
| 10,984,276 B2 | 4/2021 | Venkataraman et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |

(56) References Cited

U.S. PATENT DOCUMENTS

| | | |
|---|---|---|
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1* | 7/2007 | Tanida ............... H04N 5/2254 382/276 |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |

(56) References Cited

U.S. PATENT DOCUMENTS

| | | |
|---|---|---|
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0029714 A1* | 2/2008 | Olsen ............... G02B 7/04 250/475.2 |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |

(56) References Cited

U.S. PATENT DOCUMENTS

| | | |
|---|---|---|
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169921 A1 | 7/2011 | Lee et al. |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain et al. |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |

(56) References Cited

U.S. PATENT DOCUMENTS

| | | |
|---|---|---|
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0120264 A1 | 5/2012 | Lee et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |

(56) References Cited

U.S. PATENT DOCUMENTS

| | | |
|---|---|---|
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0139382 A1 | 5/2018 | Venkataraman et al. |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0302554 A1 | 10/2018 | Lelescu et al. |
| 2018/0330182 A1 | 11/2018 | Venkataraman et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0215496 A1 | 7/2019 | Mullis et al. |
| 2019/0235138 A1 | 8/2019 | Duparre et al. |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |

(56) References Cited

U.S. PATENT DOCUMENTS

| | | |
|---|---|---|
| 2020/0252597 A1 | 8/2020 | Mullis |
| 2020/0389604 A1 | 12/2020 | Venkataraman et al. |
| 2021/0063141 A1 | 3/2021 | Venkataraman et al. |
| 2021/0150748 A1 | 5/2021 | Ciurea et al. |
| 2021/0312207 A1 | 10/2021 | Venkataraman et al. |

FOREIGN PATENT DOCUMENTS

| | | |
|---|---|---|
| CN | 1839394 A | 9/2006 |
| CN | 1985524 A | 6/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101606086 A | 12/2009 |
| CN | 101883291 A | 11/2010 |
| CN | 102037717 A | 4/2011 |
| CN | 102184720 A | 9/2011 |
| CN | 102375199 A | 3/2012 |
| CN | 103004180 A | 3/2013 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 104685513 B | 4/2018 |
| CN | 104335246 B | 9/2018 |
| CN | 107346061 B | 4/2020 |
| CN | 107230236 B | 12/2020 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1418766 A2 | 5/2004 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2502115 A2 | 9/2012 |
| EP | 2569935 A1 | 3/2013 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2761534 B1 | 11/2020 |
| EP | 2888720 B1 | 3/2021 |
| EP | 3328048 B1 | 4/2021 |
| EP | 3869797 A1 | 8/2021 |
| EP | 3876510 A1 | 9/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2013509022 A | 3/2013 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 6630891 B2 | 12/2019 |
| JP | 2019220957 A | 12/2019 |
| JP | 2020017999 A | 1/2020 |
| JP | 6767543 B2 | 9/2020 |

(56) References Cited

FOREIGN PATENT DOCUMENTS

| | | |
|---|---|---|
| JP | 6767558 B2 | 9/2020 |
| KR | 1020110097647 A | 8/2011 |
| KR | 20170063827 A | 6/2017 |
| KR | 101824672 B1 | 2/2018 |
| KR | 101843994 B1 | 3/2018 |
| KR | 10-2002165 B1 | 7/2019 |
| KR | 10-2111181 B1 | 5/2020 |
| SG | 191151 A1 | 7/2013 |
| SG | 11201500910R A | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007052191 A2 | 5/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |

OTHER PUBLICATIONS

Extended European Search Report for European Application No. 21169308.0, Search completed Aug. 2, 2021, dated Aug. 9, 2021, 9 Pgs.
Extended Search Report for European Application No. 21155002.5, Search completed Jun. 7, 2021 , dated Jun. 11, 2021, 14 Pgs.
US 8,957,977, 8/2014, Venkataraman et al. (withdrawn).
Extended European Search Report for EP Application No. 11781313.9, Completed Oct. 1, 2013, dated Oct. 8, 2013, 6 pages.
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 7 Pgs.
Extended European Search Report for European Application EP12835041.0, Report Completed Jan. 28, 2015, dated Feb. 4, 2015, 6 Pgs.
Extended European Search Report for European Application EP13751714.0, completed Aug. 5, 2015, dated Aug. 18, 2015, 8 Pgs.
Extended European Search Report for European Application EP13810229.8, Report Completed Apr. 14, 2016, dated Apr. 21, 2016, 7 pgs.
Extended European Search Report for European Application No. 10832330.4, completed Sep. 26, 2013, dated Oct. 4, 2013, 7 pgs.
Extended European Search Report for European Application No. 11848308.0, Search completed Jan. 13, 2016, dated Jan. 22, 2016, 10 Pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 pgs.
Extended European Search Report for European Application No. 14860103.2, Search completed Feb. 23, 2017, dated Mar. 3, 2017, 7 Pgs.
Extended European Search Report for European Application No. 14865463.5, Search completed May 30, 2017, dated Jun. 8, 2017, 6 Pgs.
Extended European Search Report for European Application No. 15847754.7, Search completed Jan. 25, 2018, dated Feb. 9, 2018, 8 Pgs.
Extended European Search Report for European Application No. 18151530.5, Completed Mar. 28, 2018, dated Apr. 20, 2018,11 pages.
Extended European Search Report for European Application No. 18205326.4, Search completed Jan. 8, 2019 , dated Jan. 18, 2019, 9 Pgs.
International Preliminary Report on Patentability for International Application No. PCT/US2009/044687, Completed Jul. 30, 2010, 9 pgs.

(56) References Cited

OTHER PUBLICATIONS

International Preliminary Report on Patentability for International Application No. PCT/US2012/056151, Report dated Mar. 25, 2014, 9 pgs.
International Preliminary Report on Patentability for International Application No. PCT/US2012/056166, Report dated Mar. 25, 2014, Report dated Apr. 3, 2014 8 pgs.
International Preliminary Report on Patentability for International Application No. PCT/US2012/058093, Report dated Sep. 18, 2013, dated Oct. 22, 2013, 40 pgs.
International Preliminary Report on Patentability for International Application No. PCT/US2012/059813, Search Completed Apr. 15, 2014, 7 pgs.
International Preliminary Report on Patentability for International Application No. PCT/US2013/059991, dated Mar. 17, 2015, dated Mar. 26, 2015, 8 pgs.
International Preliminary Report on Patentability for International Application PCT /US2015/032467, Report dated Nov. 29, 2016, dated Dec. 8, 2016, 9 Pgs.
International Preliminary Report on Patentability for International Application PCT/US10/057661, dated May 22, 2012, dated May 31, 2012, 10 pages.
International Preliminary Report on Patentability for International Application PCT/US11/036349, Report dated Nov. 13, 2012, dated Nov. 22, 2012, 9 pages.
International Preliminary Report on Patentability for International Application PCT/US13/56065, dated Feb. 24, 2015, dated Mar. 5, 2015, 4 Pgs.
International Preliminary Report on Patentability for International Application PCT/US2011/064921, dated Jun. 18, 2013, dated Jun. 27, 2013, 14 pgs.
International Preliminary Report on Patentability for International Application PCT/US2013/024987, dated Aug. 12, 2014, 13 Pgs.
International Preliminary Report on Patentability for International Application PCT/US2013/027146, completed Aug. 26, 2014, dated Sep. 4, 2014, 10 Pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, dated Jan. 8, 2015, 6 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, dated Feb. 24, 2015, dated Mar. 5, 2015, 7 Pgs.
International Preliminary Report on Patentability for International Application PCT/US2013/069932, dated May 19, 2015, dated May 28, 2015, 12 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/018116, dated Sep. 15, 2015, dated Sep. 24, 2015, 12 Pgs.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4 pgs.
International Preliminary Report on Patentability for International Application PCT/US2014/022123, dated Sep. 8, 2015, dated Sep. 17, 2015, 4 Pgs.
International Preliminary Report on Patentability for International Application PCT/US2014/022774, dated Sep. 22, 2015, dated Oct. 1, 2015, 5 Pgs.
International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/029052, dated Sep. 15, 2015, dated Sep. 24, 2015, 9 Pgs.
International Preliminary Report on Patentability for International Application PCT/US2014/030692, dated Sep. 15, 2015, dated Sep. 24, 2015, 6 Pgs.
International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 2, 2016, 9 Pgs.
International Preliminary Report on Patentability for International Application PCT/US2014/067740, dated May 31, 2016, dated Jun. 9, 2016, 9 Pgs.
International Preliminary Report on Patentability for International Application PCT/US2015/019529, dated Sep. 13, 2016, dated Sep. 22, 2016, 9 Pgs.
International Preliminary Report on Patentability for International Application PCT/US2015/053013, dated Apr. 4, 2017, dated Apr. 13, 2017, 8 Pgs.
International Preliminary Report on Patentability for International Application PCT/US13/62720, dated Mar. 31, 2015, dated Apr. 9, 2015, 8 Pgs.
International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2012/056166, Report Completed Nov. 10, 2012, dated Nov. 20, 2012, 9 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.

(56) References Cited

OTHER PUBLICATIONS

International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application No. PCT/US2015/032467, Search completed Jul. 27, 2015, dated Aug. 19, 2015, 10 Pgs.
International Search Report and Written Opinion for International Application No. PCT/US2015/053013, completed Dec. 1, 2015, dated Dec. 30, 2015, 9 Pgs.
International Search Report and Written Opinion for International Application PCT/US11/36349, dated Aug. 22, 2011, 11 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/17766, completed May 28, 2014, dated Jun. 18, 2014, 9 Pgs.
International Search Report and Written Opinion for International Application PCT/US14/18084, completed May 23, 2014, dated Jun. 10, 2014, 12 pgs.
International Search Report and Written Opinion for International Application PCT/US14/18116, Report completed May 13, 2014, 12 pgs.
International Search Report and Written Opinion for International Application PCT/US14/21439, completed Jun. 5, 2014, dated Jun. 20, 2014, 10 Pgs.
International Search Report and Written Opinion for International Application PCT/US14/22118, completed Jun. 9, 2014, dated Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug. 7, 2014, 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2009/044687, completed Jan. 5, 2010, dated Jan. 13, 2010, 9 pgs.
International Search Report and Written Opinion for International Application PCT/US2010/057661, completed Mar. 9, 2011, 14 pgs.
International Search Report and Written Opinion for International Application PCT/US2011/064921, completed Feb. 25, 2011, dated Mar. 6, 2012, 17 pgs.
International Search Report and Written Opinion for International Application PCT/US2012/037670, dated Jul. 18, 2012, Completed Jul. 5, 2012, 9 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/058093, Report completed Nov. 15, 2012, 12 pgs.
International Search Report and Written Opinion for International Application PCT/US2012/059813, completed Dec. 17, 2012, 8 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/029052, completed Jun. 30, 2014, dated Jul. 24, 2014, 10 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
Supplementary European Search Report for EP Application No. 13831768.0, Search completed May 18, 2016, dated May 30, 2016, 13 Pgs.
Supplementary European Search Report for European Application 09763194.9, completed Nov. 7, 2011, dated Nov. 29, 2011, 9 pgs.
U.S. Appl. No. 61/527,007, filed Aug. 24, 2011, 21 pgs.
Notice of Allowance Received, U.S. Appl. No. 12/935,504, dated Jul. 18, 2014, 12 pgs.
International Preliminary Report on Patentability for International Application PCT/US13/62720, Report dated Mar. 31, 2015, dated Apr. 9, 2015, 8 Pgs.
International Preliminary Report on Patentability for International Application PCT/US2013/027146, International Filing Date Feb. 21, 2013, Report dated Aug. 26, 2014, 10 pgs.
International Search Report and Written Opinion for International Application No. PCT/US2009/044687, date completed Jan. 5, 2010, dated Jan. 13, 2010, 9 pgs.
International Search Report and Written Opinion for International Application PCT/US14/18116, completed May 13, 2014, dated Jun. 2, 2014, 12 Pgs.
International Search Report for International Application No. PCT/US2009/044687, date completed Jan. 5, 2010, dated Jan. 13, 2010, 4 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Wang, "Calculation Image Position, Size and Orientation Using First Order Properties", Dec. 29, 2010, OPTI521 Tutorial, 10 pgs.
U.S. Appl. No. 12/952,134, Notice of Allowance Received, Notice of Allowance Received, U.S. Appl. No. 12/952,134, dated Jul. 24, 2014, 8 pgs.
Aufderheide et al., "A MEMS-based Smart Sensor System for Estimation of Camera Pose for Computer Vision Applications", Research and Innovation Conference 2011, Jul. 29, 2011, pp. 1-10.

(56) References Cited

OTHER PUBLICATIONS

Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, May 2007, published Apr. 16, 2007, vol. 16, No. 5, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance is an Implicit Visual Cue for Social Judgments of Faces", PLOS One, vol. 7, Issue 9, Sep. 26, 2012, e45301, doi:10.1371/journal.pone. 0045301, 9 pages.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ISASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", Symposium on Interactive 3D Graphics, 2005, pp. 139-146.
Chen et al., "KNN matting", 2012 IEEE Conference on Computer Vision and Pattern Recognition, Jun. 16-21, 2012, Providence, RI, USA, pp. 869-876.
Chen et al., "KNN Matting", IEEE Transactions on Pattern Analysis and Machine Intelligence, Sep. 2013, vol. 35, No. 9, pp. 2175-2188.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Recovering High Dynamic Range Radiance Maps from Photographs", Computer Graphics (ACM SIGGRAPH Proceedings), Aug. 16, 1997, 10 pgs.
Do, Minh N., "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP. 2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.

(56) References Cited

OTHER PUBLICATIONS

Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., , "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.

Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of I3D, Jan. 1, 2007, pp. 121-128.
Isaksen et al., "Dynamically Reparameterized Light Fields", In Proceedings of SIGGRAPH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), Jun. 17-22, 2006, vol. 1, New York, NY, USA, pp. 371-378.
Joshi, Neel S., "Color Calibration for Arrays of Inexpensive Image Sensors", Master's with Distinction in Research Report, Stanford University, Department of Computer Science, Mar. 2004, 30 pgs.
Joshi et al., "Synthetic Aperture Tracking: Tracking Through Occlusions", I CCV IEEE 11th International Conference on Computer

(56) References Cited

OTHER PUBLICATIONS

Vision; Publication [online]. Oct. 2007 [retrieved Jul. 28, 2014]. Retrieved from the Internet: <URL: http:l/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Konolige, Kurt, "Projected Texture Stereo", 2010 IEEE International Conference on Robotics and Automation, May 3-7, 2010, p. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al.,"Nonlocal matting", CVPR 2011, Jun. 20-25, 2011, pp. 2193-2200.
LensVector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pages.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng,"Digital Light Field Photography", Thesis, Jul. 2006, 203 pgs.
Ng et al., "Light Field Photography with a Hand-held Plenoptic Camera", Stanford Tech Report CTSR Feb. 2005, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H.K., "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-23.
Parkkinen et al., "Characteristic Spectra of Munsell Colors", Journal of the Optical Society of America A, vol. 6, Issue 2, Feb. 1989, pp. 318-332.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.

(56) References Cited

OTHER PUBLICATIONS

Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction :A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs, DOI: 10.1109/ICCV.1998.710696 • Source: DBLP Conference: Computer Vision, Sixth International Conference.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", in Visual Communications and Image Processing 2000, May 2000, vol. 4067, pp. 2-13.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park—Observational Astronomy (ASTR 310), Oct. 19, 2006, pp. 1-5 [online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL Jan. 2001, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Con-

(56) References Cited

OTHER PUBLICATIONS trast Enhancement Technology", Annals of Biomedical Engineering, vol. 34, No. 12, Dec. 2006, pp. 1870-1878, Published online Oct. 12, 2006.

Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.

Wilburn, "High Performance Imaging Using Arrays of Inexpensive Cameras", Thesis of Bennett Wilburn, Dec. 2004, 128 pgs.

Wilburn et al., "High Performance Imaging Using Large Camera Arrays", ACM Transactions on Graphics, Jul. 2005, vol. 24, No. 3, pp. 1-12.

Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.

Wilburn et al., "The Light Field Video Camera", Proceedings of Media Processors 2002, SPIE Electronic Imaging, 2002, 8 pgs.

Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.

Wu et al., "A virtual view synthesis algorithm based on image inpainting", 2012 Third International Conference on Networking and Distributed Computing, Hangzhou, China, Oct. 21-24, 2012, pp. 153-156.

Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

Yang et al., "A Real-Time Distributed Light Field Camera", Eurographics Workshop on Rendering (2002), published Jul. 26, 2002, pp. 1-10.

Yang et al., "Superresolution Using Preconditioned Conjugate Gradient Method", Proceedings of SPIE—The International Society for Optical Engineering, Jul. 2002, 8 pgs.

Yokochi et al., "Extrinsic Camera Parameter Estimation Based-on Feature Tracking and GPS Data", 2006, Nara Institute of Science and Technology, Graduate School of Information Science, LNCS 3851, pp. 369-378.

Zhang et al., "A Self-Reconfigurable Camera Array", Eurographics Symposium on Rendering, published Aug. 8, 2004, 12 pgs.

Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.

Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.

Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.

Zomet et al., "Robust Super-Resolution", IEEE, 2001, pp. 1-6.

\* cited by examiner

SYSTEMS AND METHODS FOR SYNTHESIZING HIGH RESOLUTION IMAGES USING IMAGES CAPTURED BY AN ARRAY OF INDEPENDENTLY CONTROLLABLE IMAGERS

CROSS-REFERENCE TO RELATED APPLICATION

This application is a continuation of U.S. patent application Ser. No. 16/521,365, entitled "Systems and Methods for Synthesizing High Resolution Images Using Images Captured by an Array Of Independently Controllable Imagers" filed on Jul. 24, 2019, which application is a continuation of U.S. patent application Ser. No. 15/170,788, entitled "Systems and Methods for Synthesizing High Resolution Images Using Images Captured by an Array Of Independently Controllable Imagers" filed on Jun. 1, 2016, which application is a continuation of U.S. patent application Ser. No. 14/519,659, entitled "Systems and Methods for Synthesizing High Resolution Images Using Images Captured by an Array Of Independently Controllable Imagers" filed on Oct. 21, 2014, which application is a continuation of U.S. patent application Ser. No. 12/967,807, entitled "Systems and Methods for Synthesizing High Resolution Images Using Super-Resolution Processes", filed on Dec. 14, 2010. The disclosures of these applications are hereby incorporated by reference herein in their entirety.

FIELD OF THE INVENTION

The present invention generally relates to imaging and more specifically relates to array cameras that utilize super resolution processes to synthesize high resolution images from multiple low resolution images.

BACKGROUND

In a typical imaging device, light enters through an opening (aperture) at one end of the imaging device and is directed to an image sensor by one or more optical elements such as lenses. The image sensor consists of pixels that generate signals upon receiving light via the optical element. Commonly used image sensors include charge-coupled device image sensors (CCDs) and complementary metal-oxide semiconductor (CMOS) sensors.

Conventional digital cameras typically achieve color separation by performing color separation in the optical path and using a separate image sensor for the wavelengths of light corresponding to each of the primary colors (i.e. RGB), using an image sensor with color separation and multiple signal collection capability within each pixel, or by applying filters over a single sensor so that individual pixels detect wavelengths of light corresponding to one of the primary colors. Use of filters is particularly common in cameras that have a small form factor, such as cameras incorporated in mobile phone handsets and other consumer electronics devices including but not limited to, laptop computers and televisions. A common filter that is formed on image sensors is the Bayer filter, the pattern of which includes 50% green filters, 25% red filters, and 25% blue filters. The output of an image sensor to which a Bayer filter is applied can be reconstructed as a color image using interpolation techniques.

Image sensors are subject to various performance constraints including, among others, dynamic range, signal to noise (SNR) ratio and low light sensitivity. The dynamic range is defined as the ratio of the maximum possible signal that can be captured by a pixel to the total noise signal. The SNR of a captured image is, to a great extent, a measure of image quality. In general, as more light is captured by the pixel, the higher the SNR. The light sensitivity of an image sensor is typically determined by the intensity of light incident upon the sensor pixels. At low light levels, each pixel's light gathering capability is constrained by the low signal levels incident upon each pixel.

A challenge associated with increasing the number of pixels in an image sensor is that the lens system is dimensioned to span the image sensor. The problem is most acute with mobile cameras, such as those used in mobile phones and consumer electronics devices, where the form factor of the lens system can significantly impact the overall form factor of the mobile device.

In response to the constraints placed upon a traditional digital camera based upon the camera obscura, a new class of cameras that can be referred to as array cameras have been proposed. Array cameras are characterized in that they include multiple arrays of pixels, each having a separate lens system. Examples of 2, 3 and 4 array cameras in which each array of pixels captures light from a different band of the visible spectrum and the captured images are combined to create a full color image is disclosed in U.S. Pat. No. 7,199,348 to Olsen et al., the disclosure of which is incorporated by reference herein in its entirety. U.S. Pat. No. 7,262,799 to Suda, the disclosure of which is incorporated herein by reference in its entirety, discloses a 2×2 array camera including one sensor used to sense a red (R) image signal, one sensor used to sense a blue (B) image signal and, two sensors used to sense green (G) image signals.

SUMMARY OF THE INVENTION

Systems and methods are disclosed that use super-resolution (SR) processes to fuse information from a plurality of low resolution images captured by an imager array to synthesize a high resolution image. In many embodiments, the objective and subjective quality of the obtained super-resolution image is increased through signal restoration. In several embodiments, the SR process incorporates cross-channel fusion. In a number of embodiments, the imager array includes imagers having different fields of view. In many embodiments, aliasing is introduced into the low resolution images to enable improved recovery of high frequency information through SR processing.

One embodiment includes obtaining input images using the plurality of imagers, determining an initial estimate of at least a portion of a high resolution image using a plurality of pixels from the input images, determining a high resolution image that when mapped through the forward imaging transformation matches the input images to within at least one predetermined criterion using the initial estimate of at least a portion of the high resolution image. In addition, each forward imaging transformation corresponds to the manner in which each imager in the imaging array generate the input images, and wherein the high resolution image has a resolution that is greater than any of the input images.

In a further embodiment, the forward imaging transformation includes a blur function, and decimation.

In another embodiment, the blur function further includes a lens blur function for each imager, and a sensor blur function for each imager.

In a still further embodiment, the forward imaging transformation further includes applying geometric transformations related to the geometry of the imagers.

In still another embodiment, the forward imaging transformation further includes applying geometric transformations related to parallax.

In a yet further embodiment, the forward imaging transformation further includes applying photometric transformations related to the photometric characteristics of the imagers.

In yet another embodiment, the method uses an imaging prior including photometric calibration data and obtaining input images using the plurality of imagers further includes capturing images using the plurality of imagers, and photometrically normalizing each of the captured images using the photometric calibration data to obtain the input images.

In a further embodiment again, the method uses an imaging prior including geometric calibration data and obtaining images using the plurality of imagers further includes capturing images using the plurality of imagers, and applying scene independent geometric corrections to the captured images using the geometric calibration data to obtain the input images.

Another embodiment again further includes determining scene dependent parallax information with respect to the input images.

In a further additional embodiment, the parallax information includes scene dependent geometric transformations.

In another additional embodiment, the parallax information also includes occlusion maps.

In a still yet further embodiment, determining an initial estimate of at least a portion of a high resolution image using a plurality of pixels from the captured images further includes fusing at least portions of the input images to form the initial estimate of at least one portion of the high resolution image.

In still yet another embodiment, fusing at least portions of the input images to form the initial estimate of at least one portion of the high resolution image includes populating a high resolution grid corresponding to the pixel locations of the at least a portion of the initial estimate of the high resolution image with pixels from the input images using geometric correction information, and interpolating the high resolution grid to obtain filtered pixel values for each pixel in the initial estimate of the high resolution image.

In a still further embodiment again, interpolating the high resolution grid to obtain filtered pixel values for each pixel in the initial estimate of the high resolution image includes interpolating pixel values at pixel locations on the high resolution grid on which no pixel from an input image is located.

In still another embodiment again, the geometric correction information is selected from the group made up of scene independent geometric corrections, and scene dependent parallax corrections, and combinations thereof.

In a still further additional embodiment, fusing at least portions of the input images to form the initial estimate of at least one portion of the high resolution image further includes assigning a depth value for each pixel on the high resolution grid, and using the depth values to direct the interpolation of the high resolution grid.

In still another additional embodiment, using the depth values to direct the interpolation of the high resolution grid includes assigning relative weights to the pixels that are interpolated based upon their depth value, and interpolating the pixels using their assigned weights.

A yet further embodiment again also includes determining a high resolution occlusion map. In addition, using the depth values to direct the interpolation of the high resolution grid includes identifying a pixel within an occlusion zone using the high resolution occlusion map, identifying a neighborhood of pixels around the identified pixel, and performing interpolation using only those pixels whose depth is greater than a threshold.

In yet another embodiment again, the neighborhood of pixels varies in size based upon the number of pixels populated onto the high resolution grid in the neighborhood of the identified pixel.

In a yet further additional embodiment, fusing at least portions of the input resolution images to form the initial estimate of at least one portion of the high resolution image further includes performing filtering to remove pixels that are outliers from the high resolution grid.

In yet another additional embodiment, fusing at least portions of the input images to form the initial estimate of at least one portion of the high resolution image includes populating a high resolution grid corresponding to the pixel locations of the at least a portion of the initial estimate of the high resolution image with pixels from the input images using geometric correction information, obtaining at least a portion of an image from another color channel, wherein the at least a portion of the image from the other color channel is at least as high resolution as the high resolution grid, and interpolating the high resolution grid to obtain pixel values for each pixel in the initial estimate of the high resolution image using cross correlation between the pixels on the high resolution grid and the at least a portion of the image from the other color channel.

In a further additional embodiment again, determining a high resolution image that when mapped through the forward imaging transformation matches the input images to within at least one predetermined criterion using the initial estimate of at least a portion of the high resolution image includes transforming the initial estimate of at least a portion of the high resolution image using at least one forward imaging transformation, comparing the transformed initial estimate of at least a portion of the high resolution image to at least a portion of at least one input image, and refining the estimate of the high resolution image based upon the comparison.

In another additional embodiment again, determining a high resolution image that when mapped through the forward imaging transformation matches the input images to within at least one predetermined criterion using the initial estimate of at least a portion of the high resolution image further includes transforming, comparing and refining estimates until the at least one predetermined criterion is satisfied.

In a still yet further embodiment again, transforming an estimate of at least a portion of the high resolution image using at least one forward imaging transformation, includes applying geometric transformations to the pixels of the estimate of at least a portion of the high resolution image, applying a blur function to the pixels of the estimate of at least a portion of the high resolution image, and decimating the warped and blurred pixels of the estimate of at least a portion of the high resolution image.

In still yet another embodiment again, the blur function includes a lens blur function, and a sensor blur function.

In a still yet further additional embodiment, the geometric transformations are selected from the group made up of scene independent geometric transformations, scene dependent parallax transformations, and combinations thereof.

In still yet another additional embodiment, comparing a transformed estimate of at least a portion of the high resolution image to at least a portion of at least one input image includes using geometric transformations to identify pixels in at least a portion of at least one input image that correspond to pixels in the transformed estimate of at least a portion of the high resolution image, and determining differences between pixels in the transformed estimate of at least a portion of the high resolution image and the identified corresponding pixels in at least a portion of at least one input image.

In a still yet further additional embodiment again, using geometric transformations to identify pixels in at least a portion of at least one input image that correspond to pixels in the transformed estimate of at a least a portion of the high resolution image includes identifying the pixel in the input image specified by the geometric transformation for at least a pixel from the transformed estimate of at least a portion of the high resolution image, when a geometric transformation exists for the pixel in the transformed estimate of at least a portion of the high resolution image, and identifying a pixel in at least one input image based upon the geometric transformations of pixels in the neighborhood of a pixel from the transformed estimate of at least a portion of the high resolution image, when a geometric transformation does not exist for the pixel in the transformed estimate of at least a portion of the high resolution image.

In still yet another additional embodiment again, determining differences between pixels in the transformed estimate of at least a portion of the high resolution image and the identified corresponding pixels in at least a portion of at least one input image includes determining the difference in value between a pixel in the transformed estimate of at least a portion of the high resolution image and each of the identified corresponding pixels in the input images, assigning weights to the determined differences in values, and accumulating a weighted difference using the determined differences in value and the assigned weights.

In an alternate embodiment, determining differences between pixels in the transformed estimate of at least a portion of the high resolution image and the identified corresponding pixels in at least a portion of at least one input image further includes determining the difference in value between a pixel in the transformed estimate of at least a portion of the high resolution image and pixels within the neighborhood of each of the identified corresponding pixels in the input images.

In a further alternate embodiment, assigning a weight to the determined difference in values between a pixel in the transformed estimate of at least a portion of the high resolution image and a corresponding pixel in an input image further includes computing a weight based upon a decimated neighborhood of pixels surrounding the pixel in the transformed estimate of at least a portion of the high resolution image and the neighborhood of pixels surrounding the corresponding pixel in the input image.

Another alternate embodiment further includes accumulating the weights used to accumulate the weighted difference.

In a still further alternate embodiment, comparing a transformed estimate of at least a portion of the high resolution image to at least a portion of at least one input image includes determining differences between pixels in the transformed estimate of at least a portion of the high resolution image and pixels in at least a portion of at least one input image.

In a yet further alternate embodiment, determining differences between pixels in the transformed estimate of at least a portion of the high resolution image and pixels in at least a portion of at least one input image includes determining the difference in value between a pixel in the transformed estimate of at least a portion of the high resolution image and each corresponding pixel in the input images, assigning weights to the determined differences in values, and filtering the differences in values using the assigned weights.

In yet another alternate embodiment, determining differences between pixels in the transformed estimate of at least a portion of the high resolution image and pixels in at least a portion of at least one input image further includes determining the difference in value between a pixel in the transformed estimate of at least a portion of the high resolution image and pixels within the neighborhood of the corresponding pixels in the input images.

In a further alternate embodiment again, assigning a weight to the determined difference in values between a pixel in the transformed estimate of at least a portion of the high resolution image and a corresponding pixel in an input image further includes computing a weight based upon a decimated neighborhood of pixels surrounding the pixel in the transformed estimate of at least a portion of the high resolution image and the neighborhood of pixels surrounding the corresponding pixel in the input image.

Another alternate embodiment again also includes accumulating the weights used to accumulate the weighted difference.

In a further alternate additional embodiment, refining the estimate of the high resolution image based upon the comparison includes mapping the comparison of the transformed initial estimate of at least a portion of the high resolution image and the at least a portion of at least one input image through a backward imaging transformation, which is the reverse of the forward imaging transformation, and updating the estimate using at least the transformed comparison.

In another alternate additional embodiment, the comparison of the transformed initial estimate of at least a portion of the high resolution image and the at least a portion of at least one input image includes weighted gradients for at least a portion of the initial estimate of the high resolution image and corresponding accumulated weights.

In a still yet further alternate embodiment, the weights of the weighted gradients are all equal.

In still yet another alternate embodiment, mapping the comparison of the transformed initial estimate of at least a portion of the high resolution image and the at least a portion of at least one input image through a backward imaging transformation, which is the reverse of the forward imaging transformation, includes upsampling the weighted gradients and the accumulated weights.

A still further alternate embodiment again also includes applying a blur function to the upsampled weighted gradients and the accumulated weights, and applying geometric corrections to the blurred and upsampled weighted gradients and the accumulated weights, accumulating the geometrically corrected blurred and upsampled weighted gradients and accumulated weights, and normalizing the accumulated geometrically corrected, blurred and upsampled weighted gradients using the accumulated weights.

In still another alternate embodiment again, the blur function includes the transpose of a lens blur function, and the transpose of a sensor blur function.

In a still further alternate additional embodiment, the geometric corrections are selected from the group made up of the reverse of the scene independent geometric transformations, the reverse of the scene dependent geometric transformations, and combinations thereof.

In still another alternate additional embodiment, updating the estimate using at least the transformed comparison includes modifying the initial estimate by combining the initial estimate of at least a portion of the high resolution image with at least the backward transformed comparison.

A yet further alternate embodiment again also includes generating an intra-channel prior gradient, and updating the estimate using an intra-channel prior gradient. In addition, the intra-channel prior gradient term is determined so that updating the estimate using the intra-channel prior gradient enforces localized image constraints.

In yet another alternate embodiment again, the imager array is configured to capture images in multiple color channels, the method further includes generating an inter-channel prior gradient, and updating the estimate using the inter-channel prior gradient. In addition, the inter-channel prior gradient is determined so that updating the estimate using the inter-channel prior gradient enforces cross-channel image constraints.

In a yet further alternate additional embodiment, determining a high resolution image that when mapped through the forward imaging transformation matches the input images to within at least one predetermined criterion using the initial estimate of at least a portion of the high resolution image, includes identifying pixels in the initial estimate of at least a portion of the high resolution image corresponding to pixels in at least one input image using at least one forward imaging transformation, comparing the corresponding pixels, and refining the estimate of the high resolution image based upon the comparison.

In yet another alternate additional embodiment, determining a high resolution image that when mapped through the forward imaging transformation matches the input images to within at least one predetermined criterion using the initial estimate of at least a portion of the high resolution image, further includes applying a blur function to pixels in the initial estimate of at least a portion of the high resolution image.

In a further alternate additional embodiment again, the blur function includes a lens blur function, and a sensor blur function.

In another alternate additional embodiment again, identifying pixels in the initial estimate of at least a portion of the high resolution image corresponding to pixels in at least one input image using at least one forward imaging transformation includes selecting a pixel position in the initial estimate of at least a portion of the high resolution image, and using geometric transformations to identify pixels in at least a portion of at least one input image.

In a still yet further alternate embodiment again, the geometric transformations are selected from the group made up of scene independent geometric transformations, scene dependent parallax transformations, and combinations thereof.

In still yet another alternate embodiment again, using geometric transformations to identify pixels in at least a portion of at least one input image includes identifying at least one pixel in the input image specified by the geometric transformation for at least the selected pixel from the initial estimate of at least a portion of the high resolution image, when a geometric transformation exists for the pixel in the initial estimate of at least a portion of the high resolution image, and identifying at least one pixel in at least one input image based upon the geometric transformations of pixels in the neighborhood of the selected pixel from the initial estimate of at least a portion of the high resolution image, when a geometric transformation does not exist for the pixel in the initial estimate of at least a portion of the high resolution image.

In a still yet further alternate additional embodiment, comparing corresponding pixels includes determining differences between pixels in the initial estimate of at least a portion of the high resolution image and the identified corresponding pixels in at least one input image.

In still yet another alternate additional embodiment, determining differences between pixels in the initial estimate of at least a portion of the high resolution image and the identified corresponding pixels in at least a portion of at least one input image includes determining the difference in value between a pixel in the initial estimate of at least a portion of the high resolution image and each of the identified corresponding pixels in the input images, assigning weights to the determined differences in values, and accumulating a weighted difference using the determined differences in value and the assigned weights.

In a still yet further alternate additional embodiment again, determining differences between pixels in the initial estimate of at least a portion of the high resolution image and the identified corresponding pixels in at least a portion of at least one input image further includes determining the difference in value between a pixel in the initial estimate of at least a portion of the high resolution image and pixels within the neighborhood of each of the identified corresponding pixels in the input images.

In still yet another alternate additional embodiment again, assigning a weight to the determined difference in values between a pixel in the initial estimate of at least a portion of the high resolution image and a corresponding pixel in an input image further includes computing a weight based upon a decimated neighborhood of pixels surrounding the pixel in the initial estimate of at least a portion of the high resolution image and the neighborhood of pixels surrounding the corresponding pixel in the input image.

Another further embodiment also includes accumulating the weights used to accumulate the weighted difference.

In still another further embodiment, refining the estimate of the high resolution image based upon the comparison includes normalizing the accumulated weighted gradients using the accumulated weights, applying a blur function to the normalized gradients, and updating the estimate using the blurred and normalized gradients.

In yet another further embodiment, the blur function includes the transpose of a lens blur function, and the transpose of a sensor blur function.

In another further embodiment again, updating the estimate using the blurred and normalized gradients includes modifying the initial estimate by combining the initial estimate of at least a portion of the high resolution image with at least the blurred and normalized gradients.

Another further additional embodiment, further includes generating an intra-channel prior gradient, and updating the estimate using an intra-channel prior gradient. In addition, the intra-channel prior gradient term is determined so that updating the estimate using the intra-channel prior gradient enforces localized image constraints.

In still yet another further embodiment, the imager array is configured to capture images in multiple color channels, the method further includes generating an inter-channel prior gradient, and updating the estimate using the inter-channel prior gradient. In addition, the inter-channel prior gradient is determined so that updating the estimate using the inter-channel prior gradient enforces cross-channel image constraints.

In still another further embodiment again, determining a high resolution image that when mapped through the forward imaging transformation matches the input images to within at least one predetermined criterion using the initial estimate of at least a portion of the high resolution image includes generating an estimate of at least a portion of the high resolution image, and applying an intra-channel prior filter to the estimate of at least a portion of the high resolution image, where the intra-channel prior filter is configured to preserve edges while removing noise.

In still another further additional embodiment, the intra-channel prior filter is configured to increase the sparseness of the coefficients of a transform, when the transform is applied to the estimate of at least a portion of the high resolution image.

In yet another further embodiment again, increasing the sparseness further comprises thresholding of the transform coefficients according to a predetermined criterion.

In yet another further additional embodiment, the predetermined criterion is selected from the group made up of hard thresholding, soft thresholding, and combinations thereof.

In another further additional embodiment again, the transform is selected from the group made up of sparsifying transforms, wavelets, directional transforms, and combinations thereof.

In still yet another further embodiment again, the imager array captures images in multiple color channels, and the initial estimate of at least a portion of a high resolution image is an initial estimate of at least a portion of a high resolution image in a first color channel.

Still yet another further additional embodiment also includes placing a plurality of pixels from input images in a second color channel on a high resolution grid, and determining at least a portion of a high resolution image in the second color channel using at least the pixels in the second color channel placed on the high resolution grid and at least a portion of a high resolution image in another color channel.

In still another further additional embodiment again, determining at least a portion of a high resolution image in the second color channel using at least the pixels in the second color channel placed on the high resolution grid and at least a portion of a high resolution image in another color channel includes interpolating the pixels on the high resolution grid based upon their correlation with the pixels in the at least a portion of the high resolution image in the other color channel and the correlation between pixels in the high resolution image in the other color channel.

In yet another further additional embodiment again, interpolating the pixels on the high resolution grid based upon their correlation with the pixels in the at least a portion of the high resolution image in the other color channel and the correlation between pixels in the high resolution image in the other color channel comprises interpolating pixel values at pixel locations on the high resolution grid on which no pixel from an input image is located.

In still yet another further additional embodiment again, the high resolution image that is determined using the initial estimate of at a least a portion of the high resolution image in a first color channel that when mapped through the forward imaging transformation matches the input images to within at least one predetermined criterion is a high resolution image in the first color channel.

In another further alternate embodiment, the high resolution image that is determined using the initial estimate of at a least a portion of the high resolution image in a first color channel that when mapped through the forward imaging transformation matches the input images to within at least one predetermined criterion is a high resolution image in multiple color channels.

In still another further alternate embodiment, determining a high resolution image that when mapped through the forward imaging transformation matches the input images to within at least one predetermined criterion using the initial estimate of at least a portion of the high resolution image, includes transforming pixels from an estimate of at least a portion of the high resolution image using at least one forward imaging transformation, comparing the transformed pixels to at least a portion of at least one input image, and refining the estimate of the high resolution image based upon the comparison.

In yet another further alternate embodiment, the pixels from the estimate that are transformed using the forward imaging transformation are selected based upon an estimated high resolution occlusion map.

In another further alternate embodiment again, the pixels from the estimate that are transformed using the forward imaging transformation are selected based upon an estimated high resolution focus map.

In another further alternate additional embodiment, the pixels from the estimate that are transformed using the forward imaging transformation are selected based upon a predetermined threshold with respect to SNR.

In still yet another further alternate embodiment, at least one portion of the initial estimate that is transformed using the forward imaging transformation is selected based upon a comparison of a previous estimate and a portion of at least one input image.

Still another further alternate embodiment again also includes generating a depth map for the high resolution image.

In still another further alternate additional embodiment, generating the depth map further includes determining depth information for pixels in the high resolution image based upon the input images, parallax information, and the characteristics of the imager array, and interpolating the depth information to obtain depth information for every pixel in the high resolution image.

In yet another further alternate embodiment again, the depth map is used to determine a focus map.

In yet another further alternate additional embodiment, the focus map identifies pixels having depths in the depth map that are within a specified depth of a defined focal plane.

Another further alternate additional embodiment again also includes rendering the high resolution image using the focus map.

Still yet another further alternate embodiment again also includes rendering the high resolution image at full resolution having a depth within a specified range of the defined focal plane, blurring the remaining pixels in the high resolution image, and rendering the blurred pixels.

Still yet another further alternate additional embodiment also includes rendering the high resolution image at full resolution having a depth within a specified range of the defined focal plane, blurring the pixels in the input images, and rendering the remainder of the high resolution image using the blurred pixel information from the input images.

In still yet another further alternate additional embodiment again, the depth map is used to perform depth metering.

In a specific embodiment, the high resolution image that when mapped through the forward imaging transformation matches the input images to within at least one predetermined criterion is determined with respect to a first field of view, the method further includes determining a second high resolution image with respect to a second field of view. In addition, the first and second high resolution images form a stereo pair.

In another specific embodiment, determining the second high resolution image with respect to a second field of view further includes determining an initial estimate of at least a portion of the second high resolution image using a plurality of pixels from the input images, and determining a high resolution image that when mapped through the forward imaging transformation matches the input images to within at least one predetermined criterion using the initial estimate of at least a portion of the second high resolution image.

In still another specific embodiment, pixels in the input images are flagged and the flagged pixels are treated as missing values when determining a high resolution image that when mapped through the forward imaging transformation matches the input images to within at least one predetermined criterion using the initial estimate of at least a portion of the high resolution image.

In yet another specific embodiment, the flagged pixels are also treated as missing values when determining an initial estimate of at least a portion of a high resolution image using a plurality of pixels from the input images.

In another specific embodiment again, the imager array includes a plurality of imagers with fields of view that capture different magnifications of the scene.

In another specific additional embodiment, obtaining input images using the plurality of imagers comprises only obtaining images from imagers having fields of view of the same magnification.

In still yet another specific embodiment, the forward imaging transformation includes filtering pixels based upon their magnification.

Still another specific embodiment again includes populating a high resolution grid corresponding to the pixel locations of the at least a portion of a fused high resolution image with pixels from the input images using geometric correction information, assigning a depth value for each pixel on the high resolution grid, and interpolating the high resolution grid to obtain filtered pixel values for each pixel in the initial estimate of the high resolution image, where the depth values are used to direct the interpolation of the high resolution grid.

In still another specific additional embodiment, the geometric correction information is selected from the group made up of scene independent geometric corrections, and scene dependent parallax corrections, and combinations thereof.

In yet another specific embodiment again, using the depth values to direct the interpolation of the high resolution grid includes assigning relative weights to the pixels that are interpolated based upon their depth value, and interpolating the pixels using their assigned weights.

Yet another specific additional embodiment, further includes determining a high resolution occlusion map. In addition, using the depth values to direct the interpolation of the high resolution grid includes identifying a pixel within an occlusion zone using the occlusion map, identifying a neighborhood of pixels around the identified pixel, and performing interpolation using only those pixels whose depth is greater than a threshold.

In another specific additional embodiment again, the neighborhood of pixels varies in size based upon the number of pixels populated onto the high resolution grid in the neighborhood of the identified pixel.

In still yet another specific embodiment again, interpolating the high resolution grid to obtain filtered pixel values for each pixel in the initial estimate of the high resolution image, where the depth values are used to direct the interpolation of the high resolution grid includes interpolating pixel values at pixel locations on the high resolution grid on which no pixel from an input image is located.

Still yet another specific additional embodiment includes obtaining a plurality of images from the imager array, synthesizing a first high resolution image of the scene with respect to a first field of view using pixels from at least two of the plurality of images, and synthesizing a second high resolution image of the scene with respect to a second field of view using pixels from at least two of the plurality of images. In addition, the first and second synthesized images form a stereo pair, and the first and second high resolution images have higher resolution than the resolution of each of the images obtained from the imager array.

In still another specific additional embodiment again, synthesizing an image of a scene with respect to a specific field of view using the pixels from at least two of the plurality of images includes determining an initial estimate of at least a portion of a high resolution image with respect to the field of view using a plurality of pixels from the input images, and determining a high resolution image with respect to the field of view that when mapped through the forward imaging transformation matches the input images to within at least one predetermined criterion using the initial estimate of at least a portion of the high resolution image. In addition, each forward imaging transformation corresponds to the manner in which each imager in the imaging array generate the input images, and the high resolution image has a resolution that is greater than any of the input images.

In yet another specific additional embodiment again, synthesizing an image of a scene with respect to a specific field of view using the pixels from at least two of the plurality of images includes populating a grid corresponding to the pixel locations of at least a portion of the synthesized image with pixels from the input images using geometric correction information with respect to the field of view, and interpolating the high resolution grid to obtain filtered pixel values.

Another further specific embodiment includes an imager array including a plurality of imagers, memory containing parameters defining a forward imaging model for the imager array, and a processor configured to obtain a plurality of input images using the imager array and store the input images in memory. In addition, the processor is configured to determine an initial estimate of at least a portion of a high resolution image using a plurality of pixels from the input images, and the processor is configured to determine a high resolution image that when mapped through the forward imaging transformation matches the input images to within at least one predetermined criterion using the initial estimate of at least a portion of the high resolution image.

Still another further specific embodiment includes an imager array including a plurality of imagers, memory containing parameters defining a forward imaging model for the imager array, and a processor configured to obtain a plurality of input images using the imager array and store the input images in memory. In addition, the processor is configured to synthesizing a stereo pair of high resolution images using the plurality of input images, where each image in the stereo pair is synthesized with respect to a different field of view using pixels from at least two of the plurality of images, and is higher resolution than each of the plurality of input images.

DETAILED DESCRIPTION

Turning now to the drawings, systems and methods in accordance with embodiments of the invention are disclosed that use super-resolution (SR) processes to use information from a plurality of low resolution (LR) images captured by an array camera to produce a synthesized higher resolution image. In a number of embodiments, the SR processes include an initial pilot fusion that serves as an initial estimate for an optimization process that determines optimal SR image estimates. In several embodiments, the optimization process accommodates uncertainty in the upstream processing pipeline. In many embodiments, the optimization process involves using a forward imaging transformation to synthesize LR images in the frame of coordinates of each of the LR imagers in the array camera. In a number of embodiments, the simulated LR images are compared to the input LR images and the comparison used to improve a high resolution (HR) image estimate. In several embodiments, the array camera incorporates imagers having different fields of view. SR processing can be performed on the LR images captured by imagers having the same field of view. Array cameras that incorporate SR processes in accordance with embodiments of the invention are discussed further below.

Array Camera Architecture

Figure 1:
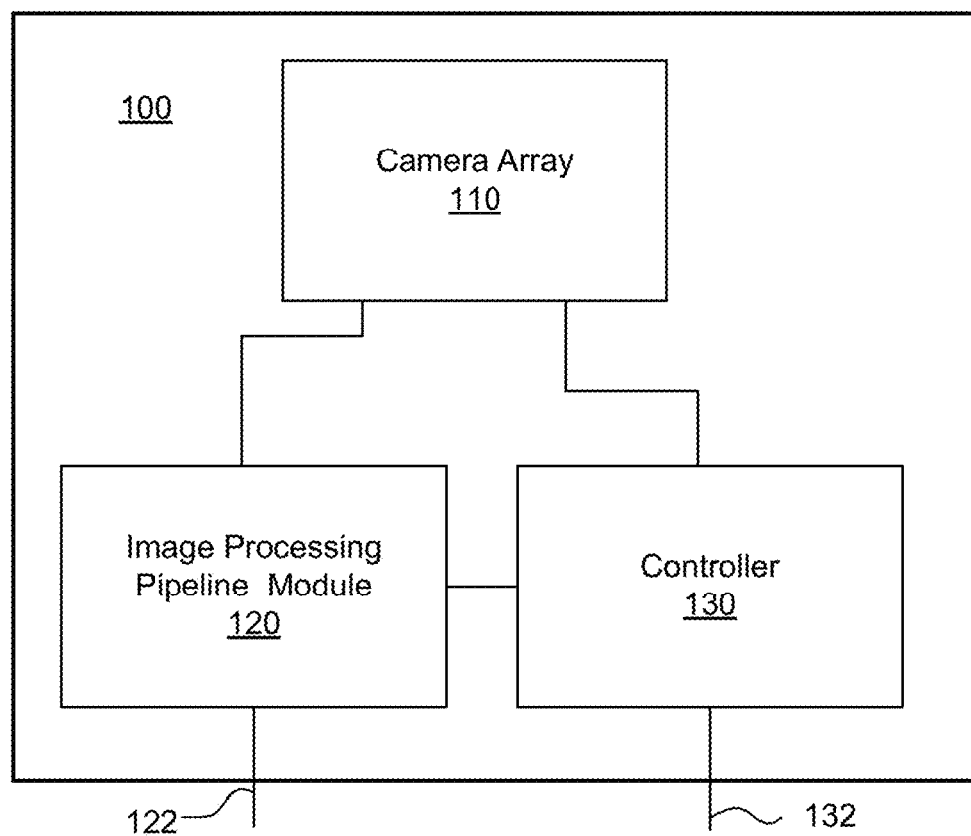
FIG. 1 is a block diagram of an array camera in accordance with an embodiment of the invention.

An array camera architecture that can be used in a variety of array camera configurations in accordance with embodiments of the invention is illustrated in FIG. 1. The array camera 100 includes an imager array 110, which is connected to an image processing pipeline module 120 and to a controller 130.

The imager array includes two or more imagers, each of which receives light through a separate lens system. The imager array can also include other circuitry to control imaging parameters and sensors to sense physical parameters. The control circuitry can control imaging parameters such as exposure times, gain, and black level offset. In one embodiment, the circuitry for controlling imaging parameters may trigger each imager independently or in a synchronized manner. The sensor can include a variety of other sensors, including but not limited to, dark pixels to estimate dark current at the operating temperature. Imager arrays that can be utilized in array cameras in accordance with embodiments of the invention are disclosed in PCT Publication WO 2009/151903 to Venkataraman et al., the disclosure of which is incorporated herein by reference in its entirety.

The image processing pipeline module 120 is hardware, firmware, software, or a combination for processing the images received from the imager array 110. The image processing pipeline module 120 processes the multiple LR images captured by the camera array and produces a synthesized higher resolution image in accordance with an embodiment of the invention. In a number of embodiments, the image processing pipeline module 120 provides the synthesized image data via an output 122.

The controller 130 is hardware, software, firmware, or a combination thereof for controlling various operation parameters of the imager array 110. The controller 130 receives inputs 132 from a user or other external components and sends operation signals to control the imager array 110. The controller 130 can also send information to the image processing pipeline module 120 to assist processing of the LR images captured by the imager array 110.

Although a specific array camera architecture is illustrated in FIG. 1, alternative architectures that enable the capturing of LR images and application of SR processes to produce a synthesized high resolution image can also be utilized in accordance with embodiments of the invention. Operation of array cameras, imager array configurations, and processing of LR images to produce a synthesized HR image in accordance with embodiments of the invention are discussed further below.

Imager Array Configurations

Figure 2A:
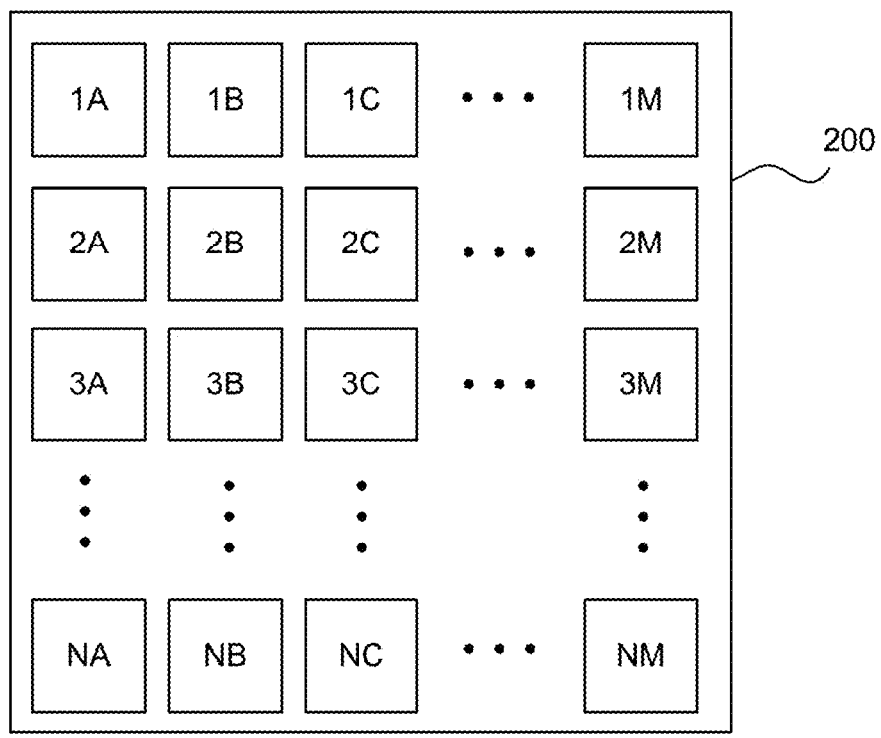
FIGS. 2A-2D illustrate imager configurations of imager arrays in accordance with embodiments of the invention.

As is disclosed in PCT Publication WO 2009/151903, an imager array can include any N×M array of imagers such as the imager array (200) illustrated in FIG. 2A. In several embodiments, the array is square. In other embodiments, the array is rectangular. In a number of embodiments, the array can also be irregular. Each of the imagers typically includes its own filter and/or optical elements and can image different wavelengths of light. In a number of embodiments, the imager array includes imagers that sense red light (R), imagers that sense green light (G), and imagers that sense blue light (B). The human eye is more sensitive to green light than to red and blue light, therefore, an increase in the resolution of a synthesized image can be achieved using an array that includes more imagers that sense green light than imagers that sense red or blue light.

Figure 2B:
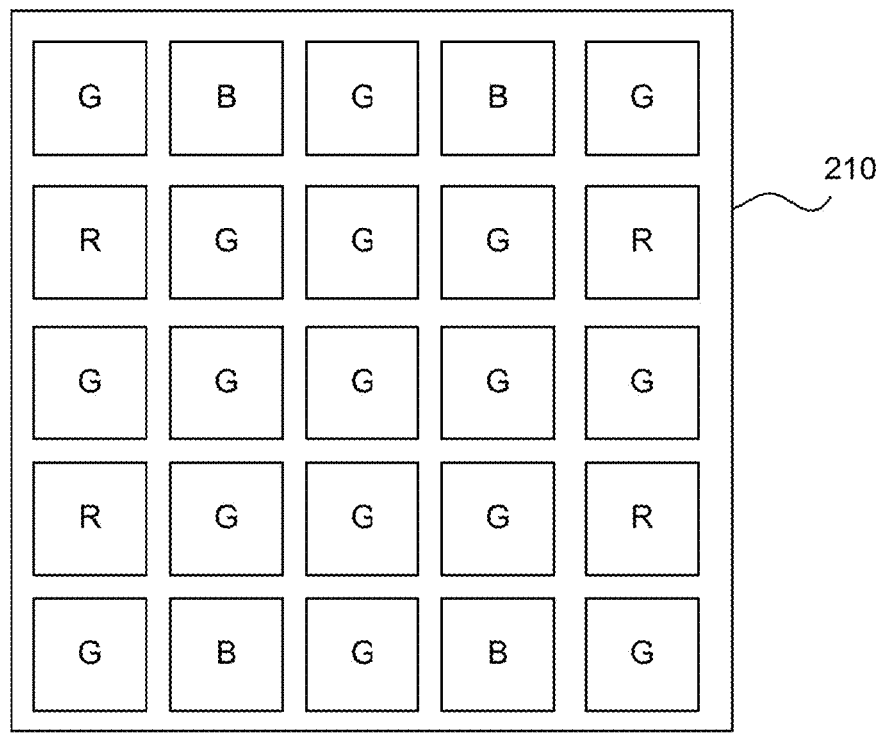
Figure 2C:
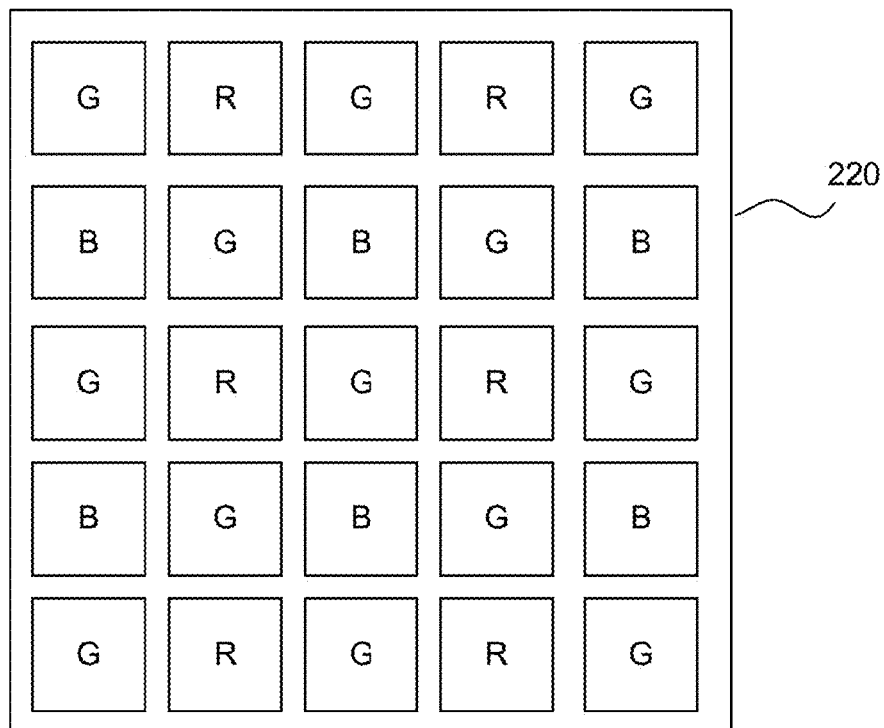
Figure 2D:
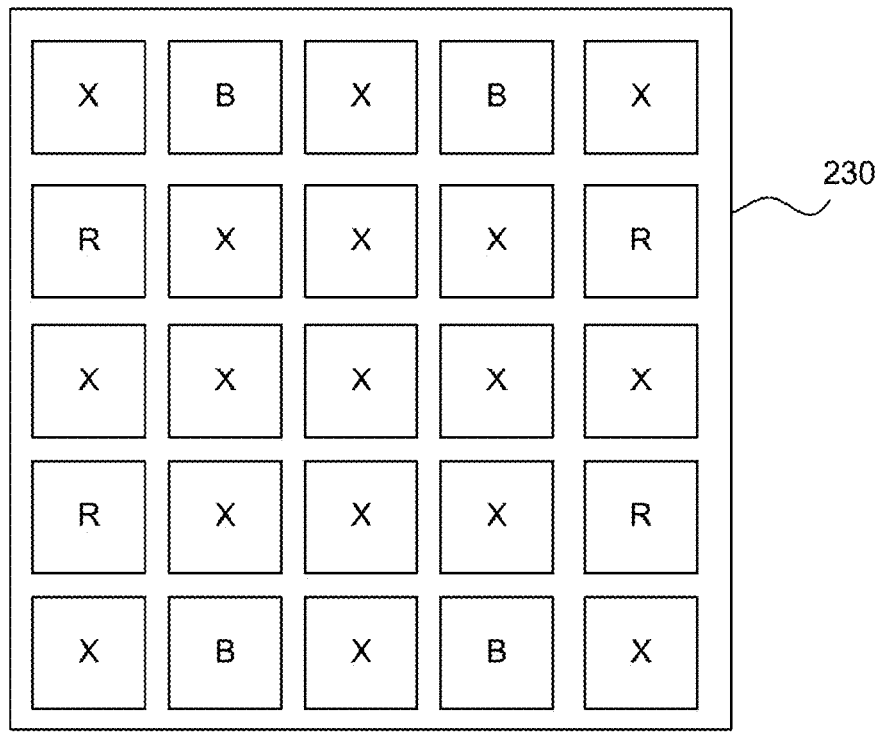

A 5×5 imager array (210) including 17 imagers that sense green light (G), four imagers that sense red light (R), and four imagers that sense blue light (B) is illustrated in FIG. 2B. A 5×5 imager array (220) including 13 imagers that sense green light (G), six imagers that sense red light (R), and six imagers that sense blue light (B) is illustrated in FIG. 2C. In several embodiments, the imager array also includes imagers that sense near-IR wavelengths, which can be used to improve the performance of the array camera in low light conditions. A 5×5 imager array including near-IR sensors is illustrated in FIG. 2D. The imager array 230 includes six imagers that sense red light (R), six imagers that sense blue light (B), nine imagers that sense green light and eight imagers that sense near-IR. The imagers indicated with an X can be either imagers that sense green light or imagers that sense near-IR wavelengths. In many embodiments, the distribution of imagers that sense green light and imagers that sense near-IR wavelengths is determined so that distribution is symmetrical. Although a specific configuration for imagers that sense blue light (B) and imagers that sense red light (R) is illustrated, these imagers can be switched with respect to each other. Additional imager array configurations are disclosed in U.S. Provisional Patent Application Ser. No. 61/281,662 to Venkataraman et al., the disclosure of which is incorporated by reference herein in its entirety.

Each imager in the imager array captures a LR image. Image information captured by imagers, whose sensitivity is tuned by some means (e.g., color filters) to the same portion of the wavelength spectrum, can be considered as constituting a channel of imaging information. When different imagers are tuned to different portions of the wavelength spectrum, then multiple channels of image information are produced that can be provided as inputs to a SR process in accordance with embodiments of the invention. In several embodiments, the imager array captures a single channel of information (B/W), or 3 channels of information (RGB). In many embodiments, the imager array captures the 3 RGB channels and a fourth near-IR channel that can also be used during SR processing to produce a synthesized higher resolution image.

Although specific imager array configurations are disclosed above, any of a variety of regular or irregular layouts of imagers including imagers that sense visible light, portions of the visible light spectrum, near-IR light, other portions of the spectrum and/or combinations of different portions of the spectrum can be utilized to capture LR images that provide one or more channels of information for use in SR processes in accordance with embodiments of the invention. The processing of captured LR images is discussed further below.

Image Processing Pipelines

The processing of LR images to obtain an SR image in accordance with embodiments of the invention typically occurs in an array camera's image processing pipeline. In many embodiments, the image processing pipeline performs processes that register the LR images prior to performing SR processes on the LR images. In several embodiments, the image processing pipeline also performs processes that eliminate problem pixels and compensate for parallax.

Figure 3:
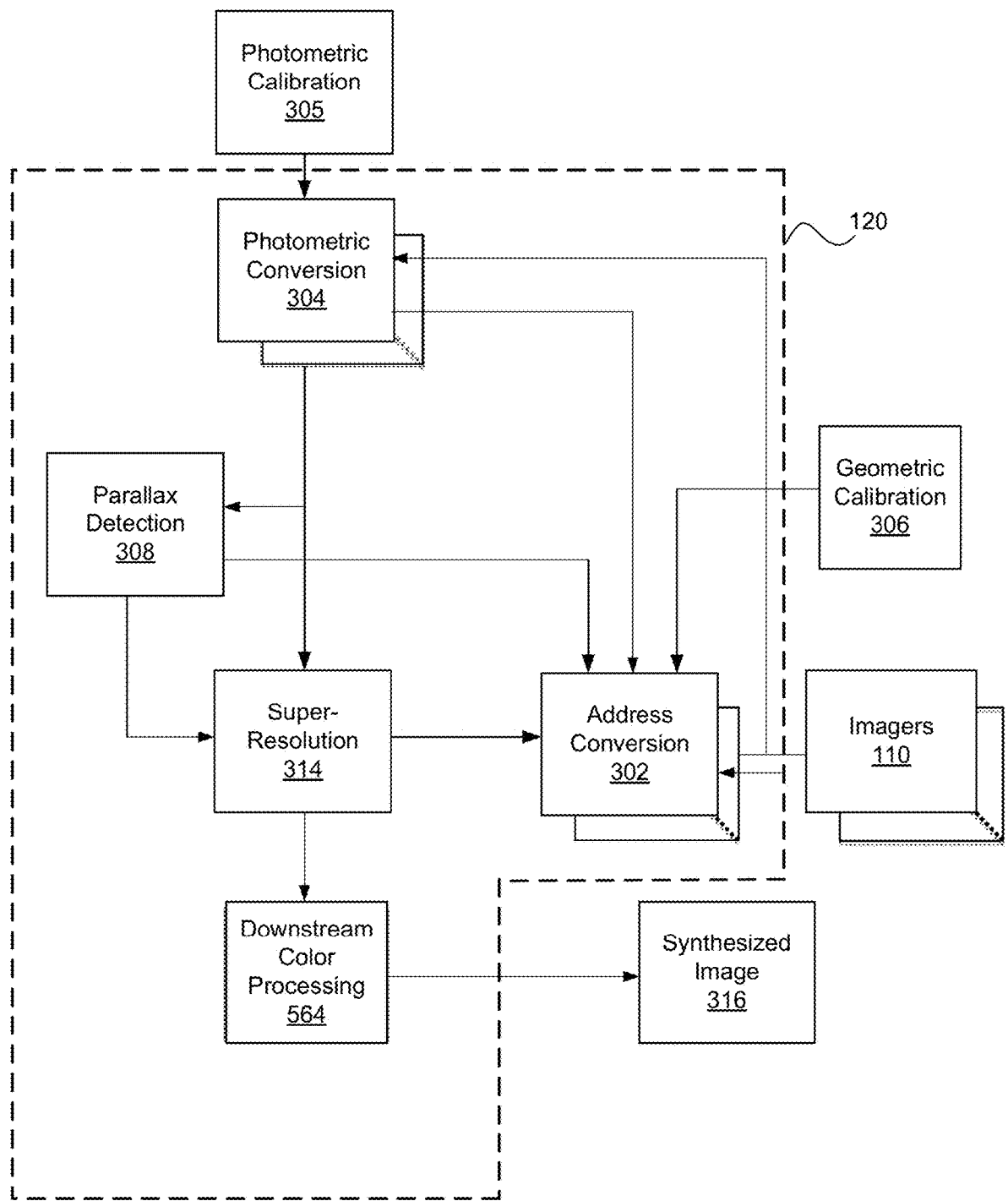
FIG. 3 illustrates an image processing pipeline in accordance with an embodiment of the invention.

An image processing pipeline incorporating a SR module for fusing information from LR images to obtain a synthesized HR image in accordance with an embodiment of the invention is illustrated in FIG. 3. In the illustrated image processing pipeline 120, pixel information is read out from imagers 110 and is provided to a photometric conversion module 304 for photometric normalization. The photometric conversion module can perform any of a variety of photometric image processing processes including but not limited to one or more of photometric normalization, Black Level calculation and adjustments, vignetting correction, and lateral color correction. In several embodiments, the photometric conversion module also performs temperature normalization. In the illustrated embodiment, the inputs of the photometric normalization module are photometric calibration data and the captured LR images. The photometric calibration data is typically captured during an offline calibration process. The output of the photometric conversion module 304 is a set of photometrically normalized LR images. These photometrically normalized images are provided to a parallax detection module 308 and to a super-resolution module 314.

Prior to performing SR processing, the image processing pipeline detects parallax that becomes more apparent as objects in the scene captured by the imager array approach the imager array. In the illustrated embodiment, parallax (or disparity) detection is performed using the parallax detection module 308. In several embodiments, the parallax detection module 308 generates an occlusion map for the occlusion zones around foreground objects. In many embodiments, the occlusion maps are binary maps created for pairs of LR imagers. In many embodiments, occlusion maps are generated to illustrate whether a point in the scene is visible in the field of view of a reference LR imager and whether points in the scene visible within the field of view of the reference imager are visible in the field of view of other imagers. In order to determine parallax, the parallax detection module 308 performs scene independent geometric corrections to the photometrically normalized LR images using geometric calibration data 306 obtained via an address conversion module 302. The parallax detection module can then compare the geometrically and photometrically corrected LR images to detect the presence of scene dependent geometric displacements between LR images. Information concerning these scene dependent geometric displacements can be referred to as parallax information and can be provided to the super-resolution module 314 in the form of scene dependent parallax corrections and occlusion maps. Geometric calibration (or scene-independent geometric correction) data 306 can be generated using an off line calibration process or a subsequent recalibration process. The scene-independent correction information, along with the scene-dependent geometric correction information (parallax) and occlusion maps, form the geometric correction information for the LR images.

Once the parallax information has been generated, the parallax information and the photometrically normalized LR images are provided to the super-resolution module 314 for use in the synthesis of one or more HR images 316. In many embodiments, the super-resolution module 314 performs scene independent and scene dependent geometric corrections (i.e. geometric corrections) using the parallax information and geometric calibration data 306 obtained via the address conversion module 302. The photometrically normalized and geometrically registered LR images are then utilized in the synthesis of an HR image. The synthesized HR image 316 may then be fed to a downstream color processing module 564, which can be implemented using any standard color processing module configured to perform color correction and/or chroma level adjustment. In several embodiments, the color processing module performs operations including but not limited to one or more of white balance, color correction, gamma correction, and RGB to YUV correction.

In a number of embodiments, image processing pipelines in accordance with embodiments of the invention include a dynamic refocus module. The dynamic refocus module enables the user to specify a focal plane within a scene for use when synthesizing an HR image. In several embodiments, the dynamic refocus module builds an estimated HR depth map for the scene. The dynamic refocus module can use the HR depth map to blur the synthesized image to make portions of the scene that do not lie on the focal plane to appear out of focus. In many embodiments, the SR processing is limited to pixels lying on the focal plane and within a specified Z-range around the focal plane.

In several embodiments, the synthesized high resolution image 316 is encoded using any of a variety of standards based or proprietary encoding processes including but not limited to encoding the image in accordance with the JPEG standard developed by the Joint Photographic Experts Group. The encoded image can then be stored in accordance with a file format appropriate to the encoding technique used including but not limited to the JPEG Interchange Format (JIF), the JPEG File Interchange Format (JFIF), or the Exchangeable image file format (Exif).

Processing pipelines similar to the processing pipeline illustrated in FIG. 3 that can also be utilized in an array camera in accordance with embodiments of the invention are described in PCT Publication WO 2009/151903, the disclosure of which is incorporated by reference above. Although a specific image processing pipeline is described above, super-resolution processes in accordance with embodiments of the invention can be used within any of a variety of image processing pipelines that register the LR images prior to super-resolution processing in accordance with embodiments of the invention. Super-resolution modules and super-resolution processes in accordance with embodiments of the invention are discussed further below.

Super-Resolution

SR processes typically use LR input images forming one or more input spectral channels to generate a higher resolution image corresponding to some or all the input spectral channels. The LR images acquired by an imager array in accordance with an embodiment of the invention are typically afflicted by geometric distortions inherent to the optics and manufacturing processes used to fabricate the imager array, which are not scene dependent, and parallax distortions, which are scene dependent. Therefore, SR processes in accordance with embodiments of the invention can use as inputs information about initial scene-independent geometric corrections of the LR images, and about correcting the scene-dependent geometric distortions introduced by parallax in the LR images. The scene-independent geometric corrections and the scene-dependent geometric corrections (i.e., parallax) are referred to as the geometric corrections for the LR images. Any of a variety of spatial registration approaches can be used to determine the information about the scene-independent geometric corrections for the LR imagers, and typically this portion of the spatial registration of the image content of the acquired LR images is generated using the output of well-known geometric calibrations techniques, which can be performed "off-line".

Many SR processes assume very accurate geometric correction (or registration) of LR images prior to SR processing. SR processes in accordance with embodiments of the invention assume uncertainty in the geometric correction of the LR images provided as inputs to the SR processes and estimate the most likely super-resolved image given the uncertainty introduced by the imager design and image processing operations, such as the geometric correction of the LR images, performed prior to the SR processing. In a number of embodiments, the most likely super-resolved image is determined using a Bayesian approach in which an objective function imposes constraints related to the desired characteristics of the synthesized image and fidelity of the synthesized image to the observed LR images. The SR processes can be applied on an entire HR image or on portions of the HR image (i.e. selective SR processing). In other embodiments, alternative optimizations can be performed in which information from the LR images is used to synthesize an HR image with desired characteristics. In several embodiments, the SR process is initialized by performing a pilot fusion process that joins (or places) and processes data from multiple input LR images onto a higher resolution output grid to produce a first fused image. The pilot fusion process can involve filling missing samples on the output grid and filtering potentially misplaced samples. The SR process then uses the pilot fused image along with the original LR images to perform an optimal image fusion and restoration according to a predetermined objective function. The objective function can be designed to enforce the fidelity of the synthesized HR image to the observed data. In several embodiments, fidelity is enforced by passing the synthesized HR image through an image degradation model and can also involve imposing predetermined constraints on the images, including but not limited to intra-channel constraints and inter-channel consistency constraints. Although the SR processes are described above as being initialized by a pilot fusion process, other initial estimates of the HR image estimate appropriate to the requirements of specific applications can be utilized to initialize an SR process in accordance with embodiments of the invention. In addition, SR processing can be applied to one or more portions of the HR image and the portions combined.

In many embodiments, a forward imaging transformation (reflective of an image degradation model) is constructed incorporating an imaging prior that is provided as an input to the SR process. The imaging prior can include but is not limited to modeled or measured information about the optics of the cameras used to capture the LR images in any channel, and information concerning the LR imagers including but not limited to characterized information (e.g. data about noise characteristics), and dynamic sensor information or sensor-state information, such as the analog gain used to capture each of the LR images. A variety of SR processes and the usage of imaging priors in SR processing in accordance with embodiments of the invention are discussed in detail below.

Super-Resolution Processing

Figure 4:
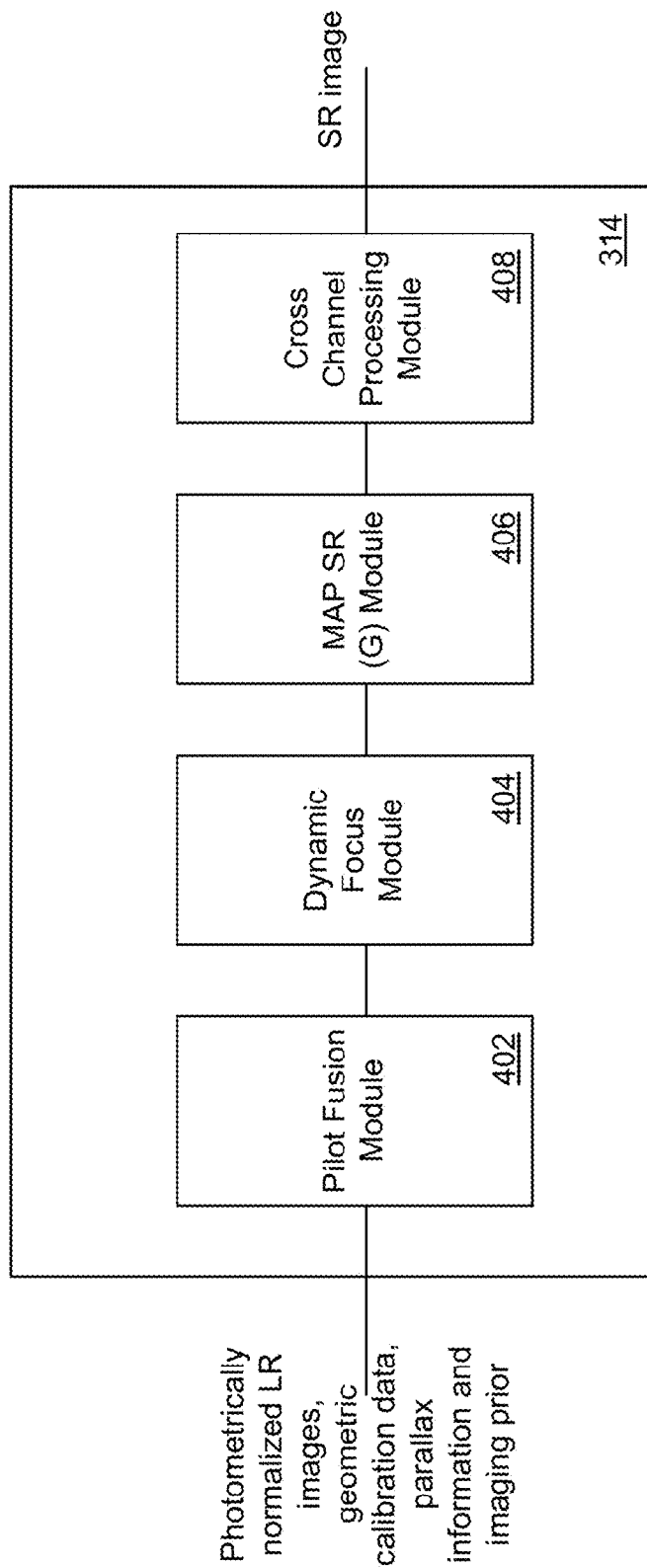
FIG. 4 illustrates a SR module in accordance with an embodiment of the invention.

An SR module in accordance with an embodiment of the invention is conceptually illustrated in FIG. 4. The SR module 314 receives as inputs photometrically normalized image data, in possibly multiple spectral or color channels, and scene-dependent geometric correction information (parallax information) and scene-independent geometric correction information (geometric calibration data). Through a sequence of operations, the SR module generates a higher resolution image corresponding to some or all of the input spectral channels. In many embodiments, the SR module is provided with photometrically normalized LR images and parallax information. In several embodiments, the SR module is provided photometrically normalized and geometrically corrected LR images, and parallax information. In instances in which either parallax or scene independent differences are small, the SR module need not utilize parallax information and/or scene independent geometric calibration data. In many instances, an SR process utilizes information from a channel that is not included in the synthesized HR image. For example, an input near-IR channel may be used by the SR module to generate higher resolution images, however, the SR module may not output a higher resolution near-IR channel. The SR module can also generate HR depth maps, which can be utilized for a variety of purposes, information to allow for dynamic refocusing of HR images, and information for generating LR or HR stereo pair images for use in 3D applications. Where multiple channels are provided to the SR module, each channel has a native resolution (i.e. the resolution in which the imaging information forming the channel was captured). The geometric correction information provided to the SR module is sufficient to register all, or subsets, of the captured LR images in a common system of coordinates and can use a reference system of coordinates, which can be that of an arbitrarily or purposefully-picked image from the LR image set of a channel. Alternatively, all LR input images can be spatially registered across the multiple input spectral channels. Any known spatial registration technique can be used for the purpose of providing registration information as input to an SR process in accordance with embodiments of the invention including ways differing from those outlined above with respect to the image processing pipeline illustrated in FIG. 3. In many embodiments, the SR module also receives as inputs sensor state information such as the analog gain of the imagers used to capture each of the LR images (not shown). In other embodiments, the SR module utilized in SR processing can utilize any of a variety of inputs associated with sensor state. An SR module in accordance with an embodiment of the invention is illustrated in FIG. 4. The SR module 314 includes a Pilot Fusion module 402, a Dynamic Focus module 404, a Maximum A Posteriori Super Resolution (MAP SR) module 406, and a Cross Channel Processing module 408. Either photometrically normalized LR images and geometric calibration data, or photometrically normalized and geometrically registered LR images can be provided as inputs to the Pilot Fusion module 402 in conjunction with parallax information. The Pilot Fusion module 402 is hardware, software, firmware, or a combination thereof for performing a pilot fusion process. The term fusion can be used to refer to a process by which image data samples from multiple images having lower resolution are processed and placed appropriately onto a generally higher resolution grid. In the illustrated embodiment, the pilot fusion process joins (or places) and processes data from multiple input LR images of a channel onto a (typically) higher resolution output grid. This is done such that the LR image samples are placed appropriately onto the output grid (using the geometric corrections—i.e. scene independent geometric calibration data and scene dependent parallax information), and such that positions on the grid where there are missing samples get filled, and a filtering of potentially misplaced samples (outliers) occurs.

When initially placing the LR image samples onto a different (higher resolution) grid (the fusion grid), the LR samples may fall irregularly on the grid such that there may be empty grid positions, or grid positions having multiple samples. The fusion grid may have the same precision as the precision of the geometric corrections, or a higher or lower precision than the precision of the geometric corrections, in which case the transferred sampled onto the grid will fall arbitrarily onto the grid (i.e., including in-between grid nodes). The fusion described below may be preceded by a nearest neighbor procedure that would place the geometrically registered LR samples onto the fusion grid nodes. In any case, the fusion described in this disclosure can be used to interpolate the transferred LR samples onto the fusion gird. However, in many embodiments interpolation is only used to fill empty grid positions and not to interpolate pixel values at locations occupied by pixels from the input images. Irrespective of the approach, it is the task of the pilot fusion process to generate a first, fused image, onto the fusion (output) grid. Where the SR processing is performed on portions of the image, then the first fused image or images obtained by the pilot fusion are obtained using pixels from one or more portions in corresponding locations in each of the LR images.

The Dynamic Focus module 404 may determine a high resolution depth map, or an equivalent representation of it. Using the LR occlusion maps provided at the input of the SR processing as part of the geometric correction information, an HR occlusion map may also be determined. Alternatively, the high resolution depth map, or a representation of it, and the HR occlusion maps, may be determined prior to the Dynamic Focus module, and this module can simply use the information to perform processes related to the dynamic focusing of the synthesized HR image. Similarly, an HR occlusion map can also be used in relation to subsequent SR processing including Pilot Fusion and the MAP module operation. The Dynamic Focus module uses the HR depth map to determine the set of pixels on which subsequent blocks in the SR processing pipeline operate (i.e., the pixels containing information concerning the "in-focus" areas of the HR image estimate). In many embodiments, the modules subsequent to the Dynamic Focus module operate only at the positions on the HR grid that are identified by the Dynamic Focus module based on the determined HR depth map, and either pre-determined, or interactive specifications of the desired pixels to be in focus in the HR image estimate. The rest of the pixels may be allowed to remain in the processing state attained prior to the Dynamic Focus module, or may be further blurred to form the "out-of-focus" areas in the generated HR image estimate. In several embodiments, the Dynamic Focus module is placed before the Pilot Fusion module. In that case, the our-of-focus area on the HR grid may be obtained directly by blurring LR image samples that correspond to those areas (i.e., a pilot fusion in those areas may not occur). Some padding of the in-focus and out-of-focus areas may be used to ensure the proper processing (e.g., blurring) at the boundaries between in-focus and out-of-focus areas. The high-resolution depth map (or a representation of it) can be determined using the parallax information of the LR samples transferred onto a fusion grid, along with information about the geometry of the imager (e.g., inter-LR image baselines). In several embodiments, a high resolution depth map is generated by fusing onto the high-resolution fusion grid the parallax information corresponding to each LR sample available from all the LR imagers (regardless of channel), using the baseline information to determine the HR depth or an equivalent representation of it, and interpolating the depth at fusion grid positions where no LR samples are present. In a number of embodiments, a Dynamic Focus module is provided separately from the SR module. The SR module can generate a high resolution image and a high resolution depth map, and the Dynamic Focus module can be used to render pixels within a specified depth range from a defined focal plane at full resolution, and to render blurred pixel information for pixels outside of the specified depth range. In several embodiments, the blurred pixel information is obtained by blurring the high resolution image. In many embodiments, the blurred pixel information is obtained by blurring the input images.

The MAP SR module 406 is hardware, software, firmware, or a combination thereof that uses a maximum a posteriori (MAP) estimate to obtain good estimates for pixels of a synthesized HR image based upon at least the observed LR images and, in many instances, other observed information and/or prior constraint information. In a number of embodiments, the SR process estimates an HR image for a single channel such as the Green channel based upon at least the fused image output by the Pilot Fusion module 402, the LR image data (raw, photometrically normalized or photometrically normalized and geometrically registered LR images), geometric correction information including an occlusion map, and an imaging degradation model (discussed below) that can include an imaging prior (where available). As is discussed further below, the HR image estimate for the first channel (e.g. the Green channel) can then be used in cross channel processes to estimate SR images for the other channels and to synthesize a full color SR image. In other embodiments, the SR process is a multi-channel statistical estimation process for determining the SR images for each channel. In a number of embodiments, the SR process initializes the SR image estimate(s) with the pilot fusion estimate, and then proceeds iteratively to refine the estimate(s) using the input information and an adaption to the evolution of the iteration process. In several embodiments, SR processes in accordance with embodiments of the invention attempt to synthesize the SR image(s) most likely to yield the captured LR images when a forward imaging transformation is applied to the synthesized HR image(s), where the forward imaging transformation is based upon what is known about the characteristics of the imagers in the array camera.

The MAP SR module 406 can utilize information, where available, concerning the characteristics of the imagers. In many embodiments, the MAP SR module has access to the forward imaging transformation specification for each imager and a noise model(s). In several embodiments, the MAP SR module accesses an imaging prior, whose elements are used to define the forward imaging transformation. The imaging prior can be defined as: modeled or measured information about the optics of the cameras used to capture the LR images in any channel, and information about the imagers. The information about the imagers may consist of both characterized information, such as data about noise characteristics, sensor resolution, sensor blur, and dynamic sensor operation information (or sensor-state information) such as the analog gain used to capture certain LR images. In a number of embodiments, the imaging prior includes a blur function, $H_p^c$, which can be obtained by modeling or measuring the lens characteristics for each LR camera. The blur function is discussed further below, where p indexes the LR camera, and c indexes the color channel for a camera. The noise statistics can also be determined using any of a number of well-known models of imaging noise. Thus, the read noise can be modeled as an additive signal-independent noise, while the shot noise can be modeled as a signal dependent nose, whose variance is modeled (using Poisson distribution assumptions) or measured as a function of signal level. The total noise variance is taken as the sum of the individual noise variance components (where other components such as fixed-pattern noise are assumed to have been compensated for previously).

In the illustrated embodiment, the Cross Channel Processing module 408 estimates HR images for the Blue and Red color channels using the HR Green channel estimate generated by the MAP SR module 406. The output of the Cross Channel Fusion module is a synthesized HR image including color information from multiple channels. In other embodiments, the cross channel processing combines multiple-channel HR images output by the MAP SR module. In many embodiments, the cross channel processing utilizes additional channels of information, including but not limited to a near-IR channel, that are utilized to enhance the generation of SR images for one or more color channels (e.g. R, G, B).

In a number of embodiments, pilot fusion and SR processes can be applied to an entire HR image, selectively applied to portions of an HR image, and/or applied to blocks of an HR image that are combined. When the SR processes are applied to subsets of pixel positions in the HR image, the subsets of pixel positions can be determined based on the computation of per-pixel or per-region SNR values, occlusion maps, HR depth maps (or equivalent quantities such relative depth maps), and resulting gradient values from the output of an SR iteration. Pilot fusion, SR processes, and the application of SR processes to subsets of pixel positions in an HR image in accordance with embodiments of the invention are discussed further below.

Geometric Calibration and Registration

Types of scene independent geometric distortion degradations that can be accounted for in the calibration phase include but are not limited to, so called "barrel" distortions (for example the absolute geometric distortion of a camera chosen as the reference camera) and inter-camera geometric distortions relating the reference camera and each of the other cameras in the array. Effective calibration can correct captured LR images of an arbitrary scene using scene independent geometric correction information in such a way that the remaining geometric warping among the corrected LR images primarily consists of the parallax shift. The combination of the geometric calibration data for a pixel position (scene-independent correction information) and the parallax shift information (scene-dependent correction information) for a pixel position can also be referred to as the total shift experienced by the pixel at that pixel position. In reality, the corrected images will also include some positional noise associated with imprecision in the geometric correction information. The reference system of coordinates for geometric correction operations can be that of an arbitrarily or purposefully-picked image from the LR image set in a channel. Alternatively, all LR input images can be spatially registered using geometric corrections across the multiple input spectral channels. Yet another possibility is to geometrically correct the images spatially with respect to a camera position, which is not in the set of captured images (i.e. a "virtual camera" position). Indeed, any coordinate system appropriate to a specific application can be utilized in accordance with an embodiment of the invention.

Depending on the severity of the maximum parallax allowed for a specific imager before scene-dependent geometric correction (i.e., parallax correction) is required to remove parallax distortions, inter-camera parallax detection may or may not be necessary prior to the SR processing.

Indeed, an SR process in accordance with embodiments of the invention can mitigate parallax to some degree without specifically compensating for parallax using a form of uncertainty processing in accordance with embodiments of the invention. Where a parallax detection module is present, a parallax detection process can be performed to detect the remaining warping among the LR cameras in the array, after accounting for the scene-independent geometric correction (using calibration information) to facilitate the SR processing. In several embodiments, the parallax detection module utilizes at run time the information about the scene independent geometric corrections that are to be performed among the LR images to "dynamically" establish a spatial correspondence among the LR images for the same observed object in the scene being imaged for the purpose of parallax detection. The SR processing also utilizes the scene-independent and scene-dependent portions of the geometric correction information. Pilot fusion processes and SR processes in accordance with embodiments of the invention are discussed further below.

Pilot Fusion Processes

Figure 5:
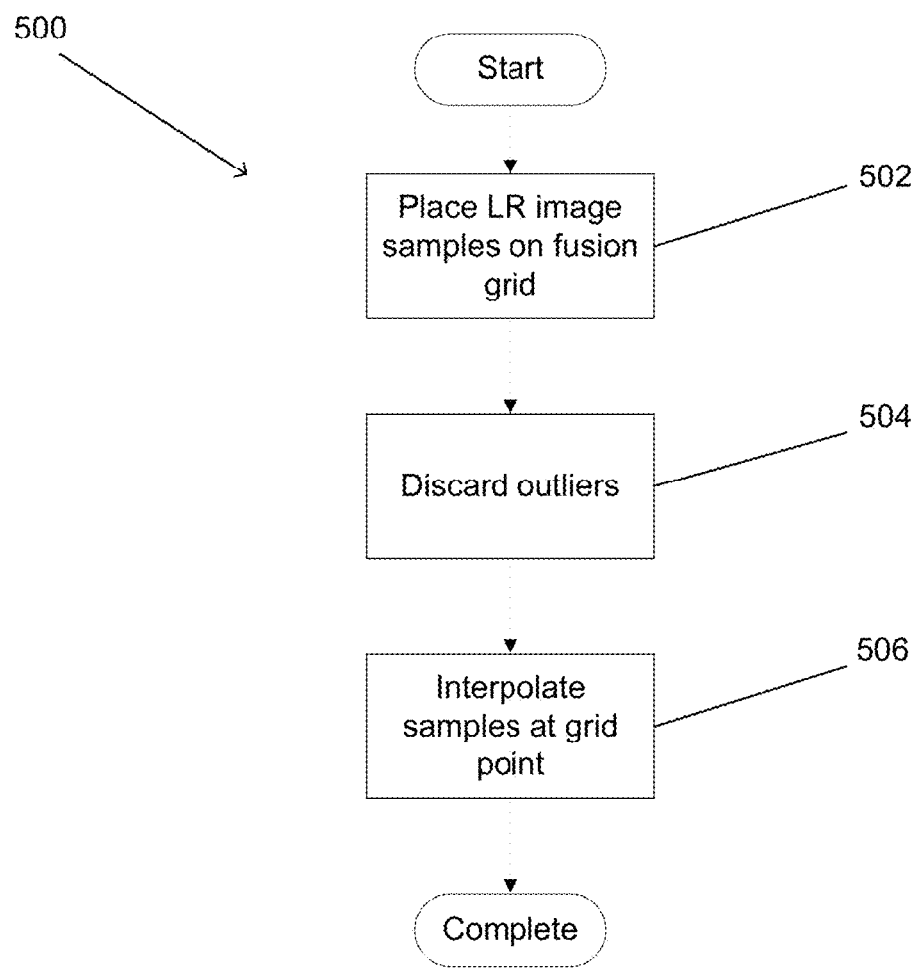
FIG. 5 is a flow chart illustrating a pilot fusion process in accordance with an embodiment of the invention.

A pilot fusion process in accordance with an embodiment of the invention is illustrated in FIG. 5. The process 500 includes placing (502) the LR image samples from each input LR image on a fusion grid in accordance with geometric correction information (i.e. scene independent geometric calibration data and scene dependent parallax information forming the total pixel shift) associated with the input LR images. Outlier image samples are then identified (504) and removed. Processes for identifying outliers in accordance with embodiments of the invention are discussed below and typically involve identifying pixels that possess very low levels of correspondence with neighboring pixels. Once outliers are removed from the fusion grid, the remaining image samples can be interpolated (506) to determine values at all fusion grid positions. In many embodiments, the pilot fusion generates a regularly sampled, initial estimate of the higher resolution image sought for by the SR processing, onto the fusion grid. This estimate represents the input to the next SR Processing module 406, which performs the super-resolution restoration processing. Specific pilot fusion processes incorporating various techniques for placing LR image samples on a fusion grid, identifying and discarding outliers, and interpolating the remaining LR image samples are discussed below.

In many embodiments, the pilot fusion process is performed using input LR image data for a channel, the related geometric correction information, and imaging prior information (where available). The imaging prior information typically includes data concerning the estimated sensor noise statistics of the imagers that captured the LR images. However, any of a variety of imaging prior information can be utilized during the pilot fusion. A different resolution grid (typically higher resolution) from that of the input LR images is used in the pilot fusion process, which can be referred to as the fusion grid. As is discussed further below, the input LR images used in the pilot fusion can be image data originating from a single channel. In many embodiments, however, the pilot fusion for one channel can utilize image data from both the channel itself, and another channel that provides extra information that can be used in fusion. For example, the pilot fusion of image data from a specific visible channel (e.g. G) can include image data from both the specific visible channel and from a non-visible channel (e.g., infrared) or from a channel that combines the wavelengths of the specific visible channel with wavelengths from non-visible portions of the wavelength spectrum.

Figure 6:
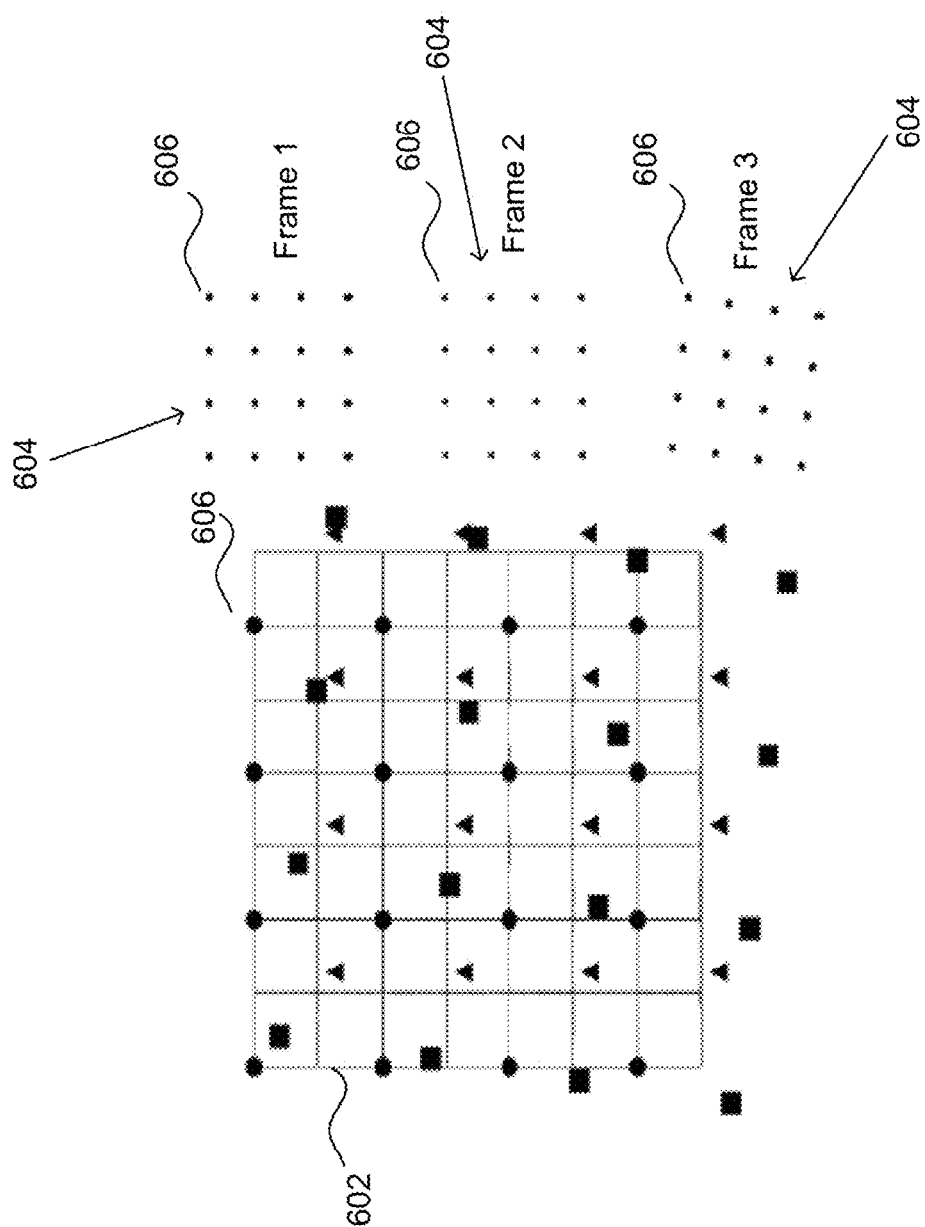
FIG. 6 conceptually illustrates placement of LR image samples on a fusion grid in accordance with an embodiment of the invention.

Placement of LR image samples on a fusion grid in accordance with an embodiment of the invention is illustrated in FIG. 6. In the illustrated embodiment, the pilot fusion fuses three LR images 604 intra-channel (i.e., using the image data only from the fused channel) and the first step in the pilot fusion process to place the LR image samples 606 onto the fusion grid 602 using the geometrical correction information provided at its input. The LR image samples 606 from each of the first, second, and third LR images are indicated on the fusion grid 602 as circles, triangles, and squares respectively. The first LR image (i.e. "Frame 1") is taken as the reference image (geometrically), and the other LR images are transferred onto the fusion grid 602. The result of the placement is typically an irregular placement of the image samples on the fusion grid 602. The placement outcome is typically a function of the difference between the precision of the geometric correction information and the resolution of the fusion grid. In many embodiments, the two resolutions are different, and samples may be placed arbitrarily on the fusion grid, including in between grid nodes. In several embodiments, a nearest neighbor process is used to place samples onto the fusion grid positions. The pilot fusion operates in an unified manner with respect to these cases, through the maintaining of lists of neighbors of a particular grid node position, which are used to facilitate the pilot fusion process. At each grid position on the fusion grid 602 there exist the extreme possibilities of having no samples there (i.e. an empty grid point), or of having multiple samples at a grid point. Although three LR images are shown in FIG. 6, pilot fusion processes in accordance with embodiments of the invention can be performed with respect to two or more LR images. Techniques for removing outliers and interpolating the image samples placed on a fusion grid are discussed further below.

When the LR image samples 606 are placed onto the fusion grid 602, the pilot fusion performs a filtering process to remove outlier samples and interpolate values at each grid position. In many embodiments, the filtering process is implemented using a locally adaptive interpolation process to: remove "outliers", which can be defined as image samples that do not belong at their transferred positions for various reasons including those outlined above; fill-in missing samples; and interpolate a sample at a grid position using the neighboring available samples. The pilot fusion may interpolate all or a subset of grid positions. For example, the pilot fusion may interpolate only at missing fusion grid positions (i.e., where no samples exist).

Outlier removal is typically the first operation in each local neighborhood on the fusion grid 602, since it is undesirable to use outlier values in the processing of other samples in the local neighborhood. In a number of embodiments, outlier removal is performed using a filtering operation that determines whether an LR image sample is an outlier using all neighboring LR image samples within a predetermined window, including stacks of samples, if contained in that window. In several embodiments, lists of neighboring samples are created within a certain Euclidean radius distance from the LR sample being tested for outlier status to accommodate the fact that the filtering operation takes place on the irregularly transferred LR samples.

In a number of embodiments, outliers are identified by constructing a measure based upon bilateral filter weights calculated using the tested LR image sample and its list of neighbors on the HR grid. Bilateral filters are typically used to perform edge-preserving smoothing by filtering images based upon both range and domain (i.e., spatial distance and photometric difference). A typical bilateral filter extends the concept of Gaussian smoothing by also weighting the filter coefficients based upon the corresponding relative pixel intensities. Pixels that are very different photometrically from the central pixel are weighted less even though they may be in close proximity to the central pixel. In the illustrated embodiment, a measure of the consistency of an LR image sample with its neighbors is obtained utilizing the bilateral filter weights that are computed based upon the LR image sample and its neighboring samples on the HR grid. The weights are summed and the sum normalized by the number of neighboring LR image samples to produce a value indicative of the similarity between the LR image sample point and its neighbors. A determination is then made that the LR image sample is an outlier (i.e. lacking consistency with the local LR transferred samples on the fusion grid) if the normalized sum of the weights is below a threshold. Where the imaging prior incorporates a predetermined noise model, the bilateral filter weights described above utilize a range kernel that is a function (e.g., a scaled value) of the standard deviation of the noise estimate at the position and the spatial kernel is typically a predetermined Gaussian that decays with distance. In the absence of information from the imaging prior, predetermined values can be utilized to determine the bilateral filter weights. Although specific approaches for identifying outliers based upon calculated bilateral filter weights are described above, outliers can be identified using a variety of techniques that identify LR image samples that have a low degree of correspondence with neighboring LR image samples in accordance with embodiments of the invention.

Once the outliers are identified, the next step in the pilot fusion process involves locally, and adaptively filtering the available samples in the neighborhood of each grid position to determine the value of an image sample at that position. For this process, a structured kernel local filtering can be used (see for example the process described in Trevor J. Hastie, et al. The elements of statistical learning, data mining, inference, and prediction, (2nd ed. 2003)), which obtains a value at each position on the fusion grid 602 by fitting a surface to the available image samples in the neighborhood of the grid position, and then re-sampling the fitted surface at the desired grid position. In a number of embodiments the fitted surface is obtained by using a weighted least squares technique to fit a given-order surface parameterization to the available image samples in the local window (i.e. list of neighborhood image samples) of the grid position. During this process, the degree of interpolation (or smoothing) can be controlled by the estimated signal to noise value estimated at each position on the fusion grid. Specifically, for low signal to noise at a given position, a higher degree of smoothing is performed. The above process produces an interpolated image sample at each grid position, thereby transforming the initially irregularly-placed image samples into interpolated, regular samples at all fusion grid positions. Although specific interpolation processes are described above, alternative interpolation processes can be utilized in accordance with embodiments of the invention. Alternatively, the interpolation process is only utilized to determine pixel values in empty grid positions and is not used to interpolate pixel values at grid positions in which pixels have already been placed.

In the process of filtering local LR image samples for interpolating a value at each fusion grid position, LR image samples are placed on the grid based upon a determination that some information carried by these LR image samples is useful. However, many of the LR image samples may be very close to the "outlier" threshold. Accordingly, many SR processes in accordance with embodiments of the invention weigh the contribution of LR image samples placed on the grid in any local interpolation that uses them. The weighting function, which assigns a scalar weight value to each LR sample transferred onto the fusion grid, can be provided to the SR processing by previous modules that influence the quality of the geometric correction information including but not limited to the parallax detection module. In a number of embodiments, the size of the local window used for the pilot fusion, centered at the current grid position being processed, can be made variable, based on a measure of local density of available samples. For example, for a grid position whose neighborhood contains a higher density of available image samples, the local window can be made smaller to allow for better detail preservation. However, for pilot fusion grid positions, which have a sparse-sample neighborhood, the local window size can be extended to process sufficient samples for a reliable interpolation. The order of the model used in the structured kernel filtering can vary depending on the size of the local window and the number of samples in the window.

In a preferred embodiment, the pilot fusion generates a regularly sampled, initial estimate of the higher resolution image sought for by the SR processing, onto the fusion grid 602. This estimate represents an input to the next SR processing stage, which performs the super-resolution restoration processing.

Dynamic Focus Processing

As illustrated in FIG. 4, a dynamic focus module can be used to generate high resolution estimates of the depth of points in the imaged scene from the point of view of a reference imager, other imagers in the array, or virtual points of view not coincident with any of the imagers in an imager array. Similarly, by using low-resolution pair-wise camera occlusion maps (e.g., generated by a parallax detection module), a high resolution occlusion map can be generated from the point of view of the camera chosen as reference or any other camera in the array. Uses of the obtained HR depth map can include but are not limited to depth metering in the scene, creating an SR image with particular characteristics in terms of what image content is in-focus and which is out-of-focus, and/or enabling a dynamic re-focusing of the rendered SR image, even after the image data has been captured by the imager. The details of these processing approaches are given below.

An HR depth map can be determined using the point of view (POV) of a reference imager or from other points of view. In order to determine a HR depth map of the scene observed from the POV of the reference camera, a cross-channel fusion is performed, but instead of fusing actual pixel values, the parallax information corresponding to all the available pixels from all LR imagers regardless of color channel, are fused onto the common HR depth fusion grid. Also available at each position on the HR depth fusion grid where a pixel would land, are the inter-imager baselines relating the source LR imager (i.e. the LR imager that captured the pixel located at the pixel position), and the reference LR imager. With this information, one can use the relationship between depth and parallax to determine an HR depth map of the scene visible from the POV of the reference camera. This can be done in absolute terms by using the formula:

$$\text{depth[m]} = \frac{\text{baseline[m]} * \text{focal Length[m]}}{\text{disparity[m]}}$$

The disparity in the above equation is alternatively referred to as parallax, and the focalLength is the focal length for the lens of a the originating LR imager (i.e. the LR imager from which the pixel originated), and the baseline is the inter-imager baseline. Further, since the parallax is referred to in this disclosures in units of HR pixels, the further definition of the disparity (or parallax) in pixel units is given by:

$$\text{disparity[pixels]} = \frac{\text{disparity[m]}}{\text{pixel Size[m]}}$$

As discussed above, there are positions on the HR depth map grid that will remain empty following the fusion (fewer in this case since, as compared to the pilot fusion process in one channel described above, we are fusing together onto the HR depth fusion grid the parallax information of all pixels from all LR cameras regardless of channel). The depth values at all or a subset of grid positions (e.g., missing depth positions) may be interpolated using the fused HR depth map. A number of interpolation techniques can be used, as known in the art. Additionally, when computing the HR depth map, simple constraints can be imposed such that the HR depth map is validated against the geometrical characteristics of the imager (e.g., a filtered depth such as for a missing pixel, should not result in a conflict with other pixels when geometric transformations or corrections are applied to the pixel).

While the processing above can be used to generate a HR depth map where the obtained values are actual depth values, a more economical but similar process can be used to only determine a relative HR depth map in the scene, which can be used for dynamic focus purposes. For this purpose, only the parallax and the baselines information is needed, such that their ratios (reflective of relative depth) can be used to determine the relative HR depth map of points in the scene viewed by the reference camera.

The absolute or relative HR depth map determined as described above, can be used for dynamic focus purposes at some point in the rest of the SR processing. For example, the user of the system in which the current processing is embedded, may want to only render in focus only a particular depth plane (plus or minus a depth range). In other words, a shallower depth of field is required. By the processing described above, this can be easily done by either automatic selection, or by acting to SR-process and render only the depth range selected. In many embodiments, the user is presented with an image of the scene (at possibly lower resolution) where that selection can be made. In this way, an interactive selection of a plane of focus and a range of focus when generating an SR image can be performed. In many embodiments, since an HR depth map is estimated and can be saved to storage by the processing in conjunction with the HR image estimation, the desired (and varying) focus selection can be done at capture time, or just as well, after the images have been captured (i.e., post-capture focusing).

The HR depth map and the HR parallax information (which is used in the SR processing described below) can be equivalent quantities as shown by the above equations, and thus, any operations described in one domain can equivalently be performed in the equivalent domain. Thus, the constrained HR depth map described above can also be obtained as a byproduct of the SR processing described below (where forward warping operations are described).

Similarly, the use of the absolute or relative HR depth map can be extended to benefit the efficient computation of the HR image. Thus, if only a limited depth of focus is required, the SR processing can concentrate only on the estimation of the pixels that are representative of points in the scene that fall within the desired depth of focus, since they are the ones that will have to be rendered in focus and with maximal resolution. The rest of the pixels in the HR image may be left in the state attained at the point before the Dynamic Focus module, or can even be blurred to further effect their "out-of-focus" appearance.

The HR depth information can also be used for an enhanced method of pilot fusion. Thus, instead of performing the full pilot fusion as described above as a first step, the HR depth information is first estimated by the procedure described above. Then, this HR depth information is input to the Pilot Fusion module. The HR depth information is used such that, when operating the interpolating kernel (e.g., the structured kernel filter) in a local neighborhood, samples now also carry with them estimated HR depth information. In one embodiment this information is used for generating the interpolated pixel value at the current position of the HR fusion grid, in addition to using the actual values of the pixels in the local window centered at the pixel being interpolated, their confidence values, and their distance from the current position being interpolated. For example, in occlusion zones estimated for the point of view of the reference imager (where the current HR estimate is sought), samples are much sparser and typically include pixels belonging to the foreground object (which caused the occlusion) and the background object(s). In this case, the corresponding local HR depth map can be used to eliminate pixels belonging to the foreground object from the interpolation, when interpolating the value of a pixel in the occlusion zone (which is known to belong to the background object given the mechanics of the occlusion). Thus, a higher-quality interpolation can be performed. The same procedure can be extended to other scenarios for the HR fusion process.

SR Processing

Figure 7:
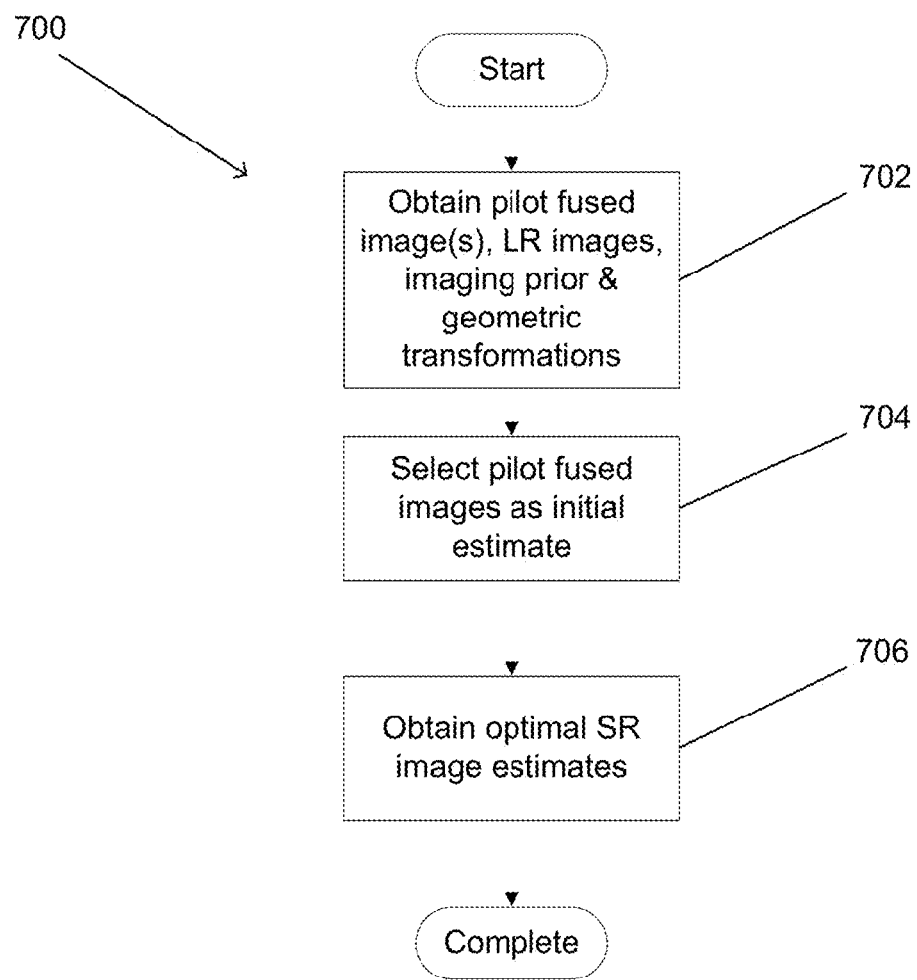
FIG. 7 is a flow chart illustrating an SR process that obtains optimal SR image estimates from LR images in a manner that accounts for uncertainty in the upstream processing of the LR images in accordance with an embodiment of the invention.

The MAP SR module 406 uses a statistical estimation approach to determine the super-resolved images for each output spectral channel. An SR process in accordance with an embodiment of the invention is illustrated in FIG. 7. The process 700 obtains (702) as its inputs the pilot fused image, the photometrically normalized LR image data for each input spectral channel, geometric correction information, and an imaging prior if available. The pilot fused image is selected (704) as an initial estimate in an optimization process that seeks to obtain (706) optimal HR image estimates given the input LR images captured by the imager array and a forward imaging transformation (built based on an image degradation model). In a number of embodiments, the SR process utilizes a proprietary form of a maximum a posteriori (MAP) objective criterion formulation, which is then optimized with respect to the SR image to be estimated for at least one output spectral channel. In many embodiments, the objective criterion formulation utilizes a specific forward imaging transformation (reflective of an image degradation model) that describes the image degradation that occurs within each imager during the capturing of an LR image. In several embodiments, the criterion used in the optimization includes two main terms: a data fidelity measure of the estimate; and an intra-channel prior term, which imposes intra-channel constraints on the estimated SR image solution. In many embodiments, the estimation process is a multi-channel estimation process and a third inter-channel prior term is used in the optimization criterion, which places constraints on the relationship among the SR image solutions for the multiple output channels. The third term is obviously not required when dealing with a single channel and in many embodiments is also not required where dealing with multiple channels as other processes can be used pre- or post-SR processing to constrain and/or register the SR image solutions with respect to each other. In several embodiments, terms associated with any of a number of criteria appropriate to the application can be used in formulation of an appropriate objective function for use in the estimation of optimal SR images.

Degradation Models

In a number of embodiments, one of the captured LR images in the color channel that is the subject of the SR processing is taken as the reference image, and all geometrical transformations of the other LR images are taken with respect to this reference image (i.e., any geometric correction information provided at the input of the SR processing, which may include scene-independent geometric correction and parallax information). In which case, an estimated high resolution image $x^c$ generated by an SR process in accordance with an embodiment of the invention represents the high resolution image that the reference imager would see, were it a high resolution camera (at the same resolution as the desired SR output resolution that is being sought in a particular channel c). In other embodiments, the estimate $x^c$ is from the perspective of a virtual camera. As noted above, the MAP process used to estimate $x^c$ involves applying forward imaging transformations to the estimated HR image to obtain synthesized LR images that can be compared to the observed LR images. The forward imaging transformations (possibly specific to each LR camera) applied to the estimate $x^c$ can include but are not limited to scene dependent geometric displacements (i.e. parallax), scene independent geometric distortions, lens and sensor blur, sensor degradation, and decimation. Application of forward imaging transformations to a high resolution image estimate x' are discussed below.

An LR image captured by imager p in channel c can be denoted as $y_p^c$. In many embodiments, the forward imaging transformation involves applying a first matrix operand $W_{p,p_a}^c$ to $x^c$, $W_{p,p_a}^c$ represents a geometric transformation describing the parallax view of the $p^{th}$ imager before its lens acts upon it, compared to the estimated high resolution image $x^c$ of the scene as viewed by the reference imager. In several embodiments, a second matrix operand $W_{p,d_i}^c$, is also applied, which describes the scene independent geometric warp for each LR imager (if the LR imagers have not been corrected for scene independent differences, see discussion above). Furthermore, a lens blur operator $H_{p,l_e}^c$, can also be applied, which produces the optical image for LR imager p. The image degradation can be further modeled using the operator $H_{p,s_e}^c$ that describes the extent to which the sensor blurs the image formed on the sensor by the lens, and a decimation operator D. Finally, imaging noise $n_p^c$ can be added to obtain the $p^{th}$ simulated LR image $y_p^c$.

Without loss of generality, and for simplicity of description, many embodiments of the invention incorporate a forward imaging transformation in which the decimation operator D is assumed to be the same for all imagers in a channel c, and the blur operators $H_{p,l_e}^c$ and $H_{p,s_e}^c$ are assumed to be invariant across the images of a given channel. A number of embodiments, however, utilize a spatially-variant lens blur $H_{p,l_e}^c$, to reflect the manner in which the imager optics behave in reality.

The joint spatially invariant lens-sensor blur (also referred to as total blur) operator ($H^c$) can be denoted as follows:

$$H^c = H_{sens}^c H_{oten}^c$$

The observed LR image $y_p^c$ is thus the result of degrading (by the above operators) the original high-resolution image $x^c$, with the addition of noise $n_p^c$. On the latter variable, it can be assumed that the noise statistics are drawn from the same distribution for all images in all channels. Also, the noise statistics (i.e., variance) can be modeled or measured as part of the formation of the imaging prior.

Although a specific forward imaging transformation is discussed above, alternative forward imaging transformations can be utilized in accordance with embodiments of the invention and the formulation of the SR objective criterion modified accordingly.

Estimating an Sr Image

Figure 8:
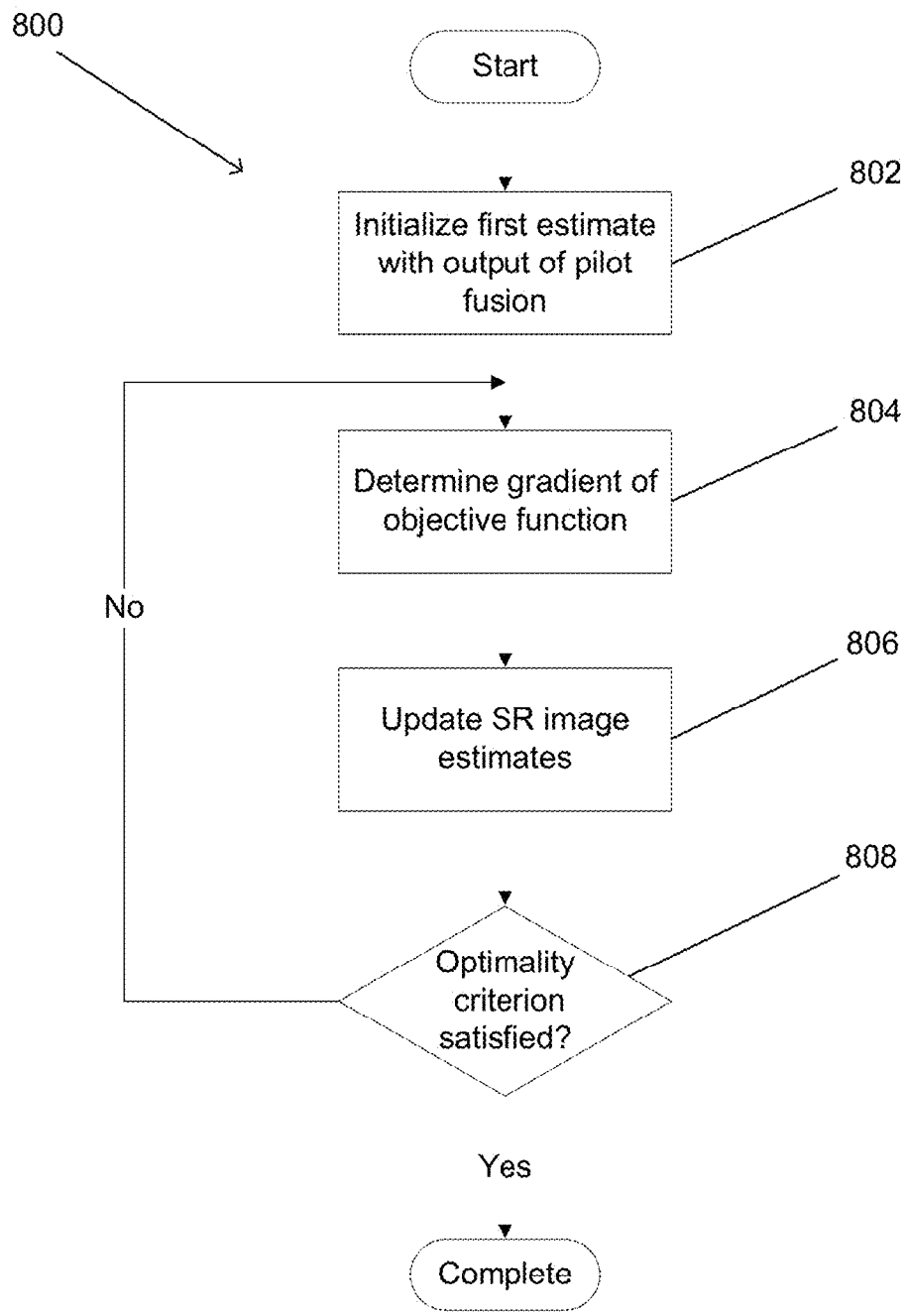
FIG. 8 is a flow chart illustrating a process for obtaining an optimal SR image estimate using a gradient descent optimization technique in accordance with an embodiment of the invention.

A MAP process in accordance with many embodiments of the invention can involve iteratively refining an estimate of an HR image using an objective function. In several embodiments, the iterations utilize a gradient descent technique as follows, where the current HR image estimate is expressed as a vector $x^c(n)$:

$$x^c(n+1) = x^c(n) - \beta^n \nabla_{x^c(n)} J(x^c(n)) \tag{1}$$

where n—indexes the iteration number $\beta^n$—is the step-size for the iteration $\nabla_x(.)$—is the gradient operator $J(x)$ — is the MAP objective function parametrized by the HR estimate For simplicity, the vector $x^c(n)$ can be denoted as $x^c$ during a specific iteration. The gradient descent described above is a process that can be performed by the SR processing module of an array camera in accordance with embodiments of the invention to obtain an optimal SR image estimate(s). In various embodiments, other optimization techniques can also be used to obtain SR image estimate(s). A process for using gradient descent to obtain optimal SR image estimates in accordance with an embodiment of the invention is illustrated in FIG. 8. The process 800 includes initializing (802) the first estimate, $x^0$, with the output of the pilot fusion process described previously. The gradient is determined (804) and a new estimate obtained (806). The process can either iterate until a predetermined optimality criterion is satisfied (808) or for a finite number of iterations.

When the process illustrated in FIG. 8 is applied with respect to the objective function referred to in Eq. (1), the gradient $\nabla_{x^c} J(x^c)$ has the form:

$$\nabla_{x^c} J(x^c) = VT(x^c) + \psi_{\Lambda_1}^{intra}(x^c) + \Phi_{\Lambda_2}^{iner}(x^c, \hat{x}^{c'}), \tag{2}$$

where

"c'"—signifies a channel different than c,

"^"—signifies that some of the SR channels will have constraints imposed using already finalized SR estimates of other channels, as mentioned above.

The gradient vector in Eq. (2) (having a value corresponding to each pixel in the current HR estimate) may arise from the use of different norm types (e.g., l1-, l2-, Lorentz), in the objective function. The choice of norms does not limit the generality of the approach.

The matrices/vectors in Eq. (1) have appropriate sizes once the size of the vector $x^c$ is given. Also, c, c'—index the channel; the current channel being processed, and another channel, respectively.

$x^c$—the SR image for the current channel in the frame of coordinates of the reference camera.

Γ(.)—is a gradient vector of a norm of the difference between the current HR estimate and all, or subsets of, the input LR images, that was used in the formulation of the objective function (i.e., the "likelihood-term" gradient).

$\hat{x}^c$—the super-resolved image for another channel c', in the geometric reference frame of the reference camera (its use will be detailed further below)

$\psi_{\Lambda_1}^{i\ n}(.^i)^i$—is a gradient vector of an intra-prior term formulation in the objective function using a particular norm, (locally-)weighted by diagonal matrix $\Lambda_1$, which can be the identity matrix. This referred to as the intra-prior term gradient.

$\Phi_{\Lambda_2}^{i\ n}(.^i)$—gradient vector of an inter-prior term formulation in the objective function using a particular norm, (locally-)weighted by diagonal matrix $\Lambda_2$, which can be the identify matrix. This is referred to as the inter-prior term gradient.

V—is a diagonal matrix weighing the first gradient term in Eq. (2). It could be the identity matrix—if not, the entries on the diagonal of the weight matrix V can be determined as follows:

$$\text{diag}[V](k, l) = f(R(x^c), SNR(k, l)),\qquad(3)$$

$f(.)$ is a function of a per-pixel local certainty function $R(x^c)$, and may also be dependent on the estimated SNR, at each (k,l) position.

Function $f(.)$ is such that for lower local SNRs estimated at position (k,l), or for lower local confidence values (received as input by the SR processing) the weight v at that position (k,l) is lower such that the first term in Eq. (2) is de-emphasized with respect to the second term (intra-prior gradient) in the overall gradient computation. This means that in low SNR areas more smoothing is encouraged rather than the enforcement of observed-data fidelity.

The last two terms in Eq. (2) measure a behavior of the estimated SR image with respect to a prior model of a natural image. The third term in Eq. (2), which enforces cross-channel constraints among the estimated SR channel images, imposes an edge location and orientation consistency among the output-channel SR images that are estimated. This term can use, but is not limited to using, a cross-channel Gibbs prior distribution formulation, or a co-directionality constraint. In many embodiments, the cross-channel prior is active only when estimating some channels c' based on a HR estimate already obtained for a channel c (e.g., the Red and Blue channels are estimated by transferring and filtering edge location and orientation as determined by the super-resolution estimate of the Green channel). Obviously, there are no cross-channel constraints where the camera array captures a monochrome image and the third term in Eq. (2) can be ignored. In many embodiments that involve multiple color channels, the third term in Eq. (2) is also ignored in favor of an alternate process for enforcing cross-channel constraints between the channels. When the third term in Eq. (2) is ignored, the iterative estimation proceeds using the first two terms, i.e., the likelihood gradient term, and the intra-prior gradient term. In several embodiments, different weighting functions are applied to each of the terms to obtain any of a variety of desired SR image characteristics.

Iterative SR Resoration Processing

Figure 9:
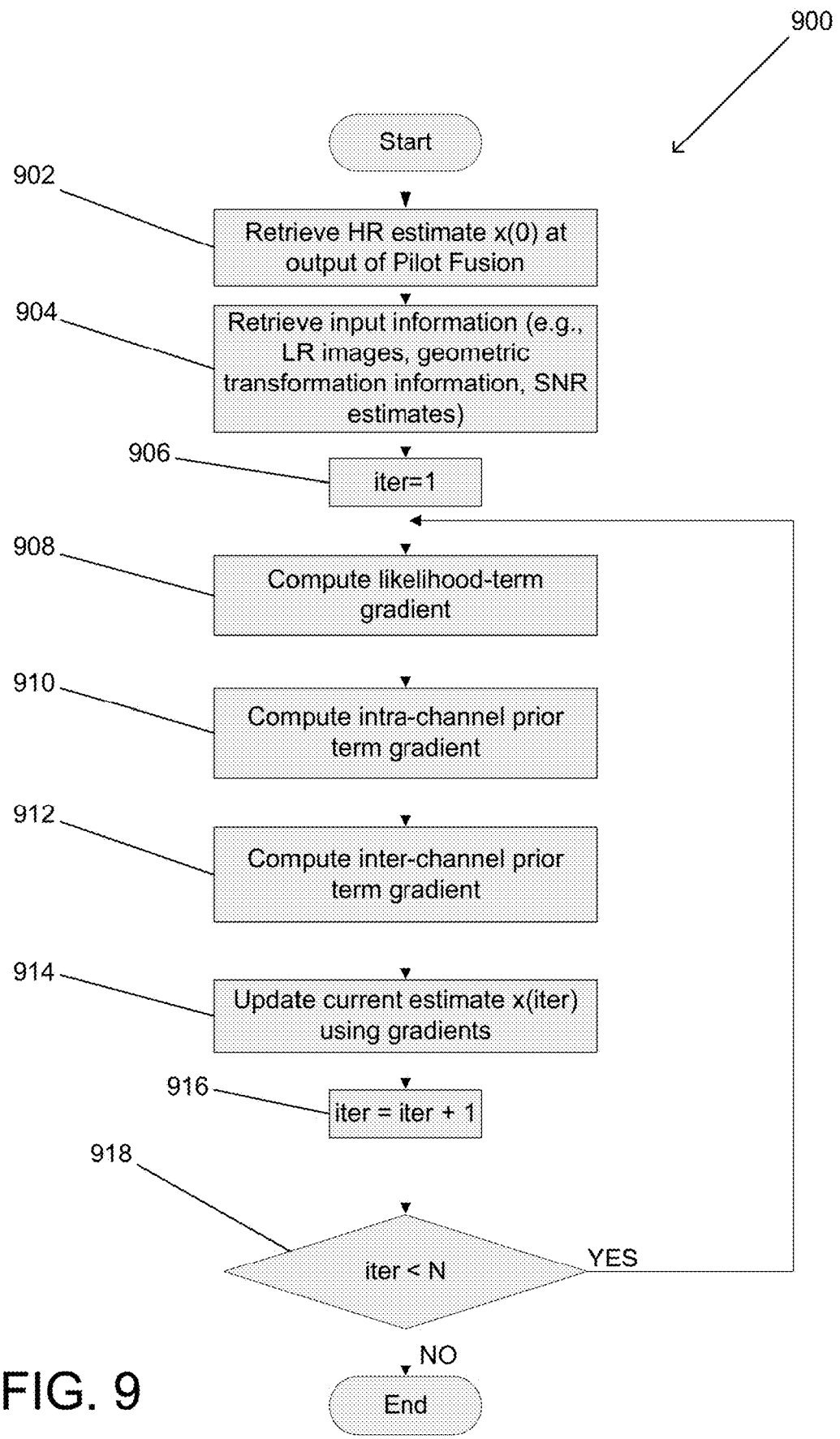
FIG. 9 is a flow chart illustrating a process for refining an HR image estimate by computing a gradient including likelihood, intra-channel, and/or inter-channel gradient terms in accordance with an embodiment of the invention.

A process for iteratively refining an estimate of an SR image using a gradient descent approach is illustrated in FIG. 9. The process 900 is initialized (902) using an HR estimate generated using a pilot fusion process. The process can also utilize (904) input information such as a degradation model and/or an imaging prior. The process then commences iterating (906). In each iteration, the likelihood gradient term is computed (908), the intra channel prior gradient term is computed (910), and the inter-channel prior gradient term is computed (912), and then a new estimate for the HR image is generated (914) using the gradient terms. The estimate of the HR image can be updated by adding the weighted gradient terms to the previous HR estimate. The process continues to iterate (916) until a predetermined number of iterations is reached (918). At which point, the SR image estimate is returned. Although the process illustrated in FIG. 9 terminates after a predetermined number of iterations, alternative termination conditions can be utilized in accordance with embodiments of the invention. The computation of the gradient terms in accordance with embodiments of the invention is discussed further below.

Computing the Likelihood Gradient Term

In order to calculate the likelihood gradient term in accordance with Eq. (2), each pixel at position (k,l) in a current SR image estimate is tested for fidelity when forward-simulated through a forward imaging transformation, to pixel positions (i,j) in multiple LR input images, using a norm. The pixel positions (k,l) and (i,j) are related by the geometric correction information, including the scene-independent correction information (also referred to as geometric calibration), and the scene-dependent correction information (also referred to as parallax). It is possible that not every pixel position on the HR grid has scene-independent (calibration) data since there may not have been any pixel from an LR imager placed there in the fusion. The norm may be for example the l2-, l1-, or Lorentz norm. Forward-simulation means here that a current HR estimate is passed through a forward imaging transformation, which typically involves degradation by the operators corresponding to the imaging degradation model described above (i.e., including geometric warps, blurs, and decimation).

Figure 10:
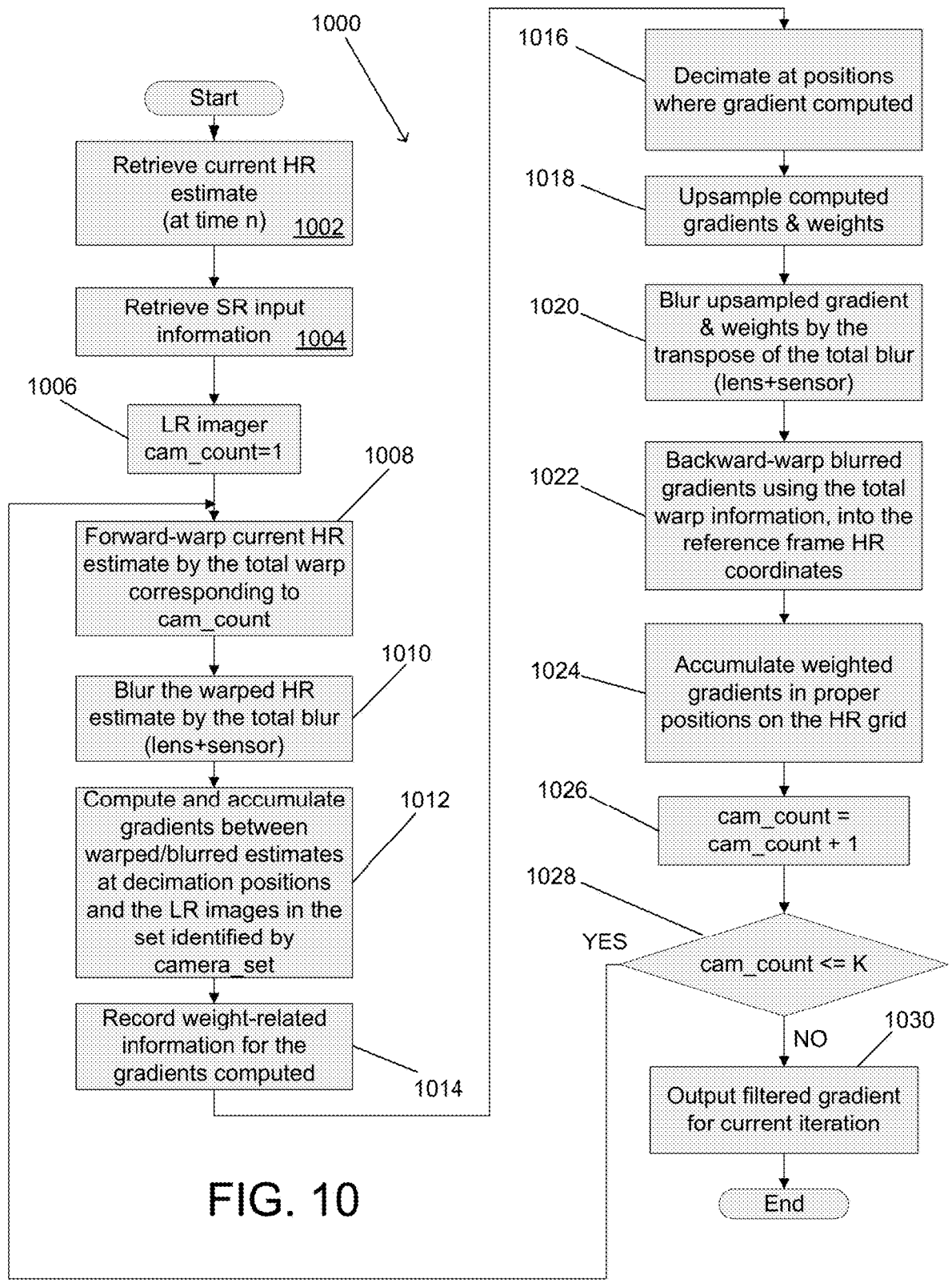
FIG. 10 illustrated a process for determining a likelihood gradient for an HR image estimate in accordance with an embodiment of the invention.

A process for generating a likelihood gradient term for a given color channel using the forward imaging transformation in accordance with an embodiment of the invention is illustrated in FIG. 10. The process 1000 utilizes the current HR estimate for the channel (1002) and the input information utilized in the generation of the HR estimate (1004) and then iterates over each (or a subset) of the input LR images (1006). For each input LR image considered, the HR estimate is geometrically forward warped (1008) in high resolution by the total warp (comprising the geometric correction information) relating the target LR imager and the reference LR imager, and the warped HR estimate is blurred (1010) by the total blur. The gradients between the warped and blurred HR image estimate at the decimation positions and the corresponding input LR images are then computed and accumulated (1012). Weight-related information for each of the gradients is computed (1014), decimation is performed (1016) at the computed gradient positions and upsampling of the resulting gradient data (1018) is performed. The upsampled gradient data is then blurred (1020) by the transpose of the total blur, and the blurred gradient data is backward-warped (1022) using the total warp information into the reference frame of the HR estimate. The weighted gradients are then accumulated (1024) in the HR reference frame of coordinates of the reference imager and the next iteration (1026) performed. The process iterates across all (or a subset) of the input LR images (1028) and outputs (1030) a final gradient vector.

The input information utilized in the calculation of a likelihood gradient term in accordance with an embodiment of the invention typically includes information such as geometric correction information (including parallax information and scene independent geometric correction information), occlusion information, and imaging prior information (such as per-pixel SNR estimates in the HR frame). Not all of the input information is necessary for calculating the likelihood gradient term. If the parallax information is not available and/or the parallax is small, uncertainty processing can compensate for a lack of parallax information. This is also true with respect to small scene-independent geometric corrections, which may not need to be performed prior to the SR processing. Incorporation of uncertainty processing into SR processes in accordance with embodiments of the invention is discussed further below. The following discussion of calculating the likelihood gradient term assumes both portions of the geometric correction information, i.e., the scene dependent parallax information and the scene independent geometric calibration data are available during the SR processing.

Warping and Blurring

The geometric warping and blurring of an HR image estimate in accordance with embodiments of the invention can be performed in a number of different ways, including warping and blurring the entire HR image estimate into the frame of coordinates of all, or a subset, of LR imagers, followed by per-pixel gradient computations with respect to each input LR image being considered. The warping and blurring of the HR image estimate with respect to the frame of coordinates of an LR imager involves forward-warping the HR image estimate using the available geometric correction information (also referred to as warping information) for the LR imager, which may include scene dependent parallax information and scene independent geometric calibration information, into the geometrical frame of coordinates of the LR imager. In many embodiments, the warping process simply involves a spatial shift (or translation) of a pixel. Once the HR image estimate has been warped onto the decimation grid of a target LR imager, the warped HR image estimate can be blurred by a total blur including both lens blur and sensor blur. The decimation grid of a target LR imager is a high resolution grid, and decimation can be performed on the warped and blurred HR image to simulate an LR image in the frame of coordinates of the target LR imager.

In other embodiments, the gradients are formed sequentially as the processing progresses through the pixels of the current HR image estimate. When gradients are formed sequentially, sufficiently large blocks of data (patches) in the images involved can be used so that the warping and blurring operations can function properly, and the current pixel being processed in the HR image has a fully-populated, large-enough, spatial neighborhood.

Warping of the entire HR image estimate with respect to the frame of coordinates of an LR imager is described in detail below.

Warping an Entire HR Image Estimate

When a pixel in an HR image estimate originated from a specific pixel in an LR image, then "origination" information can be associated with the pixel position on the HR grid. The value of the pixel at that grid position may change through processing, but the origination information at that position remains and is available for use in SR processing. The origination information can identify the input LR image that the pixel is from (i.e. the source LR image) and the coordinates (i,j) of the pixel within the source LR image.

When pixels are forward warped onto the decimation grid of a specific LR image, then all of the pixel positions with origination information from that LR image fall at regularly spaced intervals (i.e. the super-resolution factor/decimation interval) on the high resolution decimation grid starting at the (1,1) position (i.e. the position at which the grid starts). Typically, only a subset of pixel positions within an HR image estimate have origination information. Therefore, not all of the pixels in the HR image estimate can be directly warped back into an LR imager's frame of coordinates. Accordingly, an adaptive warping process can be used that performs warping based upon conditions including whether a specific pixel has origination information.

In embodiments where the array camera captures multiple color channels, the origination information available for a pixel may relate the pixel to a source LR imager from a different color channel to the color channel of the HR image estimate. Many adaptive warping processes in accordance with embodiments of the invention treat pixels that originated from a different color channel as a separate class of pixel positions and utilize only the spatial registration (geometric correction) information of the pixels originating from LR imagers from all color channels during the warping of the current HR image estimate. Although, in many embodiments only the geometric correction information of the pixels in the LR images in the same color channel as the reference LR camera are used for the purpose of warping and forming gradients at each point in the current HR estimate, the warping process need not be limited to utilizing just the spatial registration information for the current color channel LR images. Adaptive warping processes and the treatment of different classes of pixel positions are described below.

Adaptive Warping Processes

As discussed above, adaptive warping processes apply different warping processes to various classes of pixel positions when warping an HR image estimate from the frame of coordinates of the reference imager into the frame of coordinates of a specific LR imager, which can be referred to as the "target" LR imager. The term pixel position refers to a coordinate on the HR grid to which one or more pixels from LR images map. The pixels can be from the same color channel as the HR image estimate or from a different color channel. In instances where the only pixels that map to a pixel position are from a different color channel, then the geometric correction information can be utilized in estimation of the pixel value at the pixel position. Stated another way, the actual pixel value from the different color channel is not used, however, geometric correction information can be used to adaptively warp such positions for the purpose of determining the likelihood gradient term (see description below). In a number of embodiments, the adaptive warping process applies different warping processes to the following classes of pixel positions:

Type 1 pixel positions are positions on the HR grid that originated from the target LR imager (irrespective of the color channel of the target LR imager).

Type 2 pixel positions are positions on the HR grid that originated from an LR imager other than the target LR imager (irrespective of the color channel). An LR imager other than the target LR imager, from which a Type 2 pixel position originated, can be referred to as a "source" LR imager. In several embodiments, Type 2 pixel positions can originate from a source LR imager within any color channel (i.e. Type 2 pixel positions are not necessarily limited to the color channel hich is same as that of the HR image estimate).

Type 3 pixel positions are synthetic pixel positions (i.e. positions within the HR grid to which none of the pixels in the LR images can map) that have neighboring Type 1 and/or Type 2 pixels. Such pixels are typically the result of a fusion process used to generate the original HR image estimate.

Type 4 pixel positions are positions that do not fall into any of the above categories. Such pixel positions are synthetic pixel positions that do not have any neighboring Type 1 or Type 2 pixel positions. Type 4 pixel positions are not warped with respect to the target LR imager. It is likely that at least some of them will be able to be warped into some other target LR imager (than the current one) in turn. Any empty positions created when the HR image estimate is warped into the frame of coordinates of the target LR imager due to Type 4 pixel positions can be locally interpolated. In other embodiments, the neighborhood for Type 4 pixel positions is increased such that there are no Type 4 pixel positions (i.e., they become Type 3 pixel positions).

Type 1 and Type 2 pixel positions are pixels in an HR image estimate that have geometric correction (or total shift, or warp) information, because they originate from an LR imager. Type 3 and Type 4 pixel positions do not have associated geometric correction (or total shift, or warp) information, because they are synthesized pixel positions. The warping of Types 1, 2, and 3 pixel positions in accordance with embodiments of the invention is discussed below.

Warping Type 1 Pixel Positions

Figure 11:
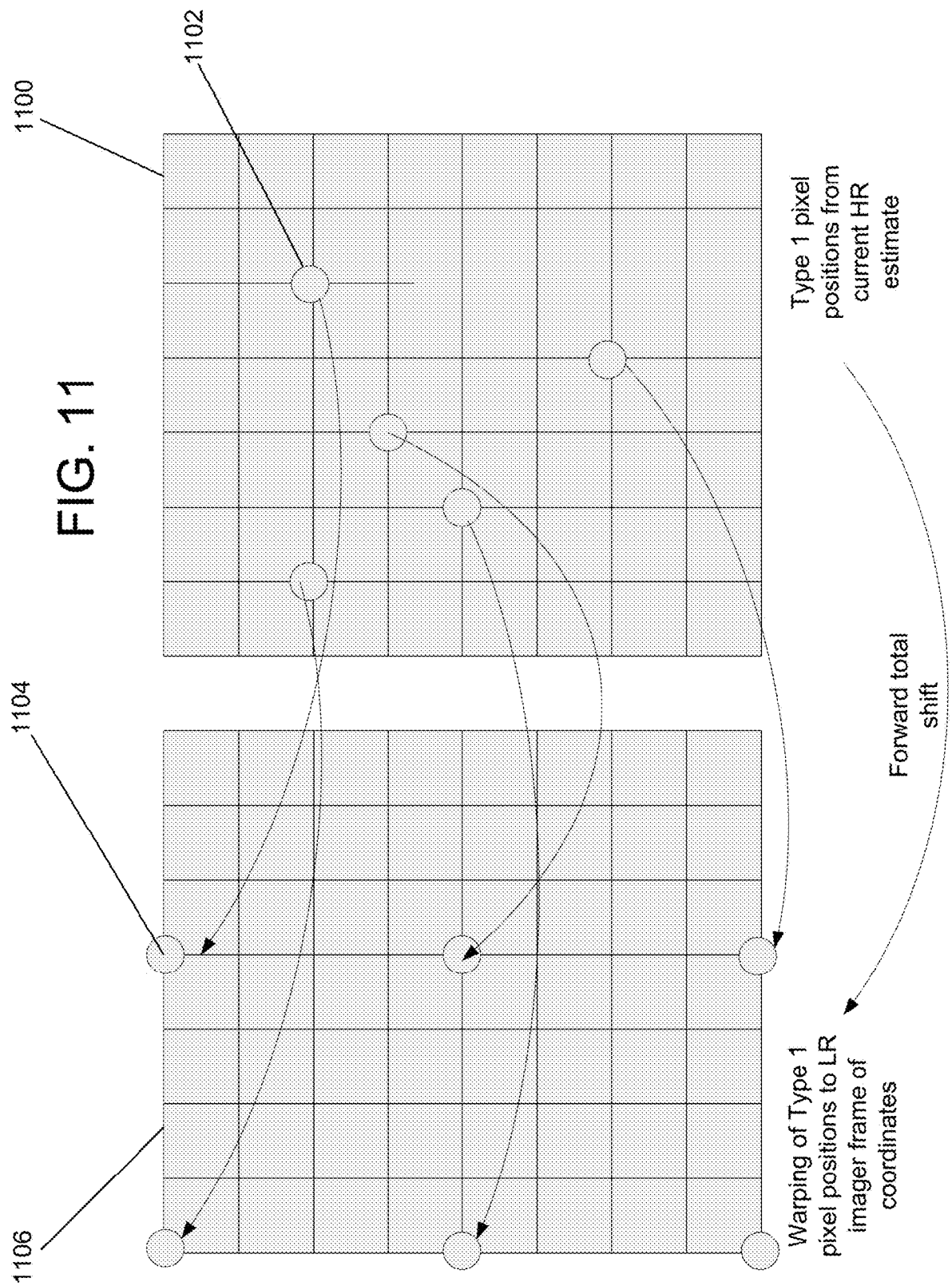
FIG. 11 conceptually illustrates the forward warping of pixel positions of an HR image estimate into the frame of coordinates of a target LR imager in accordance with an embodiment of the invention.

The warping of Type 1 pixel positions involves directly warping the pixels from the HR image estimate to the frame of coordinates of the LR imager using the total geometric transformation information from the HR image estimate to the frame of coordinates of the target LR imager. The warping process is illustrated in FIG. 11. As noted above, a separate warping is performed with respect to the HR image estimate and each input LR image. When the HR image estimate is being warped with respect to the frame of coordinates of a specific target LR image, the HR image estimate grid 1100 includes a number of pixel positions 1102 with origination information that indicates the pixels were originally from the target LR image (i.e. Type 1 pixels). For these pixel positions the forward warping is direct, in that the total warp information for the target LR imager can be used to take the pixel values in the Type 1 pixel positions from the current HR image estimate and place those pixel values in the proper positions 1104 on a decimation grid 1106 for the target LR imager.

Warping Type 2 Pixel Positions

When an HR image estimate is being forward warped with respect to a specific target LR imager, many of the pixel positions of the HR image estimate do not originate from the target LR imager. These Type 2 pixel positions can be warped to the frame of coordinates of the target LR imager by mapping the geometric transformation information (total shift) for the pixel positions through the reference LR imager. The total shift information is available with respect to the LR imager from which the Type 2 pixel position originated, which as noted above can be referred to as the "source" LR imager, and the reference LR imager. The total shift information is also available with respect to the target LR imager and the reference LR imager. The combination of these two sets of warping information can be used to generate total warping information to warp the Type 2 pixel positions between the various LR imagers from which they originated (i.e., source LR imagers), and the frame of coordinates of the target LR imager.

Various approaches can be taken to determine the warping to apply to a Type 2 pixel position. The parallax information can be mapped through the reference imager to determine the parallax shift to apply to the Type 2 pixel position. The total shift to apply to the Type 2 pixel position to shift it into the frame of coordinates of the target LR imager can then be obtained by adding the parallax shift to the geometric calibration data (scene-independent geometric transformation information) between the reference LR imager and the target LR imager. Processes for warping a Type 2 pixel position into the frame of coordinates of the target LR imager by determining parallax shift information in accordance with embodiments of the invention are discussed further below.

Figure 12:
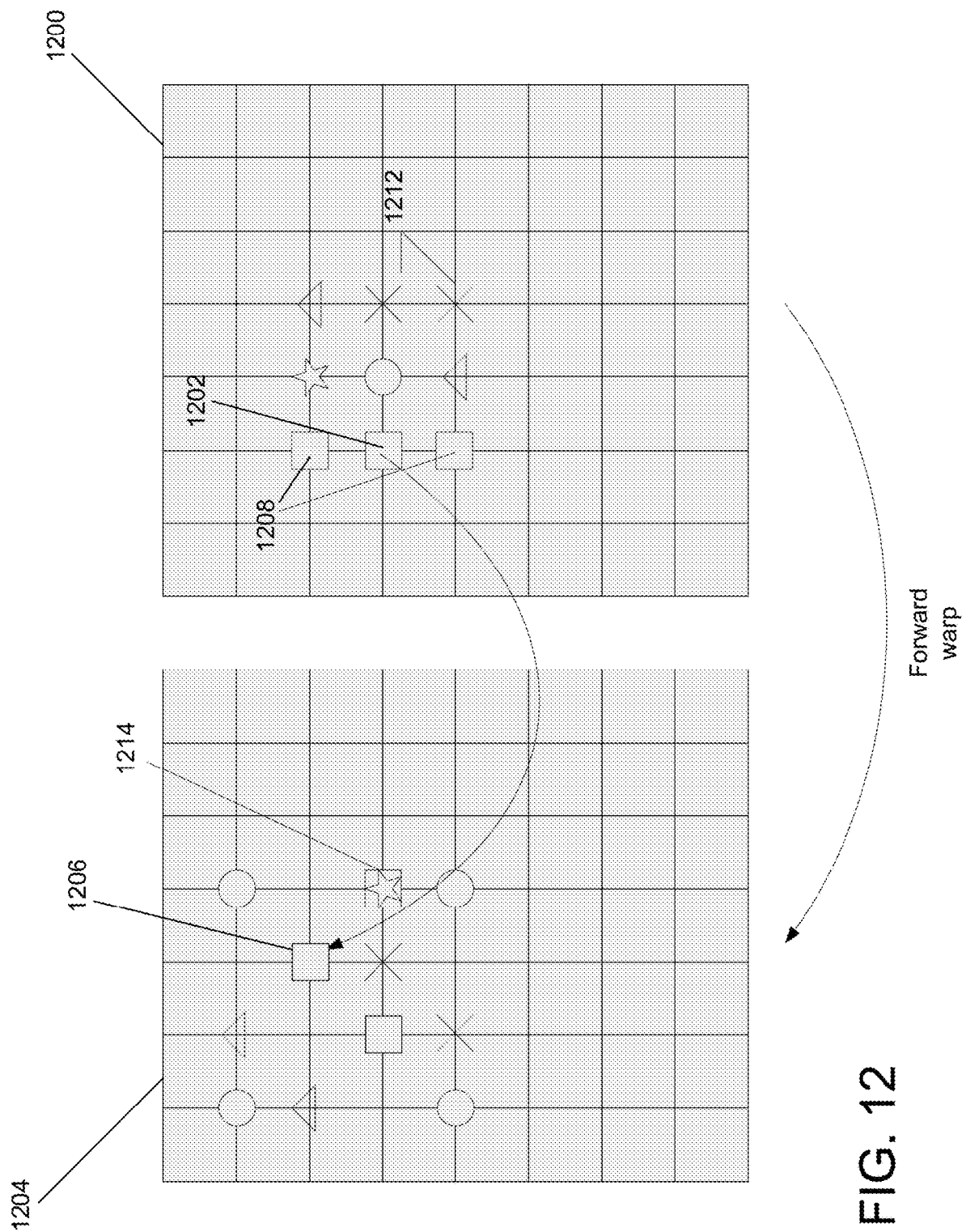
FIG. 12 conceptually illustrates the forward warping of pixel positions of an HR image estimate, where the pixels at the positions did not originate from a target LR imager, into the frame of coordinates of the target LR imager in accordance with an embodiment of the invention.

In order to determine the appropriate parallax shift for Type 2 pixel positions, the different parallax experienced by each LR imager can be considered. A Type 2 pixel position and the warping of the Type 2 pixel position into the frame of coordinates of a target LR imager in accordance with an embodiment of the invention are shown in FIG. 12. The HR image estimate grid 1200 includes a "square" Type 2 pixel position 1202 that has parallax information associated with it. The parallax information, however, relates this pixel position 1202 to an LR imager other than the target LR imager. As such, the parallax information for the pixel 1202 cannot be used to directly warp the pixel onto the decimation grid for the target LR imager 1204. However, the transformed parallax information can be computed using inter-LR imager calibration information (i.e., baselines) provided as an input to the SR process.

In a number of embodiments, the inter-LR imager calibration information utilized in computing the transformed parallax information includes the baseline distance (i.e. the distance between the center of each LR image) between the reference LR imager and the source LR imager, which can be denoted as bsource_x (vertical direction), bsource_y (horizontal direction), and the baseline distance with respect to the reference LR imager and the target LR imager, which can be denoted as btarget_x (vertical direction), btarget_y (horizontal direction). The parallax information associated with the source LR imager and the Type 2 pixel position can be denoted by parax and paray, and the parallax information that needs to be determined to be applied to warp the Type 2 pixel position to the frame of coordinates of the target LR imager can be denoted by target_parax and target_paray. The parallax information to be applied to warp the Type 2 pixel to the frame of coordinates of the target LR imager can be computed in accordance with the following process:

```
if(parax ~= 0)
    target_parax = btarget_x/bsource_x*parax;
    target_paray = btarget_y/bsource_x*parax;
elseif(paray ~= 0)
    target_parax = btarget_x/bsource_y*paray;
    target_paray = btarget_y/bsource_y*paray;
else
    target_parax = 0;
    target_paray = 0;
end
```

Once the parallax information target_parax and target_paray is computed, the computed parallax information can be added to the geometric calibration data between the reference LR imager and the target LR imager for the current pixel position to obtain the total shift to be applied for that pixel position. The total shift can then be used to shift the pixel in the Type 2 pixel position to place it on the decimation grid of the target LR imager in the appropriate pixel position 1206.

Although a specific process is discussed above, any of a variety of processes for determining the appropriate warping to apply to a pixel that does not originate from a target LR imager can be utilized to place the pixel on a decimation grid for the target LR imager in accordance with embodiments of the invention. Accordingly, any other appropriate technique can be utilized to warp Type 2 pixel positions onto the decimation grid of a target LR imager in accordance with an embodiment of the invention.

Warping of Type 3 Pixel Positions

Many pixel positions in an HR image estimate do not have origination or associated geometric transformation information (or warping information), i.e., Type 3 pixel positions. Type 3 pixel positions are illustrated as the "X" pixel positions 1212 in FIG. 12. In order for a pixel position to be a Type 3 pixel position, a determination has been made that there are pixel positions, within a given neighborhood of the pixel position, that are Type 1 or Type 2 pixel positions (i.e. originating from an LR imager). The Type 1 and/or Type 2 pixel positions can be used to warp the Type 3 pixel positions onto the decimation grid of a target LR imager. Referring again to FIG. 12, both "X" pixel positions 1212 have as neighbors Type 1 or Type 2 pixel positions. The SR processing has access to warping information for these neighboring pixel positions, albeit corresponding to various LR imagers that are not necessarily the target LR imager.

In several embodiments, the total shift for each Type 3 pixel position can be determined by:

a) determining the warping information for each of the neighboring Type 1 and/or Type 2 pixel positions to shift the pixels onto the decimation grid of the target LR imager in a manner similar to the manner outlined above with respect to Type 1 and Type 2 pixel positions, and b) determining the shift to apply to the Type 3 pixel position based upon the shift information for the Type 1 and/or Type 2 pixel positions according to some criterion.

In several embodiments, determining the warping information for a Type 3 pixel position based upon the warping information of neighboring Type 1 and/or Type 2 pixel positions involves computing a set of weights that relate the value of the pixel at the Type 3 pixel position to the values of the pixels in neighboring Type 1 and/or Type 2 pixel positions. This relation can be expressed using bilateral (or non-local mean) weights, which measure a bilateral proximity (e.g., spatial and range-wise) of the Type 3 pixel to its Type 1 and/or Type 2 pixel neighbors.

In a number of embodiments, the number of Type 1 and/or Type 2 pixel position neighbors that the Type 3 pixel position can be denoted by count_valid_neighbors, and the parallax information for each of the Type 1 or Type 2 pixel positions for warping the pixels to the frame of coordinates of the target LR imager are denoted by target_parax_cand(u) and target_paray_cand(u), u=1 . . . count_valid_neighbors. In addition, the weights applied to the parallax of each neighboring Type 1 or Type 2 pixel position are denoted by w(u), u=1 . . . count_valid_neighbors. In these embodiments, the parallax information (target_parax, target_paray) for each Type 3 pixel position is obtained by applying the weights w(u) to the parallax information for the neighboring Type 1 and/or Type 2 pixel positions in accordance with the following process:

```
target_parax=0;
target_paray=0;
for u=1:count_valid_neighbors
        target_parax=target_parax+(w(u)/wsum*target_parax_cand(u));
        target_paray=target_paray+(w(u)/wsum*target_paray_cand(u));
end
``` where $$wsum = \sum_{u=1}^{count\_valid\_neighbors} w(u).$$

The obtained parallax information can then be added to the geometric calibration data to obtain a total shift for the Type 3 pixel position and the pixel value can be shifted onto the decimation grid of the target LR imager. Although a specific process for shifting a Type 3 pixel position is outlined above, other processes for filtering warping information of neighboring pixel positions to obtain a total shift used to warp the Type 3 pixel position onto the decimation grid of a target imager can be utilized in accordance with embodiments of the invention.

Stacks of Pixels

During the process of warping pixels from the HR image estimate onto a decimation grid for a target LR imager, it is possible that multiple pixels are warped to the same position on the decimation grid. In this case, "collision stacks" are formed, which are resolved to at most one pixel per position that can then be processed by the subsequent operations (e.g., blur, decimation operators). For this purpose, the type of pixels that form a collision stack at a given position (k,l) on a decimation grid (see for example the 2-stack 1214 shown in FIG. 12), are accommodated. The collision stacks are formed from pixels that originated from Type 1, 2 and 3 pixel positions. In several embodiments, the following two stage process is utilized for selecting a single pixel from a collision stack:

1) apply rules for the formation of the stacks; and
2) select a pixel from the collision stack based upon on the types of pixels in the stack.

In many embodiments, the following rules are applied during the warping process to control the formation of a collision stack at a given position (k,l):

i) if the occlusion map for position (k,l) on the decimation grid for a target LR imager indicates that the pixel is occluded in the reference LR camera, then the pixel is discarded. When a pixel position is occluded to the reference LR imager, the position is not used in the subsequent formation of a gradient and can therefore be discarded;

ii) if there are no pixels in position (k,l), place the pixel in the position;

iii) if pixels from Type 1 and/or Type 2 pixel positions have already been placed at position (k,l), and another pixel from a Type 1 or Type 2 pixel position is warped there, add the pixel to the collision stack;

iv) if existing pixels from Type 1 and/or Type 2 pixel positions have already been placed at position (k,l), and another pixel from a Type 3 pixel position is warped there, discard the pixel from the Type 3 pixel position;

v) if pixels from Type 3 pixel positions have already been placed at position (k,l), and another pixel from a Type 3 pixel position is warped there, add the pixel to the collision stack;

vi) if pixels from Type 3 pixel positions have already been placed at position (k,l), and a pixel from a Type 1 or Type 2 pixel position are warped there, record the pixel from the Type 1 or Type 2 pixel position and discard the existing pixels. At which point, no further pixels from Type 3 pixel positions are added to the collision stack.

Figure 13:
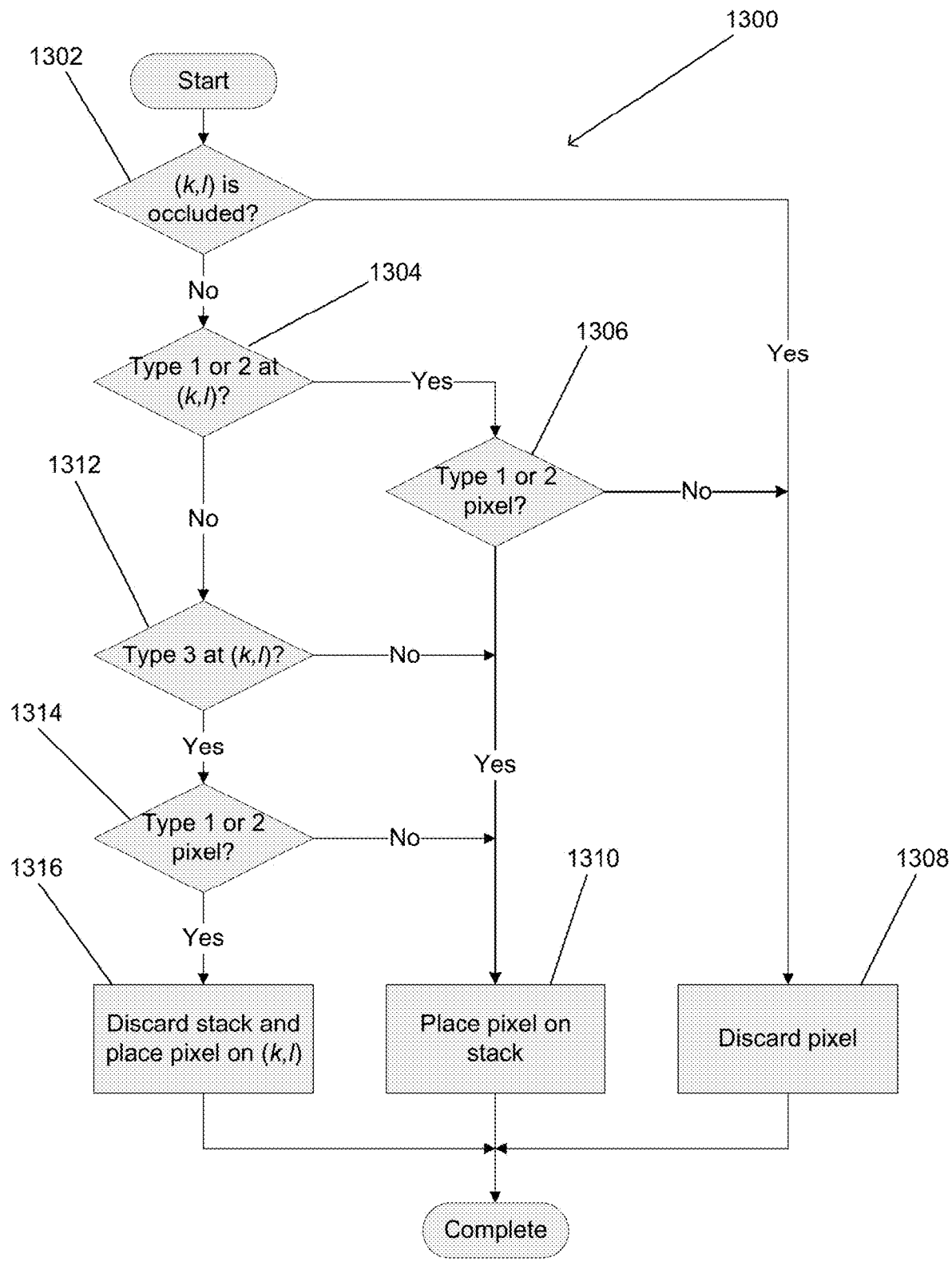
FIG. 13 is a flow chart showing a process for placing warped pixels on a decimation grid in accordance with an embodiment of the invention

A process that can be utilized to place warped pixels on a decimation grid in accordance with an embodiment of the invention is illustrated in FIG. 13. The process 1300 first determines (1302) whether the position (k,l) on the decimation grid to which the pixel is warped is occluded. When the pixel in position (k,l) is occluded in the reference LR imager, the pixel can be discarded (1308) in accordance with rule i) above. When the pixel is not occluded, a determination (1304) is made concerning whether there are any pixels from Type 1 or Type 2 pixel positions at position (k,l). In the event that there are pixels from Type 1 or Type 2 pixel positions, then a determination (1306) is made concerning whether the pixel being warped to position (k,l) is from a Type 1 or Type 2 pixel position. When the pixel is from a Type 3 pixel position, the pixel can be discarded (1308) in accordance with rule iv) above. When the pixel is from a Type 1 or Type 2 pixel position, then the pixel can be added (1310) to the collision stack in accordance with rule iii) above.

When there are no pixels from Type 1 or Type 2 pixel positions at position (k,l), then a determination (1312) is made concerning whether there are pixels from Type 3 pixel positions at position (k,l). When there are no pixels from Type 3 pixel positions, then the process knows that there are no pixels at position (k,l) and the pixel can be added (1310) to the location in accordance with rule ii) above. When there is at least one pixel from a Type 3 pixel position at position (k,l), then a determination (1316) is made concerning whether the pixel being warped to position (k,l) is from a Type 1 or Type 2 pixel position. When the pixel is from a Type 3 pixel position, the pixel is added (1310) to the collision stack in accordance with rule vi) above. When the pixel is from a Type 1 or Type 2 pixel position, then the pixels from Type 3 pixel positions at position (k,l) are discarded and the pixel from the Type 1 or Type 2 pixel position is placed onto the decimation grid at position (k,l) in accordance with rule v) above. Although a specific process is illustrated in FIG. 13, any of a number of different processes incorporating either the rules listed above or a different set of rules can be utilized in the placement of pixels onto a decimation grid in accordance with embodiments of the invention.

Once collision stacks have been formed on a decimation grid, an estimated depth-based filtering can be performed to decide the sample that will be selected at each position (k,l) on the decimation grid where there is a collision stack. Each pixel in the collision stack at position (k,l) has associated parallax information (target_parax and target_paray) and/or total shift information, as explained above. Relative-depth filtering can be performed using this parallax information.

The baseline for the target LR imager relative to the reference LR imager is known, and its vertical and horizontal components can be denoted by btarget_x and btarget_y. In a number of embodiments, depth-based filtering of pixels in a collision stack, aims to select the pixel from the collision stack that would appear closest to the reference LR imager in the scene captured by the reference LR imager and, therefore, is the pixel which would occlude all the other pixels in the collision stack. The depth-based filtering is thus an ordering (or sorting) operation based on the estimated depth-of-field of each of the pixels in the stack.

In many embodiments of the invention, the following method of filtering for a collision stack including M pixels is utilized:

```
for s=1:M
    if target_parax~=0
        z(s)=|btarget_x|target_parax|;
    elseif target_paray~=0
        z(s)=|btarget_y|target_parax|;
    else
        z(s)=0;
    end
end
index_of_min=sort(z); % sort values in ascending
order and obtain the index of
                    the % minimum value
```

Using the above pseudo-code, the index of the pixel in the collision stack that has the minimum estimated depth in the scene can be determined. This pixel is then selected as the value recorded at position (k,l) in the decimation grid for the target LR imager. Its parallax information is also recorded, since the gradient resulting at this position will have to be warped back into the frame of coordinates of the HR image estimate (i.e. the frame of coordinates corresponding to the reference LR imager).

Although specific processes for building pixel stacks and performing depth filtering are disclosed above, any of a variety of techniques that place a pixel from a pixel stack on a decimation grid of a target LR imager that are appropriate to a specific application can be utilized in accordance with embodiments of the invention.

Data Structure

A data structure that can be utilized in the processing of pixels in the manner outlined above can be formed which, at each pixel position in the decimation grid can store the pixel values being shifted there, with the possibility that more than one pixel, or none, may land in the same position in this data structure. If multiple pixels are shifted to the same position in this data structure, these multiple pixels represent a "collision stack" in the warped image. The data structure can also include a binary flag for each warped pixel, which indicates whether the pixel has associated origination information. The data structure can also include filtered parallax information for each pixel, where the filtered parallax information can be obtained in the manner outlined above and is utilized in shifting the pixel at that location from HR image estimate.

Empty Pixel Positions on Decimation Grid

After warping (populating) the (k,l) positions of the decimation grid for the target LR imager, in a manner similar to the manner outlined above, some pixel positions (k,l) may still remain empty. These pixels can be interpolated. In this way, a fully populated decimation grid can be formed, which is ready for the next stages of forward blurring and gradient computation. Alternatively, it is possible to leave these positions empty and avoid performing the operations that follow (i.e., blurring, gradient formation, inverse warping) across the vacant pixel positions, and setting the gradient to zero at these positions, for the target LR camera.

Forward Blurring

Once the HR image estimate has been warped onto the decimation grid of a target LR imager, the warped HR image estimate can be blurred by a total blur including both lens blur and sensor blur. Processes for determining the total blur and for applying the total blur to the pixels on the decimation grid of a target LR imager can be performed in accordance with the blur processes described above.

Decimation

Each position (k,l) in the warped and blurred HR image estimate is a pixel in an HR image simulated with respect to the frame of coordinates of a target LR imager. A simulated LR image with respect to the frame of coordinates of the target LR imager can be obtained by decimating the warped and blurred HR image estimate at regular decimating intervals corresponding to the SR factor r, starting at the origin of the decimation grid (see for example the decimation step 1012 in FIG. 10). While decimation can be performed as a separate process to obtain simulated LR images, as is discussed further below many SR processes in accordance with embodiments of the invention locally perform decimation as part of gradient computation.

Gradient Computation

Once the HR image estimate has been warped and blurred into the frame of coordinates of a target LR imager, a gradient computation similar to the gradient computation 1012 shown in FIG. 10 can be performed based upon the difference between the warped and blurred HR image estimate at the decimation positions and the input LR image pixels captured by the current target LR imager. In a number of embodiments, the gradient computation is performed for each pixel position (k,l) at the decimation positions on the warped and blurred HR image decimation grid corresponding to the target LR imager, and that are not occluded in the field of view of the reference LR imager. The aforementioned pixels on the decimation grid represent a synthesized LR image in the field of view of the target LR imager. While processes in accordance with embodiments of the invention can decimate the warped and blurred HR image to obtain the synthesized LR image, the pixels from the warped and blurred HR image estimate in the high resolution neighborhood of the pixels in the synthesized LR image can be utilized in uncertainty processing. Therefore, processes in accordance with many embodiments of the invention do not decimate the warped and blurred HR image estimate until after the gradient is formed. In these processes, a comparison is performed between the synthesized LR image pixels and the input LR image pixels captured by the target LR imager. However, additional information from the warped and blurred HR image estimate is also utilized in the uncertainty processing.

Whether a pixel is occluded when shifted back into the field of view of the HR image estimate can be easily tested as each pixel has associated with it total shifting information. The gradient can be directly computed from a comparison of the pixels at the decimation positions corresponding to the target LR imager and the input LR image captured by the target LR imager. In many embodiments, the gradient is determined in a way that accommodates uncertainty.

Accommodating Uncertainty in Gradient Calculations

In several embodiments, uncertainty is accommodated by performing block comparisons for pixels (k,l) at the decimation positions corresponding to the target LR imager (i.e. using a local decimation of the warped and blurred HR image estimate). Many processes for calculating the gradient at a pixel (k,l) at a decimation position in accordance with embodiments of the invention involve assigning the pixel to one of two different cases depending upon whether the target LR imager is within the same color channel as the HR image estimate. Although a specific process is discussed below for accommodating uncertainty in the gradient calculation, any of a variety of processes for determining gradient can be utilized in a MAP estimation process in accordance with embodiments of invention.

Calculating Gradient when Same Color Channel

Case A can be defined as the situation where the target LR imager is part of the same color channel as the HR image estimate, and the pixel (k,l) has origination information with respect to the target LR imager (i.e., is from a Type 1 pixel position). When the pixel (k,l) has origination information from the target LR imager, its originating coordinates (i(cam_count), j(cam_count)) from the target LR imager cam_count are recorded. As noted above, uncertainty in the array camera processing pipeline can be accommodated by comparing the pixel position (k,l) with a block of pixels in the neighborhood of the pixel's originating coordinates in the LR image. As such, other positions around (i(cam_count), j(cam_count)) may be recorded as well (e.g., in a window centered at (i(cam_count), j(cam_count))), for the purpose of forming a gradient at position (k,l). In several embodiments, the positions recorded for an LR imager centered at position (i(cam_count), j(cam_count)) are designated as s. Therefore, the set of positions that are used in the gradient calculation can be enumerated using the notation (i(cam_count,s), j(cam_count,s)). Expressing the positions in this way indicates the dependency of the LR position, with respect to which a gradient will be computed, on both the target LR imager that is selected, and the spatial position in that LR imager. Once the appropriate pixel positions are identified, the process for determining the gradient is the same in each case and is discussed below.

Calculating Gradient when Different Color Channel

Case B can be defined as the situation where the pixel (k,l) at a decimation position does not fall within Case A above. The difference from Case A above comes from how the gradient is computed at these types of positions (k,l). To determine the gradient at such positions two types of information can be determined:

1) the LR imagers to select for determining gradient at (k,l), and 2) the coordinates to consider in the selected LR imagers.

To decide on the first question, a window is centered at position (k,l) in the warped and blurred HR image estimate, the neighboring pixel positions in that window are checked for certain characteristics, and their information is recorded according to several criteria. These include whether a neighboring pixel was warped from a Type 1 or Type 2 pixel position in the current HR estimate, as previously defined, and whether the source LR imager from which the pixel originates is in the same color channel as the reference LR imager. If a neighboring pixel position satisfies these two conditions, the source LR imager identifier, i.e., camera_id, is added to the list, and the source LR imager origination information corresponding to that neighboring pixel is recorded. The latter consists of the coordinates (i(camera_id), j(camera_id)) in the source LR imager from which the neighboring pixel originated. Around this originating pixel, as before, a neighborhood of pixel positions can be recorded in each selected source LR imager. The neighborhood of positions recorded in a source LR imager can be indexed by s, situated in a local neighborhood (e.g., a rectangular window) around position (i(camera_id), j(camera_id)) and inclusive of it, i.e., the pixel and its neighbors can be referred to as indexed by (i(camera_id,s), j(camera_id, s)). In contrast to Case A described above, several neighborhoods of pixels in several of the captured LR images can be utilized in gradient calculations of pixels in Case B in accordance with embodiments of the invention. In addition, the size of the neighborhood can be adapted based upon the reliability of the pixel at position (k,l).

Gradient Formation

The process described above identifies blocks of pixels in the captured LR images that can be used in the computation of gradients for some, but possibly not all, of the decimation positions (k,l) in the warped and blurred HR image estimate.

In many embodiments, the information that is utilized in calculating gradients includes lists of source LR imagers (camera_id), and corresponding sets of coordinates (i(camera_id,s),j(camera_id,s)) from the source LR images, obtained as described above in various cases. Gradient formation for pixel positions (k,l) when various options are taken in terms of the number of LR imagers considered and the number of (i,j) positions in those LR images is discussed below.

For forming gradients at some positions (k,l) on the decimation grid in the warped and blurred HR image (such as described by Case A), we can have a single LR imager selected to be visited (i.e., the originating camera), and multiple positions around the coordinates (i,j) in this LR imager. Let us denote by p(k,l) the value of the pixel at (k,l). Alternatively, even for Case A we could use the same LR imager selection methodology for the purpose of forming gradients at position (k,l), as was described for Case B.

Gradient Formation Considering a Single Lr Imager

In one embodiment, for decimation positions (k,l) where a single LR imager is considered, the gradient is formed by taking the weighted sum of the difference between each pixel value q in the neighborhood of position (i,j) including the pixel at position (i,j) in the input LR image (i.e., for camera_id=cam_count), designated by q(i(cam_count, s), j(cam_count, s))), and the pixel value p(k,l). The weighted formation of the gradient at position (k,l) in the warped HR image corresponding to the target LR imager denoted by cam_count, can be written as:

$$g(\text{cam\_count}, k, l) = \sum_s \text{weight}(\text{cam\_count}, s) * \qquad (7)$$
$$[q(i(\text{cam\_count}, s), j(\text{cam\_count}, s)) - p(k, l)]$$

The cam_count index in the gradient expression g indicates that the gradient was formed by warping into the coordinate frame of the target LR camera (i.e. cam_count). The determination of weight(cam_count, s) is described below.

Gradient Calculation Involving Multiple Lr Imagers

For decimation positions (k,l) where more than one input LR image is involved in the computation of the gradient, whether the pixel is part of the simulated LR image or not, e.g., falling under Case B respectively, there are lists of input LR images indexed by camera_id, and coordinates of neighborhoods of pixels i(camera_id,s),j(camera_id,s)) in each of the input LR images, as it was described above. A weighted gradient can be accumulated at position (k,l) in the simulated LR image corresponding to the input LR image cam_count, using the following expression:

$$g(\text{cam\_count}, k, l) = \sum_{\text{camera\_id}} \sum_s \text{weight}(\text{camera\_id}, s) * \qquad (8)$$
$$[q(i(\text{camera\_id}, s), j(\text{camera\_id}, s)) - p(k, l)]$$

In Eq. (8), a weighted sum is taken of the difference between every pixel in the neighborhoods identified in each of the input LR images recorded in the list of LR imagers to be visited, and the value of the pixel at position (k,l). Again, the cam_count index in the gradient expression g indicates that the gradient was formed between the pixel values at the decimation positions from the HR image estimate, and the selected input LR images for that purpose (including the image captured by the target LR imager if appropriate, as described above).

Even though they were presented separately, Eq. (8) has as particular case Eq. (7) (obtained by making camera_id=cam_count), and only this latter expression will be further discussed.

Determining Weights to Apply to Pixel Comparisons

To determine the values of weight(cam_count,s) in Eq. (7) where camera_id=cam_count, or weight(camera_id,s) in Eq. (8) the following approach is taken, which assumes that localized decimation is performed as part of the gradient calculation process on the HR grid, instead of actually generating the decimated simulated LR images:

1) Take a block of size L×L centered at position i(camera_id,s),j(camera_id,s)) in the input LR image denoted by camera_id. Call this blk_LR.
2) Take a block of size L*r×L*r centered at position (k,l) in the blurred and warped HR image (r is the SR factor).
3) Decimate the block formed in point 2) above by r in each direction such that a block of size L×L is obtained with p(k,l) at its center. Call this block blk_HR.
4) Compute the weight(camera_id,s) as the bilateral weight (un-normalized) using the norm of the difference between blk_LR and blk_HR, i.e., $$\text{weight}(\text{camera\_id}, s) = e^{-|blk\_LR - blk\_HR|/\sigma}, \qquad (9)$$

where σ is a user-selectable parameter (typically as a percentage of the dynamic range of the imagers).

The sum of the weights for the component gradients that contribute to the gradient being formed at position (k,l) in the current warped HR frame is also recorded. This is:

$$\text{wsum\_grad}(\text{cam\_count}, k, l) = \sum_{\text{camera\_id}} \sum_s \text{weight}(\text{camera\_id}, s). \qquad (10)$$

The g(cam_count,k,l), and the sum of the weights wsum_grad(cam_countk,l) are decimated from the decimation grid using the decimation positions. The result is an LR gradient and LR sum of weights corresponding to the target LR imager. The accumulated gradient at any decimation position (k,l) (these positions correspond to the LR gradient image) is not normalized in the warped and blurred HR frame. Instead, the weighted gradient g(cam_count,k,l), and the sum of the weights wsum_grad(cam_count,k,l) computed as described above, are recorded at each decimation position (k,l) visited in the warped and blurred HR image estimate, and these two sets of LR data are backward-simulated (i.e. applying a backward imaging transformation, which is the reverse of the forward imaging transformation) through upsampling, transpose blurring, and warping back to the frame of coordinates of the current HR estimate (corresponding to the reference LR imager). Only after the weighted gradient and the corresponding weights are in the frame of coordinates of the current HR estimate, are the total accumulated gradients, at the grid positions in the current HR estimate, normalized. Processes for backward simulating weighted gradients and weights and accumulating backward simulated weights in accordance with embodiments of the invention are discussed further below.

Upsampling, Blurring and Back Warping the Calculated Gradients

For the decimation positions (k,l) in the warped and blurred HR image situated on the decimation grid, gradients and sum of weights can be computed as shown in Eqs. (7), (8) or (10). These values are situated on the decimation grid for the target LR imager, which is an HR grid corresponding to a high resolution image. The rest of the values in this HR grid are set to zero, thus effectively constructing an upsampled weighted gradient image, and the corresponding upsampled sum-of-weights matrix, corresponding to the warped HR image that is being processed. Both of these images are convolved with the transpose of the total blur H that was applied in the forward simulation previously described.

Following these operations, the resulting two matrices (upsampled and blurred weighted gradient, and upsampled and blurred sum of weights) are warped back into the system of coordinates of the current HR image estimate, by using the total shift information that was applied during the forward warping of the current HR image estimate into the frame of coordinates of the target LR imager to perform the backward or reverse warping (i.e. from the frame of coordinates of the current LR imager to the frame of coordinates of the HR image estimate).

It should be noted that the above operations do not have to be performed at the level of the entire HR grid, but rather a patch (local) implementation approach can be taken, with consideration given to the sizes of the local patches such that the operations described function correctly.

As noted above, in order to compute the likelihood gradient term the upsampled and blurred weighted gradient and upsampled and blurred sum of weights are warped back and accumulated at the corresponding position in the current HR image. The corresponding position in the current HR image for position (k,l) on the upsampled grid can be designated as (k',l'). This warping operation can use the total forward warp information generated during the warping of the current HR image estimate to the frame of coordinates of the target LR imager.

Once the above process is completed, the backward-simulated weighted-gradient corresponding to the target LR imager is formed and accumulated at the proper positions (k',l'), along with its backward-simulated sum-of-weights matrix, in the current HR image grid.

Accumulation of Gradients Across all Captured LR Images

Using the same described process, forward-warping (1008), blurring (1010), gradient formation (1012), upsampling (1018), transpose blurring (1020), and backward-warping (1022) is repeated for all, or subsets, of the LR imagers, as shown in FIG. 10. The gradients and the corresponding weights accumulate accordingly at all positions (k',l') in the HR image estimate's system of coordinates. The accumulated gradients at each position (k',l'), resulting from gradient computation with respect to all captured LR images, can be filtered in various ways to form the final gradient. For example, the accumulated gradient at each position (k',l') can be normalized by the sum of the weights accumulated at that position, i.e., dividing the accumulated gradient value by the corresponding weight at that location (k',l').

Normalizing the accumulated gradients with the weights accumulated at a position forms the final likelihood gradient term for the current iteration, for each position (k',l') in the current HR estimate (at iteration n). The likelihood gradient term can be combined with other gradient terms in the manner outlined below to determine a new estimate for the HR image (i.e., at iteration n+1).

The Intra-Channel Prior Gradient Term

An intra-channel prior term used in a MAP process in accordance with embodiments of the invention can be utilized to achieve any of a variety of image processing objectives. In a number of embodiments, the intra-prior term is used to stabilize the solution of the MAP estimation process. In many embodiments, the intra-channel prior term preserves edges in the estimated SR image, while smoothing noise in appropriate areas of the image (flat or smooth varying), and is adaptive to the local image content. In several embodiments, the intra-channel prior term seeks an invariance of the estimated SR image under an operator (K(.)). In a number of embodiments, the operator (K(.)) is, but is not limited to, a bilateral filter, or similar generalized non-local operator.

In many embodiments, K(.) is a locally (spatially)-adaptive kernel, and $\Lambda_1$ is a function of the local SNR (estimated for each pixel position on the HR grid), or be the identity matrix. The SNR at a given position can be estimated using:
a) the noise variance estimated at that position (as a function of the signal level and the analog gain of the sensor),
b) the observed image variance at that position, and
c) the blur model $H^c$.

Using the above formulation, the intra-prior term gradient is as follows:

$$\psi_{\Lambda_1}^{intra}(x^c) = \qquad (14)$$
$$2\Lambda_1(I-U)(x^c - K(x^c)) = 2\Lambda_1[(x^c - K(x^c)) - U(x^c - k(x^c))]$$

where $\Lambda_1$ is a function of the local SNR (estimated for each pixel position on the high resolution grid), or can be the identity matrix. I is the identity matrix.

Given that the operator K(.) is local, Eq. (14) is implemented locally by filtering each pixel in the high resolution estimate $x^c$ in a window W centered at that pixel position. Thus, to implement Eq. (14) and compute the intra-prior gradient at a position (k,l) (appropriately translated from 2D to vector coordinates, since $x^c$ is a vector-form of the image) in $x^c$, in the local window W centered at position (k,l), the filtering proceeds as follows. Assume p(k,l) is the initial value of the pixels in $x^c$:

1) Filter the current estimate $x^c$ using the filter operator K(.) (e.g., a bilateral filter). The resulting filtered pixels are denoted by p1(k,l).
2) Form the block difference e containing pixels e(k,l)=p(k,l)−p1(k,l), for all (k,l) in a local window W centered at (k,l).
3) Convolve the block of difference signal e(k,l) in window W, centered at (k,l) and obtained as in point 2) above, with the matrix operator $U_{W_{k,l}}$ such that the gradient value at position (k,l) is:

$$g^{intra}(k,l) = 2\eta_{k,l}[(p(k,l) - p1(k,l)) - (U_{W(k,l)} * e)(k,l)], \qquad (15)$$

where * is the convolution operator, and $\eta_{k,l}$ is the value from the diagonal matrix $\Lambda_1$ in Eq. (14) corresponding to the 2D position (k,l).

By way of example, a 5×5 window size W can be taken and the matrix operator $U_{W_{k,l}}$ applied to the 2D local block e at position (k,l) has the form:

$$U_{W_{(k,l)}} \begin{bmatrix} \frac{w(k-2,l-2;k,l)}{Z(k-2,l-2)} & \frac{w(k-2,l-1;k,l)}{Z(k-2,l-1)} & \frac{w(k-2,l;k,l)}{Z(k-2,l)} & \frac{w(k-2,l+1;k,l)}{Z(k-2,l+1)} & \frac{w(k-2,l+2;k,l)}{Z(k-2,l+2)} \\ \frac{w(k-1,l-2;k,l)}{Z(k-1,l-2)} & \frac{w(k-1,l-1;k,l)}{Z(k-1,l-1)} & \frac{w(k-1,l;k,l)}{Z(k-1,l)} & \frac{w(k-1,l+1;k,l)}{Z(k-1,l+1)} & \frac{w(k-1,l+2;k,l)}{Z(k-1,l+2)} \\ \frac{w(k,l-2;k,l)}{Z(k,l-2)} & \frac{w(k,l-1;k,l)}{Z(k,l-1)} & \frac{w(k,l;k,l)}{Z(k,l)} & \frac{w(k,l+1;k,l)}{Z(k,l+1)} & \frac{w(k,l+2;k,l)}{Z(k,l+2)} \\ \frac{w(k+1,l-2;k,l)}{Z(k+1,l-2)} & \frac{w(k+1,l-1;k,l)}{Z(k+1,l-1)} & \frac{w(k+1,l;k,l)}{Z(k+1,l)} & \frac{w(k+1,l+1;k,l)}{Z(k+1,l+1)} & \frac{w(k+1,l+2;k,l)}{Z(k+1,l+2)} \\ \frac{w(k+2,l-2;k,l)}{Z(k+2,l-2)} & \frac{w(k+2,l-1;k,l)}{Z(k+2,l-1)} & \frac{w(k+2,l;k,l)}{Z(k+2,l)} & \frac{w(k+2,l+1;k,l)}{Z(k+2,l+1)} & \frac{w(k+2,l+2;k,l)}{Z(k+2,l+2)} \end{bmatrix} \quad (16)$$

where, w(k,l;k',l') are the weights of the operator K(.) (e.g., bilateral filter, or its non-local block extension) computed at position (k,l) with respect to position (k',l') inside window W. In turn, the variables Z(k,l) represent the sum of all the weights w(k,l;k',l'), where the indices (k',l') vary in the neighborhood W of (k,l).

Although a 5×5 window size is discussed above, any of a variety of window sizes can be utilized in accordance with embodiments of the invention to obtain the matrix operator $U_{intra}$ used in the calculation of the intra-channel gradient term at pixel position (k,l).

In other embodiments, different intra-channel priors can be utilized. In several embodiments, an alternative prior term can be used that can be formulated in similar terms to Eq. (1)-(2) above. As in the process described above, the output of the Pilot Fusion process is utilized as the initial HR estimate, $x^c(0)$. Alternatively, another initial estimate may be provided for the super-resolution processing (such as for example an interpolated high resolution version of the reference camera image). The iterative, HR-estimate updating process then proceeds as follows:

$$x_{ML}^c(n+1) = x^c(n) - \beta'' \nabla_{x^c(n)}(J(x^c(n))), \quad (17)$$

where $$\nabla_{x^c(n)}(J(x^c(n))) = VT(x^c(n)), \quad (18)$$

and $$x^c(n+1) = F^{-1}\{T(F(x_{ML}^c(n+1)))\}, \quad (19)$$

where F is a sparsifying transform known in the art (e.g., a wavelet, or directional transform), $F^{-1}$ is its inverse (it is understood that the transform can be designed such that an actual inversion operation need not be taken, e.g., an orthogonal transform for which its inverse is equal to its transpose), and T is a hard or soft thresholding operator known in the art, which is applied to the transform coefficients. The likelihood-term gradient in Eq. (18) is determined using processes in accordance with embodiments of the invention including processes described herein.

Inter-Channel Gradient Terms

The inter-channel prior term enforces a correlation of edge direction and strength across channels. Although an inter-channel prior term can be incorporated into a MAP process in accordance with many embodiments of the invention, in many embodiments it is computationally efficient to enforce edge direction and strength through the cross-channel of R and B with respect to a HR image estimate for the G channel obtained using the MAP process described above (excluding an inter-channel gradient term).

Combining the Computed Gradient Terms

The gradient terms determined as described above (i.e., likelihood-term gradient, intra-prior gradient, and if available inter-prior gradient) are accumulated at the end (possibly in a weighted fashion as dictated by the matrices $\Lambda_1$ and $\Lambda_2$ in Eq. (2)), to form the total gradient for the current iteration, as shown in Eq. (2). The total gradient is then scaled by the step size $\beta''$ for the iteration, and applied to the current HR image estimate, thereby obtaining a new HR image estimate in the current channel, as indicated in Eq. (1).

Using the approaches described for the determination of the gradients in Eq. (2), this is performed iteratively in Eq. (1), until a stopping criterion is reached (e.g., a norm on the variation of the estimate with iteration number falls below a certain threshold, or the maximum number of iterations is attained), as shown in FIG. 9.

Combining the HR Image Estimates from Each Channel

Once HR image estimates have been obtained for each color channel, a final SR image can be generated by combining the HR images from each channel. In many embodiments, an estimation process similar to the process outlined above is used to generate a HR image for the Green channel. The Red and Blue channels can then be fused only, or can themselves be processed using a similar MAP process. Where the Red and Blue channels are super-resolved at lower resolution than the Green channel (possibly due to fewer LR imagers allocated to the R and B channels due to the lesser sensitivity of the human visual system to these channels compared to the Green channel), the Red and Blue channels can be upsampled (i.e., interpolated) to the full resolution of the Green channel and the three channels combined using any suitable technique for combining three color channels to produce a full color image. As part of the process, the Red and Blue channels can undergo conventional denoising and sharpening. In several embodiments, the Red and Blue channels are fused by enforcing a cross-channel correlation (e.g., in a color-difference sense and fused using the Red-Green and Blue-Green color difference). Or this can be done by fusing a combination of the R,G,B channel data such as fusing the 2*G-R-B and G-B signals for example (pixel-wise), instead of fusing the values of the R and B pixels on the HR grid. Thus, these signals are fused in a manner correlated with the HR image estimate for the Green channel generated in accordance with one of the processes outlined above. The fusing of the Red and Blue channels, or the Red-Green and Blue-Green color difference information, can be performed using a process similar to the Pilot Fusion processes outlined above or additionally using a selective MAP processing of the obtained fused R and B channels, after the color-difference fusion. The selectivity of the applied MAP processing can be driven by the HR occlusion maps that are created in the SR processing of the Green channel, such that the MAP processing is applied to the R and B fused data only in the occlusion zones on the HR grid onto which the color HR image is reconstructed. In another embodiment, the depth estimated for the pixels in the HR image is used to enhance the fusion of the R and B channels. The HR fusion of the R-G and B-G data and the reconstruction of R and B HR image information from that process, the enhanced fusion of the R and B channels using HR depth information, and the selective application of the MAP processing to the fused R and B HR images are discussed further below. It should be noted that the enhanced fusion of R and B and the optional MAP processing of the HR R and B images can be performed whether the R and B HR fusion is done channel-wise, or cross-channel (using color difference processing).

The grid resolution at which the R and B images are reconstructed (through fusion and possibly MAP processing) may be lower or the same as that of the resolution of the Green channel. In the former case once the R and B images have been fused at the given resolution, they are brought at the same grid resolution as the Green channel if the G,R,B HR color planes are output by the SR processing system. This final step of increasing the resolution from the fusion grid of the R and B channels to the grid resolution of the Green channel can be done by a conventional interpolation method (including cross-channel interpolation techniques). Alternatively, the R and B fusion can be performed directly at the same grid resolution as that of the G channel, and using the already estimated (dense) HR G channel.

Enhanced fusion of the R and B channels can be performed similarly to the processing described above for the G channel, by using HR depth information in the process of fusion. In several embodiments, the enhanced fusion involves directing the interpolation of pixel values by assigning relative weights to the pixels based upon their HR depth information. The selective MAP processing for the restoration of the R and B channels can be carried out by using the HR occlusion map estimation generated by processes supporting dynamic focus functionality, in that for efficiency purposes the MAP processing can be carried out only in occlusion zones in the R and B channel. Although specific processes are disclosed above with respect to combination of different color channels, any of variety of processes can be utilized including processes that utilize alternative and/or additional channels of information to generate a high resolution image combining information from two or more channels in accordance with embodiments of the invention.

Alternative Calculations of Gradient Terms

Although specific processes are described above for determining the likelihood, intra-channel, and/or inter-channel gradient terms utilized in improving an estimate of an HR image in accordance with embodiments of the invention, other techniques can also be used in the determination of gradient terms. By way of example, optimization processes based upon Eqs. (1) and (2) above that utilize alternative processes for determination of likelihood gradient in accordance with embodiments of the invention are discussed further below.

Figure 14A:
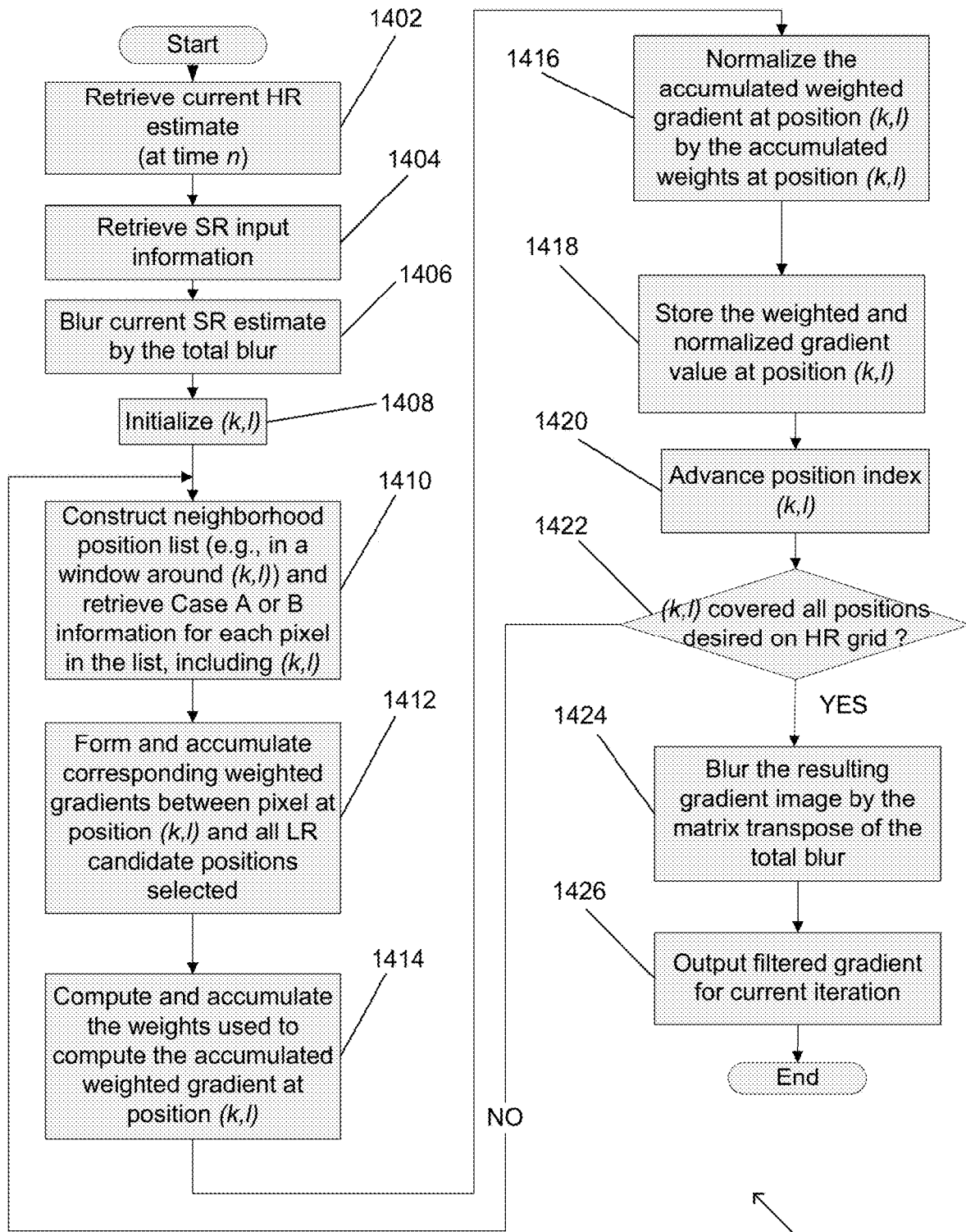
FIG. 14A is a flow chart showing a process for formulating a likelihood gradient term in accordance with an alternative embodiment of the invention.

A process for determining a likelihood gradient term in an SR process in accordance with an embodiment of the invention is illustrated in FIG. 14A. The process 1400 starts by initializing (1402) the first estimate of the HR image using the output of Pilot Fusion processing, and obtaining (1404) any auxiliary input information such as inter-LR imager geometric correction information as defined above, including scene-independent geometric correction information (such as geometric calibration) and scene dependent geometric correction information (such as parallax information), occlusion information, and imaging prior information (e.g., per-pixel SNR estimates in the HR frame). All these input data are discussed above with respect to other techniques for calculation of the likelihood gradient term. As before, not all of the inputs are necessary, although most embodiments utilize the current HR image estimate and the captured images at a minimum. If the parallax information is not available and/or parallax is only slight, the SR uncertainty processing may compensate for the lack of it. In addition, the absolute distortion and the relative distortion among cameras (i.e., the scene-independent geometric distortion) can be so small that only the scene dependent parallax inherent in the LR imagers manifest themselves and can be calibrated.

The HR image estimate is then blurred (1406) by the total blur H, which includes lens blur and the sensor blur. In the blurred HR image estimate, each pixel at position (k,l) is then visited for the purpose of forming a gradient at that position with respect to one or more of the input LR images. As before, it is assumed either that the LR images have been geometrically corrected, or that geometric correction information including geometric calibration data and parallax information (if available) are available. Thus, in the ideal case, the total shifting information is available for the pixels that originate from one of the LR imagers, as it was the case above. In case some of this information is not available, and depending on the severity of the parallax, the uncertainty search window size, which will be discussed below, may be adjusted (increased) accordingly.

The discussion of the process illustrated in FIG. 14A that follows assumes that geometric calibration data exists for the pixel at position (k,l) with respect to the other imagers in the array, and also that parallax information exists relating the LR imagers in the array. Similar to the process for calculating the likelihood gradient term discussed above, there exist different cases in terms of how much information there is relating the position (k,l) in the blurred HR image estimate and the input LR images depending upon whether the pixel at position (k,l) originated from an LR imager in the same color channel as the HR image estimate. The gradient formation in each of these cases is described below involving selecting neighborhoods of pixels in the captured LR image(s) (1410), and accumulating weighted gradients (1412) at each pixel position (k,l).

Gradient Computation

Figure 14B:
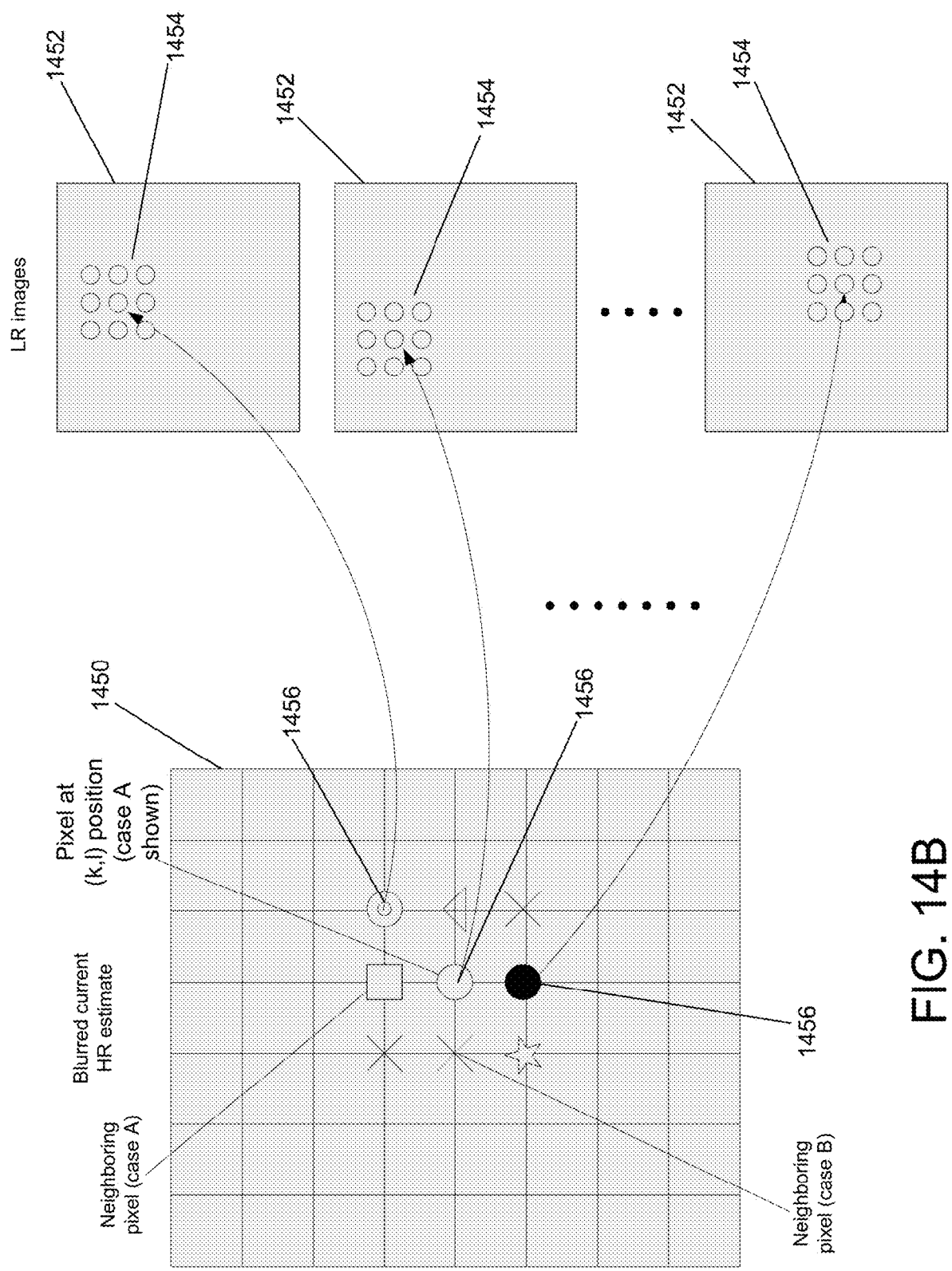
FIG. 14B illustrates the process of forming gradients between a current HR image estimate and input LR images in an SR process in accordance with embodiments of the invention.

The computation of gradients in the process illustrated in FIG. 14A is conceptually illustrated in FIG. 14B. The computation of gradients depends upon whether a pixel has origination information from an LR imager from the same color channel as the blurred current HR image estimate.

Gradient Computation when Same Color Channel

Case A can be defined as applying to pixel positions (k,l) in the blurred HR image estimate (1450) that originated from an LR imager (1452) within the same color channel as the HR image estimate. A neighborhood of pixels (1454) around the origination coordinates (i(cam_count),j(cam_count)) in the source LR imager cam_count can be recorded for the purpose of forming a gradient at position (k,l). The neighborhood of recorded positions in a captured LR image can be indexed by s and the neighborhood of pixels indexed as (i(cam_count,s),j(cam_count,s)). In the illustrated embodiment, three Case A pixels (1456) are shown as being mapped onto three different LR images by way of illustration. The same process is used for determining the gradient at position (k,l) in both cases and is discussed below.

Gradient Computation when not Same Color Channel

In the context of the process illustrated in FIG. 14, Case B can be defined as applying to pixel positions (k,l) in the blurred HR image estimate that do not have origination information in a source LR imager from the same color channel as the current HR estimate (i.e., that of the reference LR imager), or do not have any origination information at all. The difference from Case A above comes from how the gradient is computed at these types of positions (k,l). To determine the gradient at such positions, two types of information are utilized:

1) the LR imagers to select for determining gradient at (k,l), and
2) the coordinates to consider in the selected LR imagers.

To decide on the first question, a window is centered at position (k,l) in the blurred HR image estimate (1450), the neighboring pixel positions in that window are checked according to specified criteria, and their information is recorded if several criteria are satisfied. These include whether a neighboring pixel falls under Case A described above. If the neighboring pixel position satisfies this condition, a neighborhood of pixels around the Case A pixel's originating position in the input LR image from which the Case A pixel originated is recorded (LR image from camera_id). The neighborhood of pixels can be referred to as (i(camera_id,s),j(camera_id,s)). The information used to compute gradients for pixels at positions (k,l) falling under Case B in the blurred HR image estimate typically includes a number of neighborhoods in the input LR images that are in the same color channel as the blurred HR image.

It should be noted that even in Case A, the selection of neighborhoods of pixels in multiple captured LR images can proceed in the same manner as outlined with respect to Case B.

Gradient Formation

A weighted gradient is accumulated at position (k,l) corresponding to the blurred HR image, assuming the current pixel value in the blurred HR estimate image is p(k,l):

$$g(k, l) = \sum_{camera\_id} \sum_{s} \text{weight}(camera\_id, s) * \quad (20)$$
$$[q(i(camera\_id, s), j(camera\_id, s)) - p(k, l)]$$

Eq. (20) shows how the weighted summation of gradients is taken over all LR imagers indexed by camera_id, and all the positions (i,j) in the identified neighborhoods in the corresponding captured LR images.

Determining Weights to be Applied

To determine the values of weight(camera_id,s) in Eq. (20) the following approach is taken:

1) Take a block of size L×L centered at position (i(camera_id,s),j(camera_id,s)) in the input LR image designated by camera_id. Call this blk_LR.
2) Take a block of size L*r×L*r centered at position (k,l) in the blurred current HR image (r is the SR factor).
3) Decimate the block formed in 2) above by r in each direction such that a block of size L×L is obtained with p(k,l) at its center. Call this block blk_HR.
4) Compute the weight(camera_id,s) as the bilateral weight (un-normalized) using the norm of the difference between blk_LR and blk_HR, i.e., $$\text{weight}(camera\_id, s) = e^{-|blk\_LR - blk\_HR|/\sigma}, \quad (21)$$

where σ is a user-selectable parameter, typically assigned a value that is a function of the dynamic range of the input LR images.

The sum of the weights for the component gradients that contribute to the gradient being formed corresponding to position (k,l) in the blurred current HR image is also recorded as follows:

$$\text{wsum\_grad}(k, l) = \sum_{camera\_id} \sum_{s} \text{weight}(camera\_id, s). \quad (22)$$

It should be noted that the above operations do not have to be performed at the level of the entire HR grid, but rather a patch (local) implementation approach could be taken, with consideration given to the sizes of the local patches such that the operations described function correctly.

Normalization of Accumulated Gradients

Referring back to FIG. 14A, the accumulated weighted gradient at position (k,l) in the current HR image estimate (i.e., g(k,l)) is normalized (1416) by the accumulated sum of the weights wsum_grad(k,l), by dividing g(k,l) by wsum_grad(k,l). The normalized gradient at position (k,l) is stored (1418) and the procedure advances (1420) across all positions on the blurred HR image estimate until (1422) every position on the HR grid has been considered.

Once the gradient image corresponding to the current blurred estimate has been formed as above, the resulting gradient image is blurred (1424) by the transpose of the total blur which was used in the forward simulation path (i.e., sensor plus lens blur) to provide the final likelihood gradient term for the current iteration, for each position (k,l) in the HR image estimate. The likelihood gradient term can be used in the manner outlined above, in combination with intra-channel and/or inter-channel gradient terms where available, to determine a new estimate for the HR image. Alternatively, any of a variety of other techniques can be utilized for determining the likelihood gradient term appropriate to specific applications in accordance with embodiments of the invention.

Dealing with Problem Pixels

During image processing, a complex consideration often exits concerning how to diminish the impact of "problem" pixels on an output image. Problem pixels are those pixels that are not appropriate members of the data set under consideration. Problem pixels can arise for a variety of reasons including "defective" pixels in an imager. The term "defective" pixel refers to a pixel in an imager that does not produce useful output information and includes so called "hot", "cold", "warm", and "cool" pixels, which refer to specific types of pixel failures. The set of pixels that can be treated as problem pixels also includes phantom pixels in neighborhood operations when that neighborhood extends beyond the edge of an image or the phantom pixels that are exposed when a part of an image is shifted physically leaving no information in its original position (this class is referred to as "occlusion set" pixels). Typically a problem pixel requires special case processing, which slows throughput due to case checking and alternate processing branches. The special cases branches that are often involved in special case processing complicate, and increase the burden associated with image processing. Special case processing can also produce artifacts in the output image.

SR processes in accordance with embodiments of the invention weight the contributions that the LR image samples from the LR images make to the synthesized output image. In many embodiments, assigning a weighting of zero to LR image samples that are determined to be "outliers" means that they are ignored during the remainder of the SR processing. In several embodiments, the mechanism for assigning a weighting of zero to an LR image sample is utilized to deal with all classes of problem pixels in a unified manner. Whenever such pixels are encountered during upstream processing of the LR image samples, problem LR image samples are flagged by assigning them a unique value in place of their original value, if any, or setting an associated flag. For example, LR image samples can be flagged by maps of defective pixels, in noise processing algorithms where they are flagged as outliers, at boundaries of images or of segmented portions of images, and in the occlusion sets of translated image elements. Subsequent SR processing can disregard all flagged problem LR image samples in the generation of the output SR image. Treating problematic LR image samples in this way not only provides for uniform treatment of such LR image samples, but also reduces many of the artifacts that can occur when processing such LR image samples with special case processing branches, and reduces the computational load on the processing pipeline.

As can be readily appreciated, any type of pixel determined to be problematic including but not limited to the problem pixel types referenced above can be identified at one or more processing stages that occur prior to the SR process in an image processing pipeline in accordance with an embodiment of the invention. In addition, any of a variety of flagging techniques appropriate to the requirements of the SR process can be utilized to communicate to the SR process that the problem LR image samples should be disregarded in the formation of the output SR images.

Array Cameras with Multiple Fields of View

The array cameras described above assume a fixed focal length for each of the imagers in the imager array. The sub-pixel phase shift between the cameras encodes much of the information from the scene in the LR images captured by the cameras, making the LR images amenable to resolution recovery through multi-channel signal processing methods such as the SR processes described above. An alternative technique for constructing an array camera in accordance with embodiments of the invention is to create an array, which includes imagers having different fields of view. Changing the field of view of an imager results in a change in magnification of the image captured by the underlying sensor. In an array camera, this difference in magnification between imagers in the array allows variation in the degree of SR processing required to recover a desired resolution, which can be beneficial both from the point of view of needing less computation and from the point of view of resolution recovery quality. By varying the magnification in a controlled way across the lens array, the computation required to recover a desired resolution through SR processing can be reduced.

An imager's field of view can be determined by its optics. The focal length of the imager defines the 'size' of the image captured on the sensor. A lens with a larger focal length typically captures an image which is proportionately larger than that captured by a lens with the smaller focal length. For example, the image of an object produced by a lens with a focal length of 100 mm will be exactly double the size of an image formed by a lens of focal length 50 mm at the same distance from the object. The relationship between focal length and the field of view captured means that the focal length of an imager and the size of the images captured by the imager are directly proportional. The curvature of an imager's lenses also impacts its field of view. The field of view of an imager can be increased without changing the focal length of the lens by using more curved and aspheric surfaces.

Figure 15A:
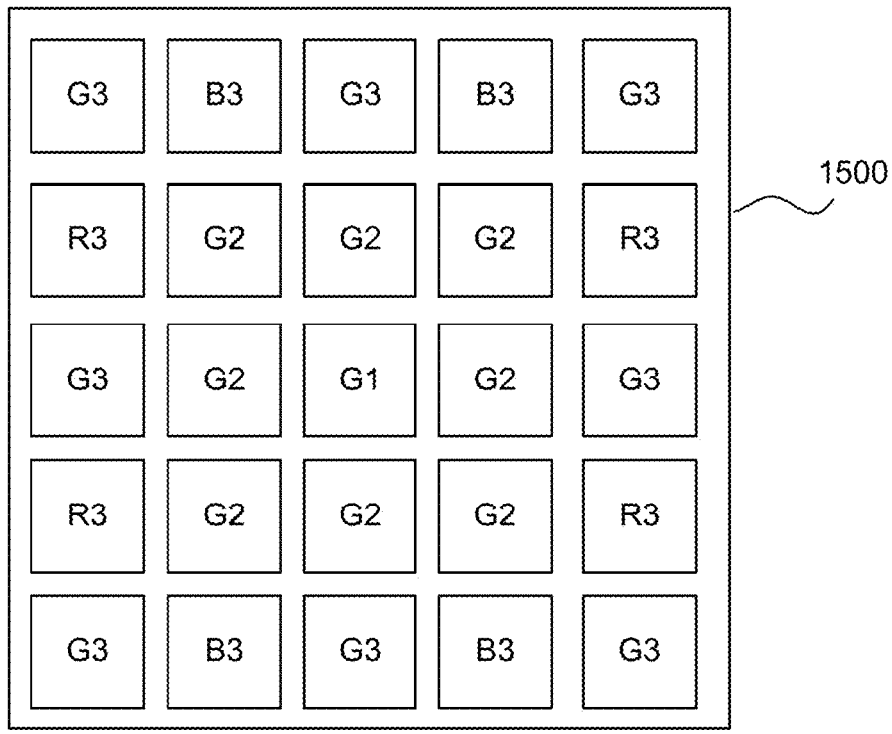
FIGS. 15A and 15B illustrates imager arrays including different categories of luma imagers, where each category of luma imager shares a different field of view, in accordance with embodiments of the invention.
Figure 15B:
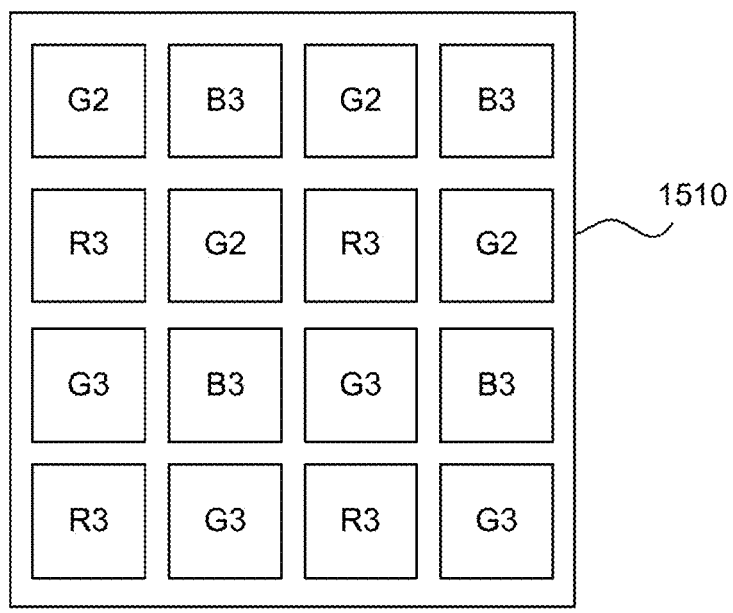

Embodiments of 5×5 and 4×4 imager arrays including imagers with different fields of view that are suitable for use in array cameras in accordance with embodiments of the invention are illustrated in FIGS. 15A and 15B respectively. The 5×5 imager array 1500 illustrated in FIG. 15A includes 25 imagers, which are assigned so that 17 imagers sense luma (or green light (G)), and 8 imagers sense chroma (red light (R) or blue light (B)). The 17 imagers sensing luma are sub-partitioned into three categories, based on their respective fields of view (fov)—category 1 (G1) with ¼ the maximum field of view ($fov_{max}$), category 2 (G2) with ½ the maximum field of view, and category 3 with the maximum field of view. The following table compares the resolution of the array camera shown in FIG. 15A, where each imager is a VGA camera, at each focal length with the resolution of a conventional 8 Megapixel fixed focal length camera employing a Bayer filter and using digital zoom to provide an image of an equivalent field of view.

TABLE 1

Three Categories of Multi Field of View VGA Cameras for a 5 × 5 array configuration

| Category | fov as % of $fov_{max}$ | # of VGA Imagers | # of Luma Pixels in Legacy Cam within fov | Resolution Recovery Strength per Linear Dim. |
|---|---|---|---|---|
| 1 | ¼ | 1 | 240,000 | 0.78 |
| 2 | ¾ | 8 | 2,160,000 | 7.03 |
| 3 | 1 | 8 | 4,000,000 | 13.02 |

The above table illustrates a comparison between a 3200× 2400 8 Megapixel legacy camera spanning a field of view 'fov'. The field of view is spanned by all 4000 pixels along the diagonal fo the 3200×2400 frame. Considering the first row of Table 1, the number of pixels along this diagonal that span just a quarter of the full field of view (i.e. fov/4) would be approximately 1000 pixels (4000/4). Given that the frame has a 4/3 aspect ratio, this would imply that the sub-rectangle that spans a diagonal of 1000 pixels center around the center of the frame is approximately 800×600 pixels. This rectangle has 480,000 pixels of which only half have green (luma) pixles (assuming legacy camera employs a Bayer filter). Thus, the fourth column in first row of of Table 1 shows the number of luma pixels in the legacy camera within the fov of (fov/4) is 240,000 pixels. The final column is the ratio of the number of pixels in the legacy camera capturing this field-of-view (fov/4) to the number of pixels in the array camera, where each LR imager has 640×480 pixels, capturing the same field of view (fov/4). The ratio provided in the final column of table 1 lists the strength of resolution recovery required through SR processing for the array camera to achieve the same resolution as the image obtained from a conventional camera using digital zoom. A value less than 1 indicates that the resolution of the individual VGA camera is more than that of the legacy camera in that region. As can be seen from table 1, the array camera has greater resolution in the central foveal region than the 8 Megapixel conventional camera. The Category 2 and Category 3 comparisons reveal that a strength of resolution recovery greater than 1 is needed for the array camera to match the resolution of equivalent images captured with an 8 Megapixel conventional camera using digital zoom. The number of imagers in Category 3 falls a little short of what is required. However, the performance of the array camera is probably acceptable since the resolution of any camera degrades with increasing field of view and the marginal decrease posted by the Category 3 imagers at fields of view greater than 75% may be tolerable in the overall context. When performing SR processing, the SR processing is performed using processes similar to the processes outlined above, where the LR images are drawn from the LR imagers within the category of interest (i.e. the LR imagers are all from imagers having the same FOV). Processing a reduced number of LR images enables a reduction in the processing overhead of performing SR processing.

Turning now to the 4×4 imager array illustrated in FIG. 15B. The 4×4 imager array 1510 illustrated in FIG. 15B includes 16 imagers, of which 8 are dedicated to imaging the luma spectral band of the scene. In many embodiments, a requirement of filter placement symmetry is imposed. Therefore, only two categories of field of view are included in the imager array. Category 2 (G2) imagers have 2/3 the maximum field of view, and category 3 imagers (G3) have the maximum field of view. The following table compares the resolution of the array camera shown in FIG. 15B, where each imager is a SVGA camera, at each focal length with the resolution of a conventional 8 Megapixel fixed focal length camera employing a Bayer filter and using digital zoom to provide an image of an equivalent field of view.

TABLE 2

Three Categories of Multi Field of View VGA Cameras for a 4 × 4 array configuration

| Category | fov as % of $fov_{max}$ | # of VGA Imagers | # of Luma Pixels in Legacy Cam within fov | Resolution Recovery Strength per Linear Dim. |
| --- | --- | --- | --- | --- |
| 2 | 0.71 | 4 | 1,920,000 | 4.00 |
| 3 | 1 | 4 | 4,000,000 | 8.33 |

Category 2 cameras recover resolution adequately in the central 66% of the field of view, while category 3 imagers fall short of the required resolution recovery target, because of a lack of a sufficient number of imagers. However, the legacy camera also degrades in resolution at field heights above 70% and therefore the perceived effect of the reduction in resolution of the array camera is substantially reduced.

In many embodiments, small field of view differences (of the order of 10% or so) are utilized in order to assist the SR processing. An impediment to resolution through SR processing across multiple images in an imager array can be the presence of null spaces in the field of view covered by the different LR images. A null space is a convergence in the sampling diversity of the object space across the different LR imagers in the array such that the sampling diversity is reduced to 0. By varying the magnification of the different lens stacks of each LR imager in the imager array (for example, by 10% or more) the distribution of the null spaces is more randomized and reduces the likelihood that all of the LR imagers will converge on their sampling distribution simultaneously at some point in the object space. The SR processing can accommodate variations in the FOV of each of the LR imagers by filtering the pixels to account for the different magnification when placing the pixels on a high resolution grid using calibration information and appropriate forward imaging models for each of the LR imagers.

Although specific imager array configurations are illustrated in FIGS. 15A and 15B alternative imager array configurations can be used to construct multi field array cameras that use SR processes to combine the LR images from imagers within the array having the same field of view to produce synthesized images in accordance with embodiments of the invention.

Extracting Stereo Pairs

The eye is able to get a sense of depth of an object by focusing on an object from different points of view (the two eye positions). The distance between the eyes is referred to as the baseline. The angle made by the ray from the eye (focusing on the far object) with the base line in combination with the baseline is enough to judge the distance to the object. This is referred to as triangulation.

Array cameras in accordance with embodiments of the invention provide multiple view of the same scene, all offset from one another by small differences in viewing angels. A stereo pair of high resolution images of a scene can be obtained using an array camera by performing an SR processes similar to any of the SR processes described above using two different LR imagers (or virtual LR imagers) as the reference imager in the initial Pilot Fusion processes. The distance between the two reference imagers forms the baseline of the resulting HR stereo pair.

Figure 16:
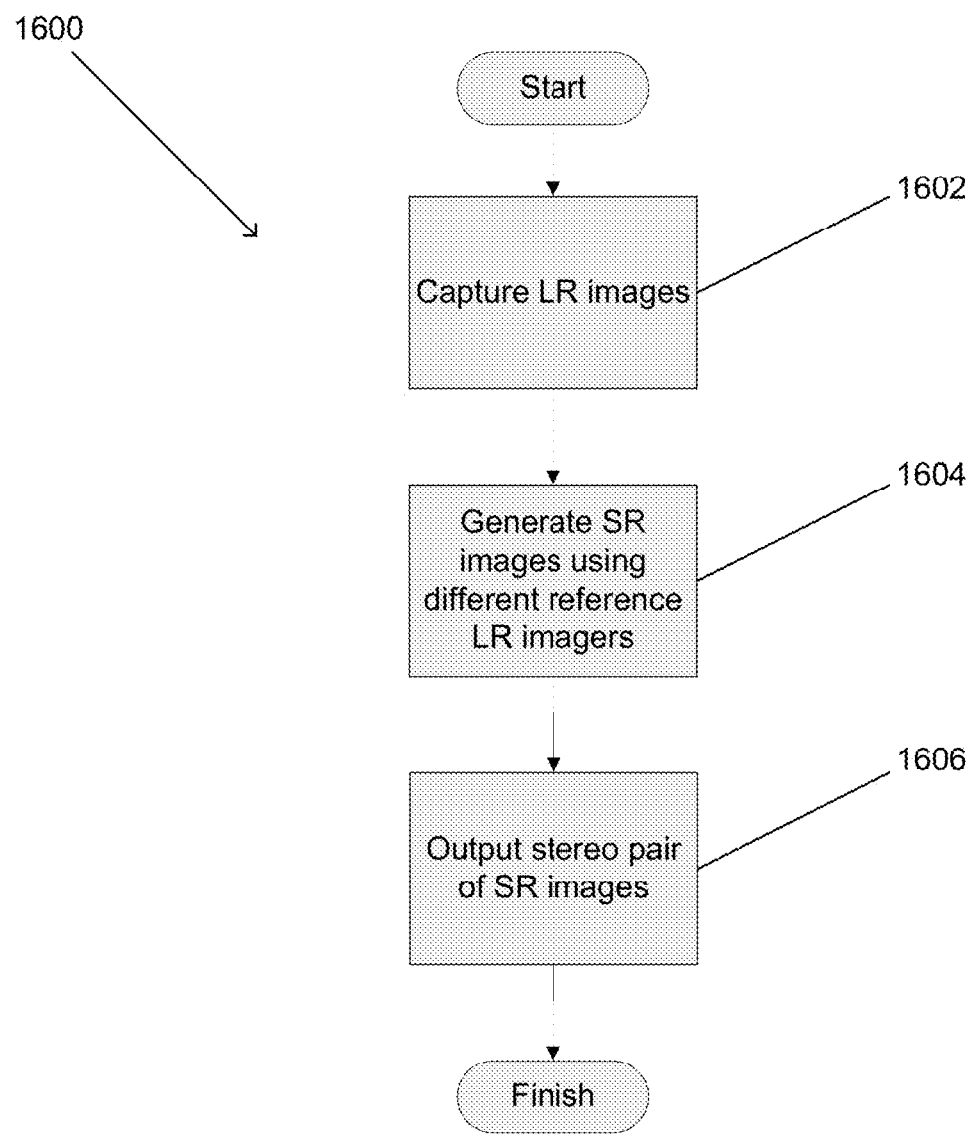
FIG. 16 is a flow chart showing a process for synthesizing a stereo pair of high resolution images using an array camera in accordance with an embodiment of the invention.

A process for generating a HR stereo pair in accordance with an embodiment of the invention is illustrated in FIG. 16. The process 1600 includes capturing (1602) LR images using an array camera in accordance with an embodiment of the invention. A pair of reference LR imagers are selected. Each LR imager can be an LR imager in the array camera or can be a virtual LR imager. An SR process in accordance with an embodiment of the invention is then used to generate (1604) an SR image in the frame of coordinates of each of the LR imagers. The pair of SR images is then output (1606) as a HR stereo pair. Although a specific process is illustrated in FIG. 16 for generating stereo pairs, other processes that utilize the LR images captured by one or more array cameras can be utilized to generate HR stereo pairs in a manner appropriate to a specific application in accordance with an embodiment of the invention.

An advantage of utilizing an imager array to generate stereo pairs is the ability to choose multiple combinations of LR imagers when generating the stereo pair. This can be particularly useful when generating multiple stereo pairs each with its own vantage viewpoint within the captured light field. Instances in which multiple stereo pairs can be useful include but are not limited to generating images for driving auto-stereoscopic lenticular displays. Auto-stereoscipic lenticular displays can generate 3D images, without the requirement that a viewer wear special glasses, using multiple stereo pairs. The generation of multiple stereo pairs using an imager array can also be useful in a variety of other applications in accordance with embodiments of the invention.

Although the present invention has been described in certain specific embodiments, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed:

1. An array camera, comprising:
a plurality of cameras with different fields of view and control circuitry for independently triggering each camera, where:
a first camera in the plurality of cameras captures low resolution (LR) images having a first field of view with a first magnification and a first resolution;
a second camera in the plurality of cameras captures higher resolution (HR) images having a second field of view with a second magnification and a second resolution, wherein the first field of view is different from the second field of view and the second resolution is different than the first resolution;
each of the cameras receives light through a separate lens system and includes a sensor;
the control circuitry controls the imaging parameters of the sensor of each camera;
at least one processor; and
memory containing an image processing pipeline software application;
wherein the image processing pipeline software directs the at least one processor to:
trigger the first camera to capture an LR input image and store the LR input image in memory;
trigger the second camera to capture an HR input image and store the HR input image in memory;
shifting pixels from the LR input image relative to a reference view;
fusing pixels from the LR input image and the HR input image;
synthesize an image using the LR input image and the HR input image, wherein the synthesized image has a higher resolution than the LR input image.

2. The array camera of claim 1, where the LR input image and the HR input image capture a scene in which depths of points in the scene vary and the LR input image differs from the HR input image due to scene dependent geometric displacements due to parallax,
normalizing the LR input image and the HR input image to increase the similarity of corresponding pixels within the images.

3. The array camera of claim 2, wherein the image processing pipeline software directs the at least one processor to fuse at least a portion of a plurality of pixels from the LR input image and the HR input image by populating a high resolution grid corresponding to pixel locations of the LR input mage and the HR input image using geometric correction information.

4. The array camera of claim 3, wherein fusing at least a portion of a plurality of pixels from the LR input image and the HR input image further comprises interpolating the grid to obtain filtered pixel values for each pixel of the image.

5. The array camera of 2, wherein the image processing pipeline software directs the at least one processor to photometrically normalize each of the LR input image and the HR input image to obtain a plurality of normalized images and storing the plurality of normalized images in memory using the at least one processor configured by image processing pipeline software.

6. The array camera of claim 1, wherein the image processing pipeline software directs the at least one processor to generate a depth map for the synthesized image.

7. The array camera of claim 6, wherein generating the depth map further comprises:
determining depth information for pixels in the synthesized image based upon the LR input image and the HR input image; and
interpolating the depth information to obtain depth information for every pixel in the synthesized image.

8. The array camera of claim 1, wherein the different fields of view provide for different magnifications of a scene being captured.

9. The array camera of claim 1, wherein the first camera has a field of view that is a maximum field of view and the second camera has a field of view that is ½ the maximum field of view.

10. The array camera of claim 1, wherein the first camera has a field of view that is ½ a maximum field of view and the second camera has a field of view that is the maximum field of view.

11. A method of synthesizing an image using an array camera, the method comprising:
capturing a low resolution (LR) image using a first camera in a plurality of cameras with different fields of view of the array camera, where the LR image has a first field of view with a first magnification and a first resolution;
capture a higher resolution (HR) image using a second camera in the plurality of cameras, where the HR image has a second field of view with a second magnification and a second resolution, wherein the first field of view is different from the second field of view and the second resolution is different than the first resolution;
wherein each of the cameras receives light through a separate lens system and includes a sensor;
store the LR input image in memory;
store the HR input image in memory;
shift pixels from the LR input image relative to a reference view;
fuse pixels from the LR input image and the HR input image
synthesize an image using the LR input image and the HR input image, wherein the synthesized image has a higher resolution than each of the LR input image.

12. The method of claim 11, wherein the LR input image and the HR input image capture a scene in which depths of points in the scene vary and the LR input image differs from the HR input image due to scene dependent geometric displacements due to parallax;
wherein the method further comprises:
normalizing the LR input image and the HR input image to increase the similarity of corresponding pixels within the images.

13. The method of claim 12, further comprising photometrically normalizing each of the LR input image and the HR input image to obtain a plurality of normalized images and storing the plurality of normalized images in memory.

14. The method of claim 11, further comprising fusing at least a portion of a plurality of pixels from the LR input image and the HR input image by populating a high resolution grid corresponding to pixel locations of the LR input mage and the HR input image using geometric correction information.

15. The method of claim 14, wherein fusing at least a portion of a plurality of pixels from the LR input image and the HR input image further comprises interpolating the grid to obtain filtered pixel values for each pixel of the image.

16. The method of claim 11, further comprising generating a depth map for the synthesized image.

17. The method of claim 16, wherein generating the depth map further comprises:
- determining depth information for pixels in the synthesized image based upon the LR input image and the HR input image; and
- interpolating the depth information to obtain depth information for every pixel in the synthesized image.

18. The method of claim 11, wherein the different fields of view provide for different magnifications of a scene being captured.

19. The method of claim 11, wherein the first camera has a field of view that is a maximum field of view and the second camera has a field of view that is ½ the maximum field of view.

20. The method of claim 11, wherein the first camera has a field of view that is ½ a maximum field of view and the second camera has a field of view that is the maximum field of view.

\* \* \* \* \*